US012567164B2

(12) United States Patent　　(10) Patent No.:　US 12,567,164 B2
Houben et al.　　(45) Date of Patent:　Mar. 3, 2026

(54) APPARATUS AND METHOD FOR DETERMINING THREE DIMENSIONAL DATA BASED ON AN IMAGE OF A PATTERNED SUBSTRATE

(71) Applicant: ASML NETHERLANDS B.V., Veldhoven (NL)

(72) Inventors: Tim Houben, Veldhoven (NL); Thomas Jarik Huisman, Eindhoven (NL); Maxim Pisarenco, Son en Breugel (NL); Scott Anderson Middlebrooks, Duizel (NL); Chrysostomos Batistakis, Eindhoven (NL); Yu Cao, Saratoga, CA (US)

(73) Assignee: ASML NETHERLANDS B.V., Veldhoven (NL)

( * ) Notice: Subject to any disclaimer, the term of this patent is extended or adjusted under 35 U.S.C. 154(b) by 414 days.

(21) Appl. No.: 18/266,792

(22) PCT Filed: Nov. 24, 2021

(86) PCT No.: PCT/EP2021/082756
§ 371 (c)(1),
(2) Date: Jun. 12, 2023

(87) PCT Pub. No.: WO2022/128373
PCT Pub. Date: Jun. 23, 2022

(65) Prior Publication Data
US 2024/0054669 A1　　Feb. 15, 2024

Related U.S. Application Data

(60) Provisional application No. 63/132,053, filed on Dec. 30, 2020, provisional application No. 63/125,522, filed on Dec. 15, 2020.

(51) Int. Cl.
*G06K 9/00*　　(2022.01)
*G06T 5/50*　　(2006.01)
(Continued)

(52) U.S. Cl.
CPC ................ *G06T 7/593* (2017.01); *G06T 5/50* (2013.01); *G06T 7/13* (2017.01); (Continued)

(58) Field of Classification Search
CPC .. G06T 7/593; G06T 5/50; G06T 7/13; G06T 2207/10012; G06T 2207/10061; (Continued)

(56) References Cited

U.S. PATENT DOCUMENTS 5,229,872 A　　7/1993　Mumola
6,046,792 A　　4/2000　Van Der Werf et al.
(Continued)

FOREIGN PATENT DOCUMENTS

TW　　　201907437　　　2/2019

OTHER PUBLICATIONS

Abell, Martha L., and James P. Braselton. Differential Equations with Mathematica. Academic Press, 2016. https://www.sciencedirect.com/topics/mathematics/piecewise-smooth-function (Year: 2016).*
(Continued)

*Primary Examiner* — Gregory A Morse
*Assistant Examiner* — Owais Iqbal Memon
(74) *Attorney, Agent, or Firm* — Pillsbury Winthrop Shaw Pittman, LLP

(57)　　　　ABSTRACT

A system, method, and apparatus for determining three-dimensional (3D) information of a structure of a patterned substrate. The 3D information can be determined using one or more models configured to generate 3D information (e.g., depth information) using only a single image of a patterned substrate. In a method, the model is trained by obtaining a
(Continued)

pair of stereo images of a structure of a patterned substrate. The model generates, using a first image of the pair of stereo images as input, disparity data between the first image and a second image, the disparity data being indicative of depth information associated with the first image. The disparity data is combined with the second image to generate a reconstructed image corresponding to the first image. Further, one or more model parameters are adjusted based on the disparity data, the reconstructed image, and the first image.

20 Claims, 27 Drawing Sheets

(51) Int. Cl.
    *G06T 7/13*            (2017.01)
    *G06T 7/593*         (2017.01)

(52) U.S. Cl.
    CPC ............... *G06T 2207/10012* (2013.01); *G06T 2207/10061* (2013.01); *G06T 2207/20081* (2013.01); *G06T 2207/20084* (2013.01); *G06T 2207/20212* (2013.01); *G06T 2207/30148* (2013.01)

(58) Field of Classification Search
    CPC . G06T 2207/20081; G06T 2207/20084; G06T 2207/20212; G06T 2207/30148; G06T 7/001; G06N 3/0464
    See application file for complete search history.

(56) References Cited

U.S. PATENT DOCUMENTS

| | | | |
|---|---|---|---|
| 2009/0157360 A1 | 6/2009 | Ye et al. | |
| 2013/0195346 A1 | 8/2013 | Nagatomo et al. | |
| 2018/0336675 A1* | 11/2018 | Schwarzband | G06T 7/60 |
| 2020/0234428 A1* | 7/2020 | George | G06N 3/045 |
| 2022/0042936 A1* | 2/2022 | Okai | G06N 3/08 |

OTHER PUBLICATIONS

International Search Report and Written Opinion issued in corresponding International Application No. PCT/EP2021/082756, dated Feb. 25, 2022.
Office Action issued in corresponding Taiwanese Patent Application No. 110146706, dated Nov. 7, 2022.
C. Godard et al., "Digging into Self-Supervised Monocular Depth Estimation," 2019 IEEE/CVF International Conference on Computer Vision (ICCV), Seoul, South Korea, pp. 3827-3837 (2019).
C. Valade et al., "Tilted beam SEM, 3D metrology for industry", Proc. of SPIE, vol. 10959 (2019).
W. Sun et al., "High voltage CD-SEM based metrology for 3D-profile measurement using depth-correlated BSE signal", Proc. of SPIE, vol. 10959 (2019).
S. Levi et al., "3D optical proximity model optimization using inline 3DSEM metrology", Proc of SPIE, vol. 10959 (2019).
P. Isola et al., "Image-To-Image Translation With Conditional Adversarial Networks", Proceedings of the IEEE Conference on Computer Vision and Pattern Recognition (CVPR), pp. 1125-1134 (2017).
J.Y. Zhu et al., "Unpaired Image-To-Image Translation Using Cycle-Consistent Adversarial Networks", IEEE International Conference on Computer Vision (ICCV), pp. 2223-2232 (2017).
A.P. Tafti et al., "3DSEM++: Adaptive and intelligent 3D Sem surface reconstruction", MICRON, vol. 87, pp. 33-45 (2016).
S. Roy et al., "Automatic 3D reconstruction of quasi-planar stereo Scanning Electron Microscopy (SEM) images*", Engineering In Medicine And Biology Society (EMBC), pp. 4361-4364 (2012).
R. Garg et al., "Unsupervised CNN for Single View Depth Estimation: Geometry to the Rescue", arXiv:1603.04992 at arxiv.org (accessed on May 30, 2023) (2016).
M. Suzuki et al., "3D-SEM challenges: How can we profile in-die 3D geometry of the integrated circuits?" (Conference Presentation), Proc. of SPIE, vol. 10959 (2019).
L. van Kessel et al., "Nebula: Monte Carlo simulator of electron-matter interaction," SoftwareX, vol. 12 (2020).

* cited by examiner

500

902

904

906

1100

1300

APPARATUS AND METHOD FOR DETERMINING THREE DIMENSIONAL DATA BASED ON AN IMAGE OF A PATTERNED SUBSTRATE

CROSS-REFERENCE TO RELATED APPLICATIONS

This application is the U.S. national phase entry of PCT patent application no. PCT/EP2021/082756, which was filed on Nov. 24, 2021, which claims the benefit of priority of U.S. patent application No. 63/125,522 which was filed on Dec. 15, 2020 and of U.S. patent application No. 63/132,053 which was filed on Dec. 30, 2020 which are incorporated herein in their entireties by reference.

TECHNICAL FIELD

The description herein relates generally to improved metrology systems and methods. More particularly, methods for determining and employing a model configured to determine three dimensional data of a structure patterned on a substrate using a single image (e.g., SEM image).

BACKGROUND

A lithographic projection apparatus can be used, for example, in the manufacture of integrated circuits (ICs). In such a case, a patterning device (e.g., a mask) may contain or provide a pattern corresponding to an individual layer of the IC ("design layout"), and this pattern can be transferred onto a target portion (e.g. comprising one or more dies) on a substrate (e.g., silicon wafer) that has been coated with a layer of radiation-sensitive material ("resist"), by methods such as irradiating the target portion through the pattern on the patterning device. In general, a single substrate contains a plurality of adjacent target portions to which the pattern is transferred successively by the lithographic projection apparatus, one target portion at a time. In one type of lithographic projection apparatuses, the pattern on the entire patterning device is transferred onto one target portion in one go; such an apparatus is commonly referred to as a stepper. In an alternative apparatus, commonly referred to as a step-and-scan apparatus, a projection beam scans over the patterning device in a given reference direction (the "scanning" direction) while synchronously moving the substrate parallel or anti-parallel to this reference direction. Different portions of the pattern on the patterning device are transferred to one target portion progressively. Since, in general, the lithographic projection apparatus will have a reduction ratio M (e.g., 4), the speed F at which the substrate is moved will be 1/M times that at which the projection beam scans the patterning device. More information with regard to lithographic devices as described herein can be gleaned, for example, from U.S. Pat. No. 6,046,792, incorporated herein by reference.

Prior to transferring the pattern from the patterning device to the substrate, the substrate may undergo various procedures, such as priming, resist coating and a soft bake. After exposure, the substrate may be subjected to other procedures ("post-exposure procedures"), such as a post-exposure bake (PEB), development, a hard bake and measurement/inspection of the transferred pattern. This array of procedures is used as a basis to make an individual layer of a device, e.g., an IC. The substrate may then undergo various processes such as etching, ion-implantation (doping), metallization, oxidation, chemo-mechanical polishing, etc., all intended to finish off the individual layer of the device. If several layers are required in the device, then the whole procedure, or a variant thereof, is repeated for each layer. Eventually, a device will be present in each target portion on the substrate. These devices are then separated from one another by a technique such as dicing or sawing, whence the individual devices can be mounted on a carrier, connected to pins, etc.

Thus, manufacturing devices, such as semiconductor devices, typically involves processing a substrate (e.g., a semiconductor wafer) using a number of fabrication processes to form various features and multiple layers of the devices. Such layers and features are typically manufactured and processed using, e.g., deposition, lithography, etch, chemical-mechanical polishing, and ion implantation. Multiple devices may be fabricated on a plurality of dies on a substrate and then separated into individual devices. This device manufacturing process may be considered a patterning process. A patterning process involves a patterning step, such as optical and/or nanoimprint lithography using a patterning device in a lithographic apparatus, to transfer a pattern on the patterning device to a substrate and typically, but optionally, involves one or more related pattern processing steps, such as resist development by a development apparatus, baking of the substrate using a bake tool, etching using the pattern using an etch apparatus, etc.

SUMMARY

With the advancement of lithography and other patterning process technologies, the dimensions of functional elements have continually been reduced while the amount of the functional elements, such as transistors, per device has been steadily increased over decades. In the meanwhile, the requirement of accuracy in terms of critical dimension (CD), height, etc. has become more and more stringent. Errors in shape and size of the structure may cause a problem in terms of the functioning of the device, including failure of the device to function or one or more electrical problems of the functioning device. Accordingly, it is desirable to be able to measure the three dimensional structure of the functional elements to characterize reduce or minimize one or more of defects in the device. However, measuring three dimensional (3D) structure of the functional elements using existing metrology tools and methods is time consuming, and inaccurate which negatively affects the yield of the patterning process.

In the present disclosure, a system for determining 3D data (e.g., depth information) from a single captured image of a patterned substrate is provided. In an example, the system includes an image capture device such as a scanning electron microscope (SEM) having an electron beam optics configured to capture an image of a patterned substrate; and one or more processors including a trained model stored in a memory that can receive the captured image and execute the model to determine depth information form the captured image. The one or more processors can be configured to input the captured image of the patterned substrate to a trained model configured to generate depth related data from a single image; and extract depth information from the captured image by executing the trained model. The trained model can be trained by one or more methods of the present disclosure.

According to an embodiment, there is provided a method for determining a model configured to generate data for estimating depth information of a structure of a patterned substrate. The method includes obtaining a pair of images (e.g., SEM1 and SEM2) of a structure of a patterned substrate, the pair of images including a first image (e.g., SEM1) captured at a first angle (e.g., 90° or perpendicular to the substrate) with respect to the patterned substrate, and a second image (e.g., SEM2) captured at a second angle (e.g., 10° with respect to a perpendicular to the substrate) different from the first angle. Using the first image as input to a model disparity data between the first image and the second image is generated. The disparity data is indicative of depth information associated with the first image. The disparity data is combined with the second image to generate a reconstructed image corresponding to the first image. Further, one or more model parameters of the model are adjusted based on a performance function such that the adjusting causes the performance function to be within a specified performance threshold. The performance function is a function of the disparity data, the reconstructed image, and the first image. The model is configured to generate data convertible to depth information of a structure of a patterned substrate.

In an embodiment, there is provided another method for generating a model configured to estimate depth data of a structure of a patterned substrate The method includes obtaining, via a simulator (e.g., a SEM simulator), a plurality of simulated metrology images (e.g., simulated SEM images) of a structure, each of the plurality of simulated metrology images associated with depth data used by the simulator; generating, based on the plurality of simulated metrology images and the corresponding simulated depth data, a model (e.g., CNN) configured to predict depth data from an inputted image; obtaining a captured image (e.g., SEM image) and observed depth data (e.g., measured height map) of the structure patterned on a substrate; and calibrating, based on the captured image and the observed depth data, the model (e.g., the CNN) to cause the predicted depth data to be within a specified matching threshold of the observed depth data. In an embodiment, calibrating of the model involves inputting the captured image (e.g., SEM image) to the model (e.g., the CNN) to predict depth data; adjusting the predicted depth data by comparing the predicted depth data and the observed depth data; and adjusting, based the adjusted predicted depth data, model parameters of the model to cause the model to generate depth data that is within a matching threshold of observed depth data. For example, a predicted height map is adjusted to match the observed height map of the structure.

Furthermore, in an embodiment, there is provided yet another method for generating a model configured to estimate depth data of a structure of a patterned substrate. The method employs training data generated by a process model (e.g., a deterministic process model). The method includes: obtaining (i) a plurality of SEM images of structures associated with programmed variations in a mask pattern and (ii) simulated profiles of the structures based on the programmed variations, each SEM image of the plurality of SEM images being paired with a simulated profile corresponding to a programmed variation in the mask pattern; and generating, based on the plurality of SEM images paired with the corresponding simulated profiles, a model to estimate depth data of a structure such that the estimated depth data is within acceptable threshold of depth data associated with the simulated profiles. In an embodiment, the programmed variations comprises variations in one or more of: assist feature variations associated with the mask pattern, main feature variations associated with the mask pattern, or resist coated thickness variations. In an embodiment, the simulated profiles are 3D resist profiles that are generated by a calibrated deterministic process model (e.g., a deterministic resist model). In an embodiment, the calibrated deterministic process model is a process model calibrated to satisfy critical dimension (CD) of a structure, but not LCDU, LER, LWR, or stochastic variations associated with the structure.

Furthermore, in an embodiment, there is provided yet another method for generating a model configured to estimate depth data of a structure of a patterned substrate. The method employs training data generated by a process model (e.g., a stochastic process model). The method includes obtaining (i) a plurality of SEM images of structures, (ii) simulated profiles of the structures, and (iii) key performance indicators (KPIs) associated with the simulated profiles; and generating, based on the plurality of SEM images, the simulated profiles, and the KPIs, a model to estimate depth data of a structure such that KPIs associated with the estimated depth data is within acceptable threshold of the KPIs associated with the simulated profiles. In an embodiment, the simulated profiles of the structures are generated by a calibrated stochastic process model associated with a patterning process. In an embodiment, the calibrated stochastic process model is a process model calibrated to satisfy one or more of KPIs including: critical dimension (CD) of a structure, local CD uniformity (LCDU) associated with the structure, line edge roughness (LER) associated with the structure, defect rates associated with the structure, line width roughness (LWR) related to line space patterns, contact edge roughness related to contact holes, stochastic edge placement error (SEPE), or stochastic variations associated with geometry of the structure.

In an embodiment, there is provided, one or more non-transitory computer-readable media comprising instructions corresponding to processes of the methods herein. In an embodiment, one or more non-transitory computer-readable media is for storing a model configured to determine three-dimensional (3D) information (e.g., depth data) of a structure from a single image (e.g., SEM image) of the structure formed on a substrate. In an embodiment, one or more non-transitory computer-readable media is configured to generate a 3D information via the stored model. In particular, one or more non-transitory computer-readable media stores instructions that, when executed by one or more processors, provides the model. In an embodiment, the model is produced by processes of the method herein.

BRIEF DESCRIPTION OF THE DRAWINGS

The above aspects and other aspects and features will become apparent to those ordinarily skilled in the art upon review of the following description of specific embodiments in conjunction with the accompanying figures, wherein.

DETAILED DESCRIPTION

Figure 1:
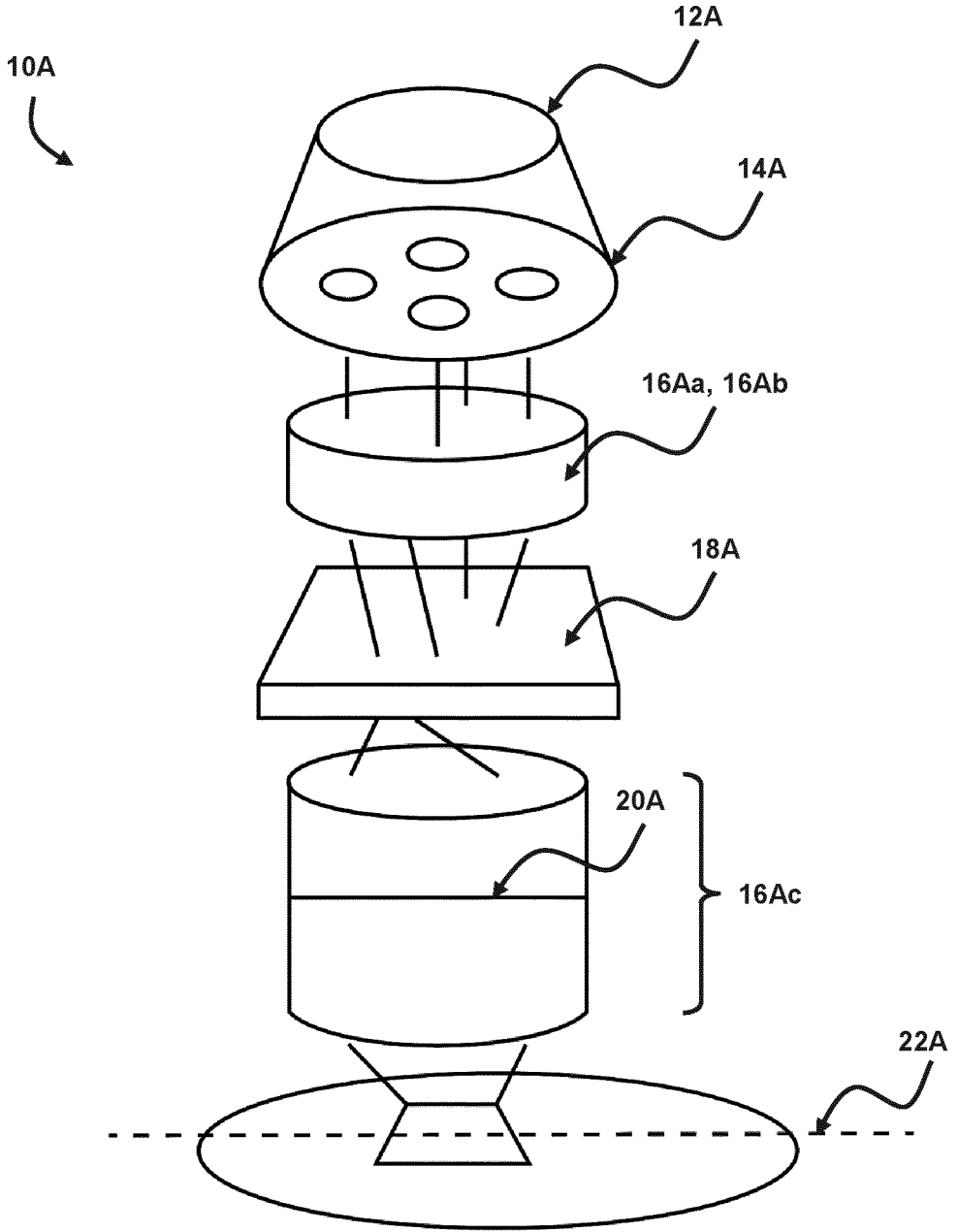
FIG. 1 shows a block diagram of various subsystems of a lithography system, according to an embodiment.

An integrated circuit (IC) chip used in a device (e.g., phone, laptop, computer memory, etc.) includes complex circuit patterns. During manufacturing of such circuit patterns, images of the printed circuit patterns are captured to determine whether desired circuit patterns are printed accurately. The ultimate performance of the fabricated device is critically dependent on the accuracy of the positioning and sizing of the various features of the product structure formed via lithography and other processing steps. These features are three dimensional (3D) structures having a predetermined depth and shape at nanometer scale. The product structure made by an imperfect lithography procedure or other processing steps will result in a slightly different structure than an ideal or nominal desired structure.

In order to inspect the size of various features, three-dimensional information (e.g., height of features) can be very beneficial to ensure a feature at one layer connects to feature at another layer. However, obtaining 3D information of structures at nanometer scale is not a trivial task. In existing technology, 3D information may be obtained via tilted beam scanning electron microscope (SEM), in which two or more images targeted at the same location are needed in order to infer proper depth information. However, the use of multiple images for 3D metrology has several limitations. For example, capturing a pair of stereo images decreases a throughput of a patterning process or a metrology process due to having to switch between beam tilt angles. A proper alignment between the images is required to capture the stereo images. Processing the stereo images to determine depth information may be computationally expensive and prone to noise in the images and drifts in a metrology hardware. Thus, extraction of 3D information using existing technology can slow down the chip manufacturing and metrology process.

Although specific reference may be made in this text to the manufacture of ICs, it should be explicitly understood that the description herein has many other possible applications. For example, it may be employed in the manufacture of integrated optical systems, guidance and detection patterns for magnetic domain memories, liquid-crystal display panels, thin-film magnetic heads, etc. The skilled artisan will appreciate that, in the context of such alternative applications, any use of the terms "reticle", "wafer" or "die" in this text should be considered as interchangeable with the more general terms "mask", "substrate" and "target portion", respectively. The substrate referred to herein may be processed, before or after exposure, in for example a track (a tool that typically applies a layer of resist to a substrate and develops the exposed resist) or a metrology or inspection tool. Where applicable, the disclosure herein may be applied to such and other substrate processing tools. Further, the substrate may be processed more than once, for example in order to create a multi-layer IC, so that the term substrate used herein may also refer to a substrate that already contains multiple processed layers.

A critical dimension (CD) of a device refers the smallest width of a line or hole or the smallest space between two lines or two holes. Thus, the CD determines the overall size and density of the designed device. Of course, one of the goals in device fabrication is to faithfully reproduce the original design intent on the substrate (via the patterning device).

In the present document, the terms "radiation" and "beam" may be used to encompass all types of electromagnetic radiation, including ultraviolet radiation (e.g. with a wavelength of 365, 248, 193, 157 or 126 nm) and EUV (extreme ultra-violet radiation, e.g. having a wavelength in the range of about 5-100 nm).

The term "mask" or "patterning device" as employed in this text may be broadly interpreted as referring to a generic patterning device that can be used to endow an incoming radiation beam with a patterned cross-section, corresponding to a pattern that is to be created in a target portion of the substrate; the term "light valve" can also be used in this context. Besides the classic mask (transmissive or reflective; binary, phase-shifting, hybrid, etc.), examples of other such patterning devices include:

a programmable mirror array. An example of such a device is a matrix-addressable surface having a viscoelastic control layer and a reflective surface. The basic principle behind such an apparatus is that (for example) addressed areas of the reflective surface reflect incident radiation as diffracted radiation, whereas unaddressed areas reflect incident radiation as undiffracted radiation. Using an appropriate filter, the said undiffracted radiation can be filtered out of the reflected beam, leaving only the diffracted radiation behind; in this manner, the beam becomes patterned according to the addressing pattern of the matrix-addressable surface. The required matrix addressing can be performed using suitable electronic means.

a programmable LCD array. An example of such a construction is given in U.S. Pat. No. 5,229,872, which is incorporated herein by reference.

As a brief introduction, FIG. 1 illustrates an exemplary lithographic projection apparatus 10A. Major components are a radiation source 12A, which may be a deep-ultraviolet excimer laser source or other type of source including an extreme ultra violet (EUV) source (as discussed above, the lithographic projection apparatus itself need not have the radiation source), illumination optics which, e.g., define the partial coherence (denoted as sigma) and which may include optics 14A, 16Aa and 16Ab that shape radiation from the source 12A; a patterning device 18A; and transmission optics 16Ac that project an image of the patterning device pattern onto a substrate plane 22A. An adjustable filter or aperture 20A at the pupil plane of the projection optics may restrict the range of beam angles that impinge on the substrate plane 22A, where the largest possible angle defines the numerical aperture of the projection optics NA=n sin $(\Theta_{max})$, wherein n is the refractive index of the media between the substrate and the last element of the projection optics, and $\Theta_{max}$ is the largest angle of the beam exiting from the projection optics that can still impinge on the substrate plane 22A.

In a lithographic projection apparatus, a source provides illumination (i.e. radiation) to a patterning device and projection optics direct and shape the illumination, via the patterning device, onto a substrate. The projection optics may include at least some of the components 14A, 16Aa, 16Ab and 16Ac. An aerial image (AI) is the radiation intensity distribution at substrate level. A resist layer on the substrate is exposed and the aerial image is transferred to the resist layer as a latent "resist image" (RI) therein. The resist image (RI) can be defined as a spatial distribution of solubility of the resist in the resist layer. A resist model can be used to calculate the resist image from the aerial image, an example of which can be found in U.S. Patent Application Publication No. US 2009-0157360, the disclosure of which is hereby incorporated by reference in its entirety. The resist model is related only to properties of the resist layer (e.g., effects of chemical processes which occur during exposure, PEB and development). Optical properties of the lithographic projection apparatus (e.g., properties of the source, the patterning device and the projection optics) dictate the aerial image. Since the patterning device used in the lithographic projection apparatus can be changed, it may be desirable to separate the optical properties of the patterning device from the optical properties of the rest of the lithographic projection apparatus including at least the source and the projection optics.

Once a semiconductor chip is manufactured, measurements may be performed to determine dimension of structures fabricated on the substrate. For example, inspection of the fabricated structure may be based on critical dimension (CD) measurements obtained using a metrology tool (e.g., SEMs, AFM, optical tool, etc). In an embodiment, lateral dimensions (e.g., in x, y plane) of the structure may be extracted from the CD measurements. Besides the lateral dimensions of features, the measurements (e.g., CD-SEM) may also include information on 3D information (e.g., a height, CD values at different heights, height profile, etc.) of the features. In an embodiment, the height of the feature refers to a depth in a z-direction perpendicular to the x-y plane.

Figure 2A:
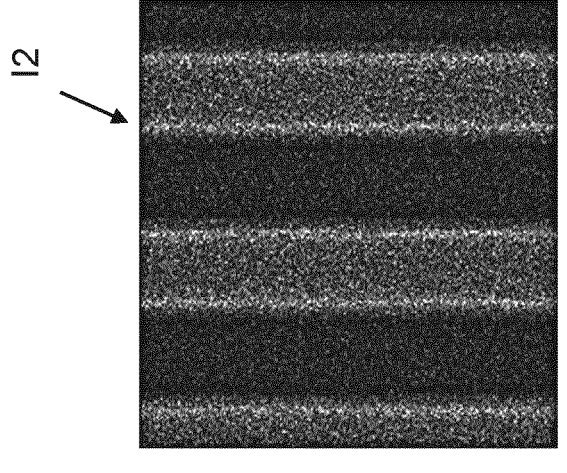
FIG. 2A illustrates an example SEM image of a line having a depth of 10 nm in a z-direction from a top of a substrate, according to an embodiment.
Figure 2B:
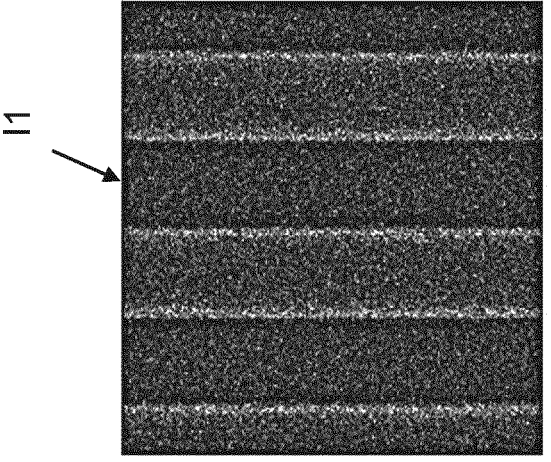
FIG. 2B illustrate another example SEM image of a line having a depth of 100 nm in a z-direction from a top of a substrate, according to an embodiment.

FIGS. 2A and 2B illustrate two different SEM images of a line having same CDs but different heights. FIG. 2A illustrates a SEM image I1 of a line having a depth of 10 nm in z-direction (perpendicular to the plane of the FIGS. 2A and 2B) from a top of a substrate and FIG. 2B illustrate another SEM image I2 of a line having a depth of 100 nm in z-direction from a top of a substrate. These figures show that depth has a clear impact on the captured SEM images. However, although 3D information (e.g., height information) is of interest, it is rarely extracted. In existing technology, only lateral information such as CD may be extracted, but not height.

Figures 2C, 2D, 2E:
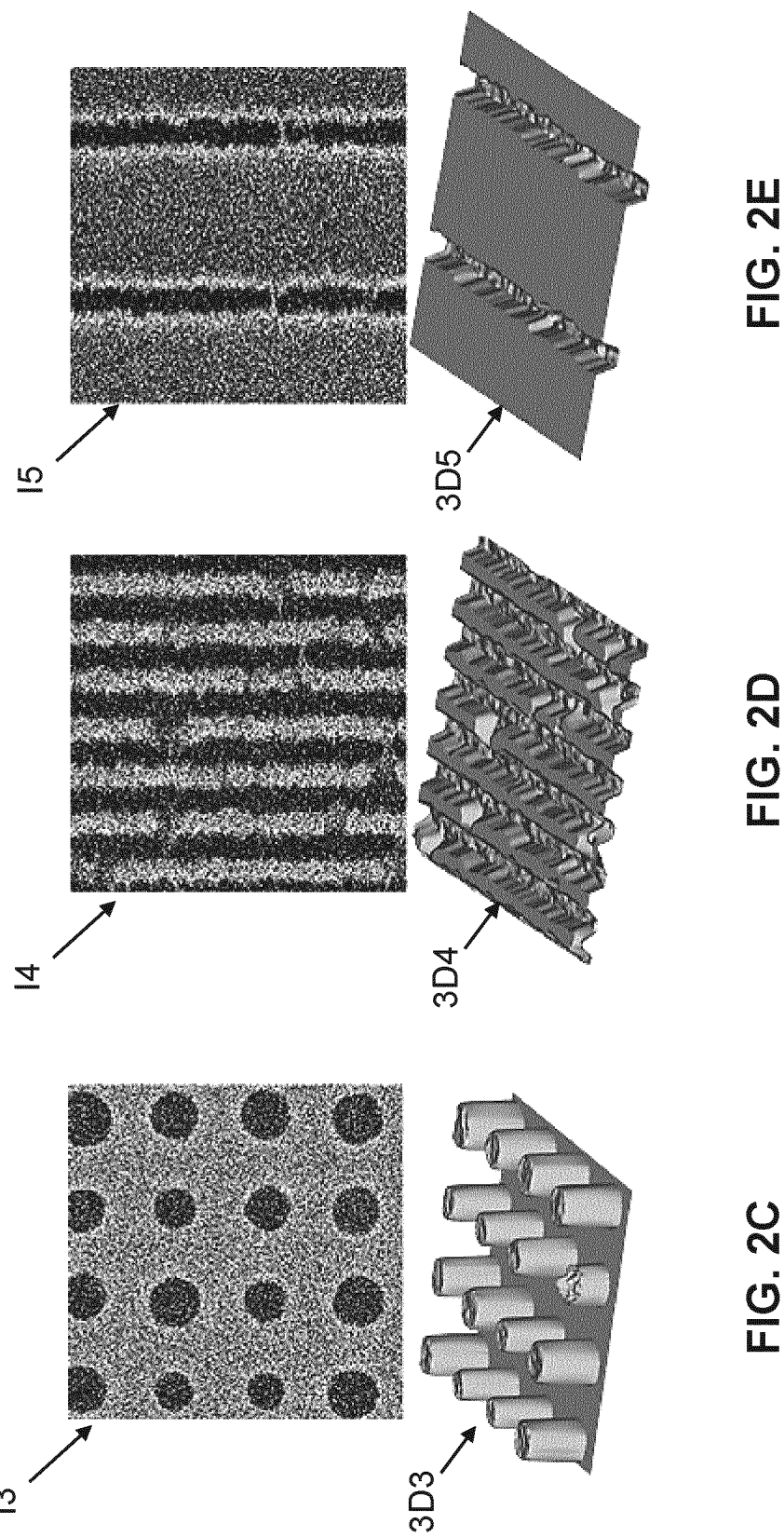
FIG. 2C illustrates a SEM image of contact holes patterned on a substrate and corresponding depth map, according to an embodiment.
FIG. 2D illustrates a SEM image of a set of lines patterned on a substrate and corresponding depth map, according to an embodiment.
FIG. 2E illustrates a SEM image of another set of lines patterned on a substrate and
corresponding depth map, according to an embodiment.

For many problems related to semiconductor manufacturing there may be a correlation between input and output, but the correlation may be too complex for humans to model or identify. According to the present disclosure, a model is trained to extract depth information from a single image (e.g., SEM image) of the substrate. For example, a deep-learning algorithm may be applied to train a machine learning model such as a convolutional neural network (e.g., CNN) using training data and a training method described herein. In an embodiment, the methods described herein enable extraction of height of features from a single image of a substrate. For example, FIGS. 2C-2E illustrate different SEM images I3, I4, and I5, for each SEM image a depth map can be extracted from the SEM image, according to the present disclosure. In FIGS. 2C-2E, input SEM images I3, I4, and I5 are depicted at the top row and corresponding depth maps 3D3, 3D4, and 3D5, respectively, at the bottom row.

In an embodiment, a beam-tilt functionality of a SEM tool may be employed to retrieve depth information from a single CD-SEM image. An unsupervised training of a model may be performed using stereo image pairs (e.g., obtained by the beam-tilt SEM image) as training dataset. When semiconductor topologies are measured with a CD-SEM, the electron beam is commonly at normal incidence with respect to the substrate, resulting in top down images. This measurement method can resolve the substrate measurements with a lateral resolution close to 1 nm, whereas the axial resolution is often neglected due to the ill-posed problem of how to translate a SEM signal to a topology depth. To solve this ill-posed problem, tilted beam SEMs may be used to generate information about the depth of a structure. For example, "C. Valade, et al., *Tilted beam SEM, 3D metrology for industry*, Proc. SPIE 10959, Metrology, Inspection, and Process Control for Microlithography XXXIII, 109590Y (26 Mar. 2019)" describes example tilted beam SEMs used to perform 3D metrology. In such systems stereo image pairs created with tilted electron beams from different directions are typically used.

For example, a SEM tool is capable of directing an electron beam at a desired angle (e.g., up to 12° with respect to a perpendicular to the substrate) to catch images at different angles, giving access to more information. From the analysis of such images, pattern height and sidewall angles can be consequently determined using geometric considerations.

However, in tilted beam SEM, two or more images targeted at the same location are needed in order to infer proper depth information of a structure. For example, two images are obtained for the same structure on a substrate, a first image at a normal beam incidence and a second image with the beam incident at a tilted angle. The use of multiple images for 3D metrology has several limitations. For example, capturing a pair of stereo images decreases a throughput of a patterning process or a metrology process due to having to switch between beam tilt angles. A proper alignment between the images is required to capture the stereo images. Processing the stereo images to determine depth information may be computationally expensive and prone to noise in the images and drifts in a metrology hardware. Capturing the stereo images require the metrology hardware to facilitate ease-of-use in changing the tilt direction of the beam. Capturing image at a tilted angle reduces an effective field-of-view, because only areas that are present in all images can be used for depth inference.

In some embodiments, the present disclosure describes mechanisms to estimate depth of a structure using a single image (e.g., a SEM image) captured at a first tilt angle (e.g., perpendicular to a substrate). As such, this potentially relieves most of the disadvantages associated with stereo images mentioned above. For example, once a model is trained according to the present disclosure, depth information can be determined using a single SEM image thereby increasing the throughput, reducing metrology time, and reducing computational resources compared to using stereo image based methods for determining depth information.

In some embodiments, the present disclosure describes an unsupervised training method used for training a machine learning model (e.g., CNN). In an embodiment, the term "unsupervised" refers to a training approach where a ground truth depth data is not used when training the model or manual interventions is not involved during the training process. The approach herein has sufficient capability by itself to learn how to perform depth estimation. In an embodiment, a convolutional neural network (CNN) with a U-net-like architecture (e.g., an encoder, a decoder, and skip connections between the two) may be employed for training the CNN.

Figure 3:
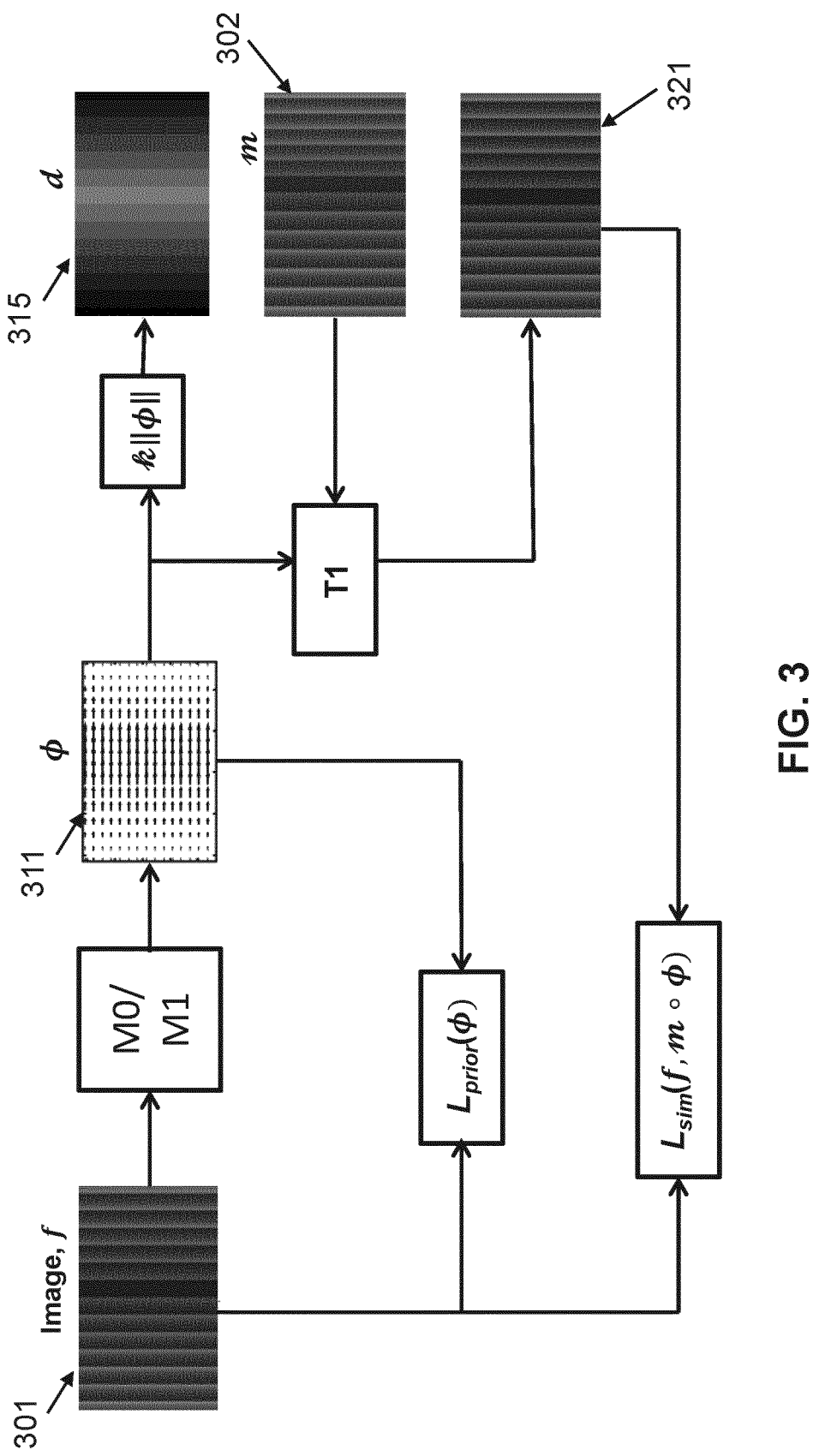
FIG. 3 is a block diagram of a training process of a model, according to an embodiment.

FIG. 3 is a block diagram of a training process of a model M0 according to an embodiment of the present disclosure. After training, a trained model may be referred as a model M1. As depicted in FIG. 3, a model M0 (e.g., CNN) receives an image 301 of a substrate as input, and outputs disparity data 311 associated with the inputted image. The inputted image 301 may be either a normal SEM image or a tilted SEM image of a patterned substrate. In the present embodiment, the term "normal image" or "normal SEM image" refers to a top-view image of a substrate that captures a first topology of the structure viewed from a top. In an embodiment, the normal image can be obtained via a metrology tool configured to direct e-beam perpendicular to the substrate. The term "tilted image" or "tilted SEM image" refers to an angled-view image of the substrate that captures a second topology of the structure viewed at an angle with respect to perpendicular to the substrate. In an embodiment, tilted image can be obtained via the metrology tool configured to direct an e-beam at an angle with respect to a substrate.

In FIG. 3, the model M0 is configured to output data that characterizes a difference between two images of the same structure. From such difference data, depth information of the structure can be determined. In an embodiment, the model M0 generates disparity data 311 that can be converted to depth information 315 of the structure on the substrate. For example, the disparity data 311 can be converted to depth information 315 by multiplying the magnitude of the disparity data 311 with a conversion function such as a scaling factor k. In an embodiment, the conversion function may be a linear function, a non-linear function, or a constant determined by comparing the result of applying the conversion function with one of the two images. In FIG. 3, the disparity data 311 is visually represented as a disparity map or image, as an example. In the present disclosure, disparity data 311 refers to a difference in coordinates of similar features within two stereo images (e.g., two SEM images of the same structure). In an embodiment, a magnitude of displacement vectors in the disparity map, is directly proportional to a depth of a structure.

For training the model M0, the disparity data 311 may be transformed, via a transform operation T1, to another image 321 that correspond to the input image 301 of the model M0. The transform operation T1 represents any transformation function that modified a tilted image 302 using the disparity data 311. For example, the transformation function can be composition, or convolution operating between the disparity data 311 and the tilted image 302 that results in another image that should correspond to the normal image.

In the present example, the disparity data 311 is combined with the tilted image 302, measured at a specified beam tilt (other than normal), to map the pixels of the tilted image 302 with the normal SEM image. In an embodiment, the tilted image 302 may be represented as a function m and the disparity data 311 (e.g., a map) may be represented as another function $\phi$. By combining the disparity data 311 with the tilted image 302, a reconstructed image may be obtained. For example, the reconstructed image is represented by a function obtained from a composition of functions m and $\phi$. In an embodiment, the reconstructed image may be represented as $m \circ \phi$, where the symbol $\circ$ denotes the composition operation between functions e.g., $m(x) \circ \phi(x) = m(\phi(x))$, x being a vector of xy-coordinates of an image. If the estimated disparity data 311 is accurate, then the reconstructed image is expected to be very similar to the inputted SEM image. For example, the reconstructed image is more than 95% similar to the normal SEM image inputted to the model M0. If the reconstructed image is not similar, the model M0 is modified or trained to cause the reconstructed image to be similar to the inputted SEM image. The modification of the model M0 may involve adjusting of one or more parameters (e.g., weights and biases) of the model M0 until a satisfactory reconstructed image is generated by the model. In an embodiment, the adjustment of the one or more parameters is based on a difference between the reconstructed image and the inputted SEM image. In an embodiment, a performance function may be used to guide the adjustment of the one or more parameters of the model M0, the performance function being a difference between the reconstructed image and the inputted SEM image.

In an embodiment, training of the model M0 involves adjusting model parameters to cause minimization of a performance function. At the end of the training process, the model M0 is referred as the model M1 or the trained model M1. In an embodiment, the adjusting comprises determining a gradient map of the performance function by taking a derivative of the performance function with respect to the one or more model parameters. The gradient map guides the adjustment of the one or more model parameters in a direction that minimizes or brings the performance function values within a specified threshold. For example, the specified threshold may be that the difference of the performance function values between a current iteration and a subsequent iteration is less than 1%. In an embodiment, the performance function comprises a similarity loss $L_{sim}(f, m \circ \phi)$ indicative of similarity between the reconstructed image and the inputted SEM image (e.g., represented as a function $f$). In an embodiment, the similarity loss function may be computed for a plurality of images of the structure, each image obtained at different angles. For example, the performance function may be modified to include a loss function computed as a sum of similarity between an image of the plurality of images and a corresponding reconstructed image.

Additionally, the performance function may include another loss function $L_{prior}(\phi)$ determined based on prior information about the disparity characteristic of a pair of stereo SEM images. The prior information includes, but is not limited to, disparity being characterized as piecewise smooth function, disparity being characterized as piecewise constant function, or disparity being characterized as a function allowed to jump at edges of features in the normal image. For example, the edges of the features may be detected applying a gradient operation to an image (e.g., the normal image). The gradient operation identifying a sharp change in slope of an intensity profile of the image (e.g., normal image) at one or more locations, such location may be characterized as edges at which disparity may jump from one function type to another.

As mentioned earlier, based on prior stereo images of one or more prior patterned substrate a disparity function may be determined. For example, the disparity may be a piecewise smooth function, wherein a derivative of the disparity is piecewise continuous. For example, disparity related to structures having non-vertical walls will be piecewise continuous. In another example, the disparity may be piecewise constant. For example, disparity related to structures having vertical walls will be piecewise constant. In yet another example, the disparity may be a function having a jump at edges of a structure within an image, the edges being detected based a gradient of an intensity profile within the image. For example, disparity related to structures having both vertical and non-vertical walls, where the location of the jumps is per-determined from the SEM images. Thus, the present method enables incorporation of disparity data from prior patterned substrate in form of the disparity function to train the machine learning model. Use of such disparity function enables faster convergence or a faster training of the model M0 along with more accurate results.

In an embodiment, the model M0 (e.g., CNN) may be trained based on the performance function expressed as a sum of similarity loss function and another loss function (see equation below) associated with prior patterned substrates. In an example, a performance function L is minimized during training by modifying one or more model parameters of the CNN, as expressed below:

$$L = \underset{w}{\mathrm{argmin}} \sum_i L_{sim}(f_i, m_i \circ \phi(f_i, m_i, w)) + L_{prior}(\phi(f_i, m_i, w))$$

Figure 4:
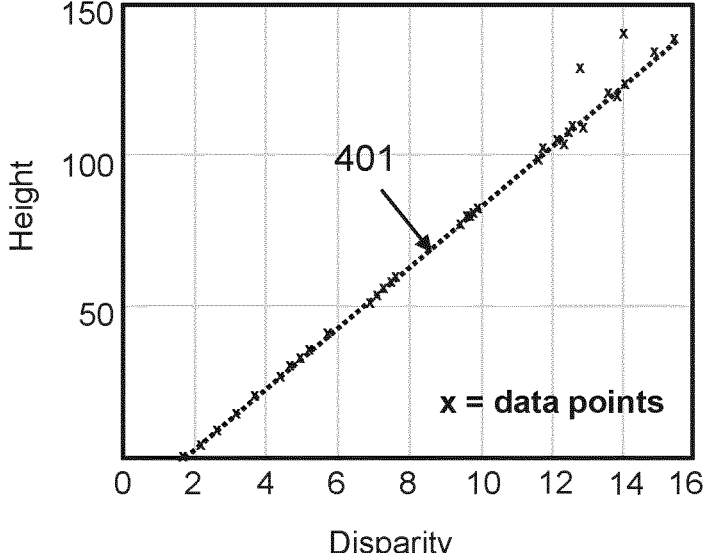
FIG. 4 illustrates a correlation between height and disparity data associated with stereo images of a patterned substrate, according to an embodiment.

According to the present disclosure, referring to FIG. 4, inventors identified, based on an experiment, that depth information of a structure patterned on a substrate can be inferred from a disparity between two or more SEM images captured at different tilt angles. For example, the experiment involved generating a depth map and feed it into a Monte-Carlo SEM simulator to compute a stereo pair of denoised SEM images: one at 0 degrees from the normal (top-view image) and one at 5.7 degrees from the normal (tilted image). An example Monte-Carlo simulator configured to generate SEM images is discussed in "L. van Kessel, and C. W. Hagen, *Nebula: Monte Carlo simulator of electron-matter interaction*, SoftwareX, Volume 12, 2020, 100605, ISSN 2352-7110." In the experiment, in two SEM images, a set of points were identified and related disparity data was analyzed. For example, the set of points corresponding to step transitions in a height profile of a structure that results in a peak in the SEM signal. For the set of points, disparity data (e.g., displacement in the x-coordinate) of each point between the two SEM images was calculated. The height or depth of each point is plotted against the disparity, as shown in FIG. 4. Based on a line 401 fitted between the disparity data and the height at the set of points, it can be concluded that there is a strong correlation between the disparity between two SEM images and the height of the structure.

Figure 6A:
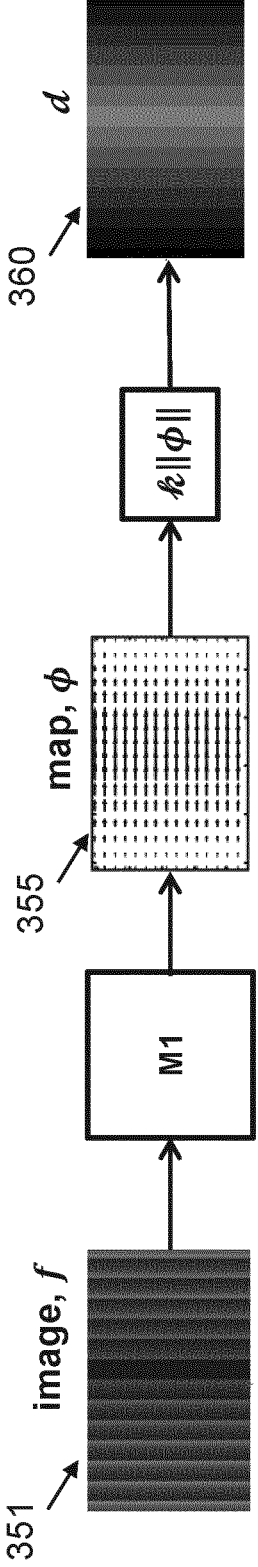
FIG. 6A is a block diagram of an example determination of depth information of a structure formed on a substrate using a model trained according to FIG. 5, according to an embodiment.

In an embodiment, once the model M1 is trained predictions of depth information may be performed based on a single image (e.g., SEM image) of any patterned substrate. FIG. 6A illustrates estimating of height or depth information associated with a structure using a single SEM image 351. In FIG. 6A, the model M1 (e.g., trained as in FIG. 3) uses a normal SEM image 351 of the structure as input to estimate disparity data 355. The disparity data 355 is further converted, by applying a conversion function k to the disparity data 355, to height data 360 of a structure patterned on the substrate. For example, the magnitude of the estimated disparity data can be multiplied by a constant to generate the depth information. As such, no tilted image is required to infer height information of the structure.

Figure 5:
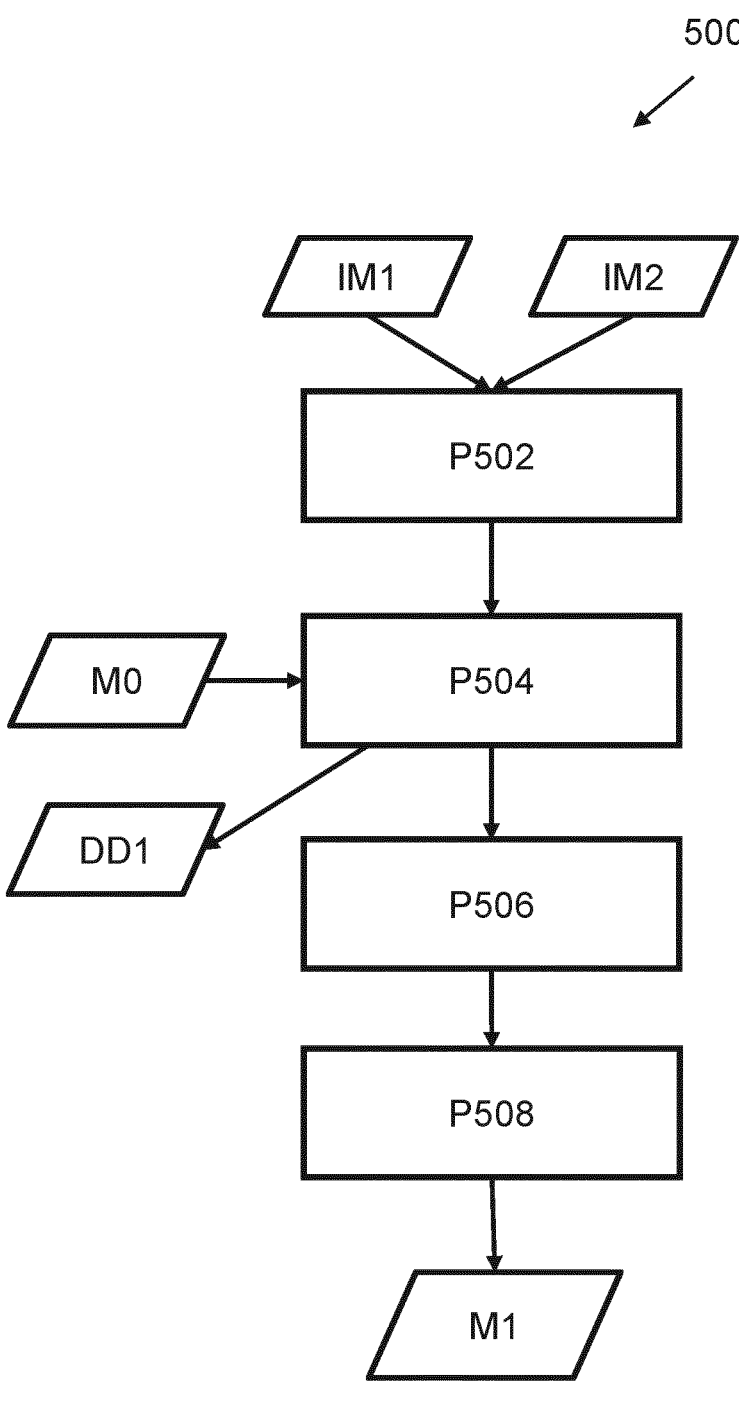
FIG. 5 is a flow chart of a method for training a model for estimating depth information of a structure of a patterned substrate, according to an embodiment.

FIG. 5 is an exemplary flow chart of a method 500 for determining a model for estimating depth information of a structure of a patterned substrate. In an example implementation, the method 500 includes following processes P502, P504, P506 and P508, discussed in detail below.

Process P502 involves obtaining a pair of images IM1 and IM2 of a structure of a patterned substrate. The pair of images includes a first image IM1 captured at a first angle with respect to the patterned substrate, and a second image IM2 captured at a second angle different from the first angle. As an example, the first image IM1 captures top view details of the structure, and the second image IM2 captures details of an angle-view details of the same structure from another angle (e.g., at an angle between 1 to 15° from a perpendicular to the substrate). An example of the first image IM1 can be a normal image 301 (see FIG. 3) and the second image IM2 can be a tilted image 302 (see FIG. 3). In an embodiment, the first image IM1 is a normal image associated with an e-beam directed perpendicular to the patterned substrate, and the second image IM2 is associated with an e-beam directed at an angle more 90° or less than 90° with respect to the patterned substrate. In an embodiment, a plurality of pair of images may be obtained and used as training dataset. In an embodiment, the pair of images obtained, via a metrology tool, includes a plurality of pairs of SEM images of a patterned substrate. Each pair including a first SEM image associated with a first e-beam tilt setting of the metrology tool, and a second SEM image associated with a second e-beam tilt setting of the metrology tool. In an embodiment, each image of the pair of images is captured from different SEM tools. For example, the first SEM image is captured by a first SEM tool configured to capture an normal image of a structure, and the second SEM image is captured by a second SEM tool configured to capture an image of the same structure at a second e-beam tilt setting.

Process P504 involves generating, via a model M0 using the first image IM1 as input, disparity data DD1 between the first image IM1 and the second image IM2, the disparity data DD1 being indicative of depth information associated with the first image IM1. In an embodiment, the disparity data DD1 comprises difference in coordinates of similar features within the first image IM1 and the second image IM2. In an embodiment, after the training process, the model M1 is considered as a trained model of M0. In an embodiment, the model M0 or M1 may be a machine learning model configured to predict disparity data using a single image of a substrate. For example, the model M0 or M1 may be a convolutional neural network CNN, deep CNN, or other machine learning model.

Process P506 involves applying the disparity data DD1 to the second image IM2 to generate a reconstructed image corresponding to the first image IM1. In an embodiment, the reconstructed image is generated by performing a composition operation between the disparity data DD1 and the second image IM2 to generate the reconstructed image. For example, FIG. 3 illustrates the reconstructed image 321 generated based on the disparity data (represented as the disparity map 311) and the tilted image 302.

Process P508 involves adjusting, based on a performance function one or more parameters of the model M1 causing the performance function to be within a specified performance threshold. The performance function may be a function of the disparity data DD1, the reconstructed image, and the first image IM1. The model M1 is configured to generate data convertible to depth information of a structure of a patterned substrate.

In an embodiment, the performance function further comprises a loss function computed based on disparity characteristics associated with a pair of stereo images of prior one or more patterned substrate, and the disparity data DD1 predicted by the model M1. In an example, the disparity characteristics may include disparity characterized as a piecewise smooth function, wherein a derivative of the disparity is piecewise continuous. In another example, the disparity characteristics may include disparity being piecewise constant. In yet another example, the disparity characteristics may include disparity characterized as a function having a jump at edges of a structure within an image, the edges being detected based a gradient of an intensity profile within the image. An example performance function L is discussed above with respect to FIG. 3.

In an embodiment, the training is based on a plurality of images of the structure obtained at different angles. Accordingly, the performance function may include a loss function related to a sum of similarity between an image of the plurality of images and a corresponding reconstructed image.

In an example, the performance function is minimized during training by modifying one or more model parameters of the CNN. For example, the performance function L computed as a sum of loss function related to reconstructed image and the first image, and disparity characteristic of prior stereo images of prior patterned substrate. For example, the performance function can be computed as $\Sigma_i L_{sim}(f_i, m_i \circ \phi(f_i, m_t, w)) + L_{prior}(\phi(f_i, m_t, w))$, as discussed earlier.

In an embodiment, adjusting the one or more parameters of the model M0 is an iterative process, each iteration includes determining the performance function based on the disparity data DD1, and the reconstructed image. The iteration further includes determining whether the performance function is within the specified performance threshold; and in response to the performance function not being within the specified difference threshold, adjusting the one or more parameters of the model M0 to cause the performance function to be within the specified performance threshold. The adjusting may be based on a gradient of the performance function with respect to the one or more parameters. Once the model M0 is trained, the model M1 can be applied to determine depth information of any structure based on a single image (e.g., a normal SEM image) of any patterned substrate.

In an embodiment, the method 500 may further include steps for applying the trained model M1 during measurement or inspection of a patterned substrate. In an embodiment, the method 500 may include a process for obtaining, via the metrology tool, a SEM image of a patterned substrate at the first e-beam tilt setting of the metrology tool. The SEM image may be a normal image obtained by directing an e-beam approximately perpendicular to the patterned substrate. The method 500 may further include executing the model M1 using the SEM image as input to generate disparity data associated with the SEM image; and applying a conversion function (e.g., a linear function, a constant conversion factor, or a non-linear function) to the disparity data to generate depth information of the structure in the SEM image. The method 500 includes determining, based on the depth information, physical characteristics of the structure of the patterned substrate. In an embodiment, the physical characteristics may include a shape, a size, or relative positioning of polygon shapes with respect to each other at one or more depths of features of the structure.

In an embodiment, the processes described herein may be stored in the form of instructions on a non-transitory computer-readable medium that, when executed by one or more processors, cause steps of the present methods. For example, the medium includes operations including receiving, via a metrology tool (e.g., SEM tool), a normal SEM image of a structure on a patterned substrate. The normal SEM image being associated with an e-beam directed perpendicular to a pattered substrate.

Further, the medium includes operations to execute a model using the normal SEM image to determine depth information of the structure on the patterned substrate. As discussed herein, the model may be trained to estimate depth information from only a single SEM image and stored on the medium. For example, a model M1 (e.g., a CNN) may be trained using the method of FIG. 5.

In an embodiment, the medium is further configured to determine, based on the depth information, physical characteristics of the structure of the patterned substrate. For example, the physical characteristics include, but not limited to, a shape, a size, or relative positioning of polygon shapes with respect to each other at one or more depth of features of the structure.

In an embodiment, the medium is further configured to determine, based on the physical characteristics, a defect in the structure, the defect indicative of the structure not satisfying a design specification. Based on the defect, a parameter of one or more patterning process (e.g., resist or etching related parameters) may be adjusted to eliminate the defect in a subsequent process of the patterning process.

Figure 6B:
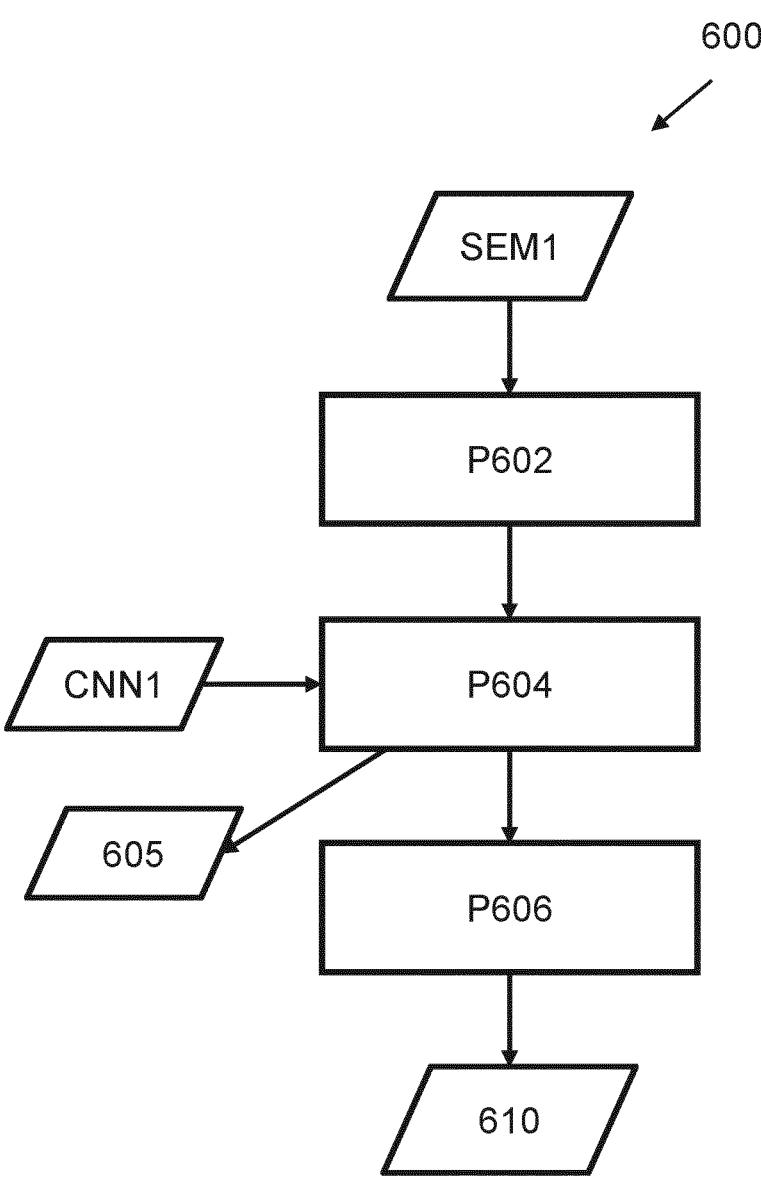
FIG. 6B is a flow chart of a method for determining depth information of a structure formed on a substrate using a model trained according to FIG. 5, according to an embodiment.

FIG. 6B is a flow chart of a method 600 for determining depth information of a structure formed on a substrate using a model trained according to FIG. 5, according to an embodiment. The depth information is determined based on a scanning electron microscope ("SEM") image of the structure. The depth information is determined using a convolutional neural network (CNN) trained to mimic a parallax effect present in pairs of stereo SEM images. The method 600 includes processes P602, P604, and P606. Process P602 involves receiving, via a SEM tool, a SEM image SEM1 of a structure patterned on a substrate.

Process P604 involves inputting the SEM image SEM1 to a CNN1 (an example of the model M1 trained according to the method 500) to predict disparity data 605 associated with the SEM image SEM1. In an embodiment, the CNN1 may be trained according to FIG. 5. For example, the CNN1 may be trained by: obtaining, via the SEM tool, a stereo pair of SEM images of a patterned substrate, the stereo pair including a first SEM image obtained at a first e-beam tilt setting of the SEM tool, and a second SEM image obtained at a second e-beam tilt setting of the SEM tool; generating using disparity data between the first SEM image and the second SEM image; combining the disparity data with the second SEM image to generate a reconstructed image of the first SEM image; and comparing the reconstructed image and the first SEM image.

Process P606 involves generating, based on the predicted disparity data 605, depth information 610 associated with the structure patterned on the substrate.

In an embodiment, the depth information can be further used to determine a defectiveness of structure by comparing CDs of the features at different depths and determining whether the CDs satisfy design specification. In an embodiment, the depth information may be used to determine one or more parameters of a patterning process such as resist process, etching process, or other patterning related process so that the 3D structure of the feature is within desired design specification.

In some embodiment, methods and systems are described herein for semi-supervised training of depth estimation model for structures formed on substrates and employing the trained model to predict depth data from a single SEM image. In some systems, to obtain depth information related to a structure, two images are obtained for the structure, a first at a normal beam incidence and a second with the beam at a tilt. However, adjusting alignment, in addition to being difficult and imprecise, is time consuming, which negatively affects manufacturing throughput.

The present disclosure overcomes these problems by using a machine learning model such as a convolutional neural network ("CNN") that uses a SEM image as input, to predict depth data associated with the SEM image. However, the use of a machine learning model poses an additional technical problem in that training data may be sparse and not properly diverse, resulting in poor predictions. To overcome this problem, the machine learning model described herein is trained to predict depth data for inputted SEM images based on plurality of simulated SEM images that are labeled with simulated depth data. For example, by using simulated depth data the system may fully control the amount and diversity.

While the use of simulated SEM images overcomes the technical problem of sparse training data, and using the simulated SEM images as input to the model provided qualitatively reasonable depth information, the depth information still does not typically match observed depth information. To overcome this second technical issue, the machine learning model as described herein comprises a second supervised calibration step. In particular, the machine learning model is calibrated to scale predicted depth data to correspond to observed depth data, as determined using a SEM tool, of actual SEM images. For example, to correct for this issue, the system scales predicted depth information to the depth information observed using a SEM tool or other metrology tool, and uses the scaled predicted depth information as a new ground truth for the subsequent training procedure.

Figure 7:
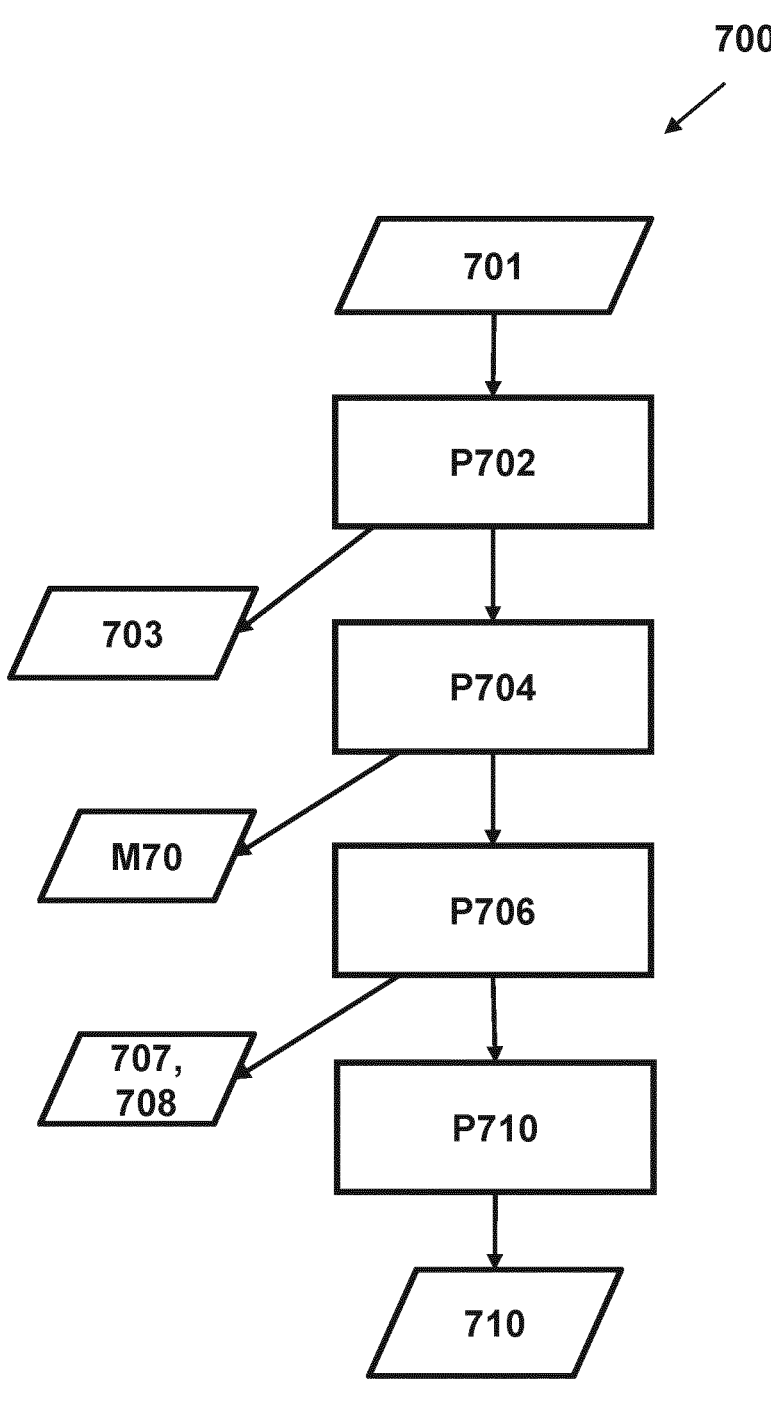
FIG. 7 is a flow chart of a method for generating a model configured to estimate depth data of a structure of a patterned substrate, according to an embodiment.

FIG. 7 is a flow chart of a method for generating a model 710 configured to estimate depth data of a structure of a patterned substrate, according to an embodiment. In an embodiment, the method 700 is a semi-supervised training of depth estimation model 710 for structures formed on substrates from SEM images of the structures. For example, in the semi-supervised training method, initially the depth estimation model 710 is trained using simulated data, further observed depth data of structures is used to modify model-predicted depth data, and the modified depth data is used as reference to further fine-tune the depth estimation model 710. The method 700 is further discussed in detail with respect to process P702, P704, P706, and P710.

Process P702 includes obtaining, via a simulator 701, a plurality of simulated metrology images 703 of a structure. Each of the plurality of simulated metrology images 703 is associated with depth data used by the simulator 701. For example, depth data used in the simulator 701 (also referred as simulator depth data) may be a shape, a size, a side wall angle, relative positioning of polygon shapes, a material, or depth related parameter associated with each layer of the substrate. The simulator 701 is configured to perturb the simulator depth data to generate simulated metrology images. For example, the simulator depth data that can be adjusted includes, but not limited to the shape of a resist profile of the structure in a resist layer, and the side wall angle of the resist profile. For each adjusted simulator depth data, a corresponding metrology image (e.g., SEM image) may be generated.

In an embodiment, the simulator 701 is a Monte-Carlo simulator configured to generate the simulated metrology images 703 of the structure by varying depth related parameters defined in the Monte-Carlo simulator. An example Monte-Carlo simulator configured to generate SEM images is discussed in "L. van Kessel, and C. W. Hagen, *Nebula: Monte Carlo simulator of electron-matter interaction*, SoftwareX, Volume 12, 2020, 100605, ISSN 2352-7110." The Monte-Carlo simulator is provided as an example, but the present disclosure is not limited to a particular simulator.

Process P704 includes generating, based on the plurality of simulated metrology images 703 and the corresponding simulated depth data, a model M70 configured to predict depth data from an inputted image.

In an embodiment, generating the model M70 is an iterative process. Each iteration includes predicting depth data, comparing the predicted data with the simulator data, and generating the model based on the comparison. For example, the process P704 includes inputting the plurality of simulated metrology images 703 to the model M70 to predict depth data associated with each of the plurality of simulated metrology images 703. The predicted depth data is compared with the simulator depth data. Based on the comparison, model parameters of the model M70 are adjusted so that the predicted depth data is within a specified matching threshold of the simulator depth data. For example, the predicted depth data has more than 90% matching with simulator depth data. For example, a height profile of the predicted depth data and the height profile of the simulator depth data are more than 90% similar. The model M70 is further fine-tuned based on observed data, which is a part of the semi-supervised training.

Process P706 includes obtaining a captured image 707 and observed depth data 708 of the structure patterned on a substrate. In an embodiment, the captured image 707 is obtained via an image capturing tool, and the observed depth data 708 are obtained from one or more metrology tools. In an embodiment, the image capture tool is a SEM tool and the captured images are SEM images. In an embodiment, the observed depth data is obtained from the metrology tool. The metrology tool being one or more of: an optical metrology tool configured to measure structure of the patterned substrate and extract depth information based on diffraction-based measurements of the patterned substrate, or an atomic force microscope (AFM). For example, the observed depth data 708 comprises height profile of the structure captured by an atomic force microscope tool (AFM), or shape parameter data captured by an optical scatterometry tool (e.g., Yieldstar). In an embodiment, the metrology tool is an optical metrology tool configured to measure structure of the patterned substrate and extract depth information based on diffraction-based measurements of the patterned substrate.

In an embodiment, the observed depth data includes one-dimensional height data of the structure traced from the captured image 707. Similarly, simulator depth data may include one-dimensional height data determined from simulated image of the structure on the patterned substrate. In an embodiment, the observed depth data includes two-dimensional height data of the structure traced from the captured image 707. Similarly, simulator depth data may include two-dimensional height data extracted from the simulated image of the structure on the patterned substrate. In another embodiment, the observed depth data includes shape parameters obtained from the optical metrology tool used to measure structure of the patterned substrate. Similarly, shape parameters may be extracted from the simulator depth data. As an example, one-dimensional height data includes height profile (e.g., height profile 3DD1 illustrated in FIG. 8B) of the structure along a cut line of the captured image 707. In an embodiment, the two-dimensional height data comprises the height of the structure along a first direction and a second direction on the captured image 707. In an embodiment, the shape parameters comprises one or more of a top CD measured at a top of the structure, a bottom CD measured at a bottom of the structure, or a side wall angle of the structure. For example, shape parameter data 3DD2 is illustrated in FIG. 8B.

Process P710 includes calibrating, based on the captured image 707 and the observed depth data 708, the model M70 to cause the predicted depth data to be within a specified matching threshold of the observed depth data 708. Upon calibration, the model M70 may be referred as the model 710, a trained model 710, or a calibrated model 710.

In an embodiment, calibrating the model M70 is an iterative process. Each iteration includes adjusting the predicted depth data in accordance with the observed data to generate modified predicted data for training. For example, each iteration includes inputting the captured image 707 to the model M70 to predict depth data. The predicted depth data is adjusted by comparing the predicted depth data and the observed depth data 708. Based the adjusted predicted depth data, model parameters of the model M70 may be adjusted to cause the model M70 to generate depth data that is within a matching threshold of observed depth data 708.

In an embodiment, adjusting of the predicted depth data includes: extracting, from the predicted depth data, one dimensional height profile of the structure along a given direction; comparing the predicted height profile with one dimensional height profile of the observed depth data 708 of the structure along the given direction; and modifying the predicted height profile to match the height profile of the observed depth data 708 of the structure.

In an embodiment, adjusting of the predicted depth data includes: extracting predicted shape parameters of the structure from the predicted depth data, and real shape parameters from the observed depth data 708; comparing the predicted shape parameters with the real shape parameters of the structure; and modifying the predicted shape parameters to match the real shape parameters.

In an embodiment, adjusting of the predicted depth data includes: deriving a predicted average height of the structure from the predicted depth data of the structure, and a real average height of the structure from the observed depth data 708; and scaling the predicted average height to match the real average height. For example, a scaling factor (e.g., a factor SF1 in FIG. 8C) computed as a ratio of an average height computed from the predicted depth data and an average height obtained from the optical scatterometry tool (e.g., Yieldstar).

Figure 8A:
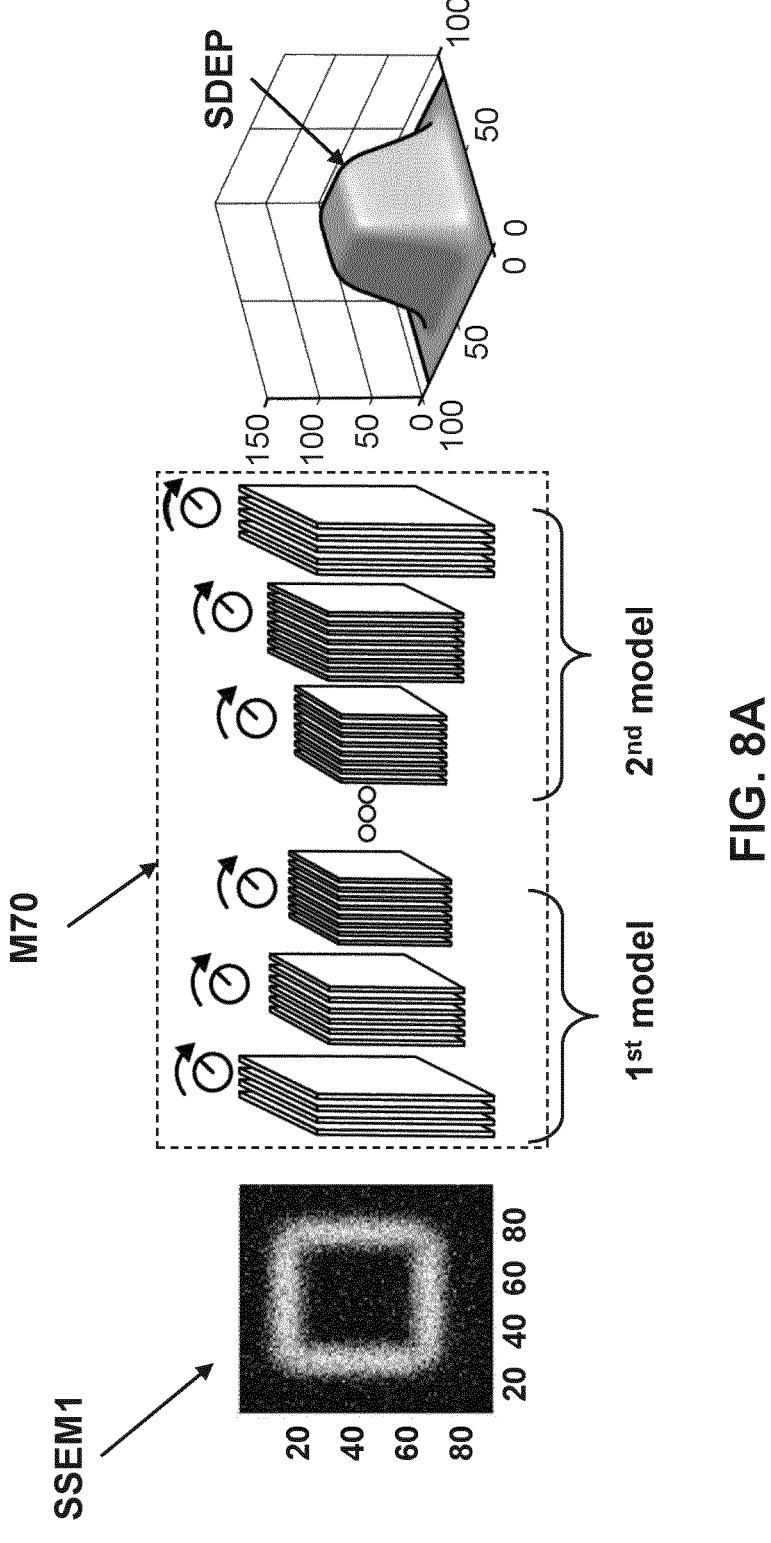
FIG. 8A illustrates exemplary training of a model using simulated SEM data, according to an embodiment.
Figure 8B:
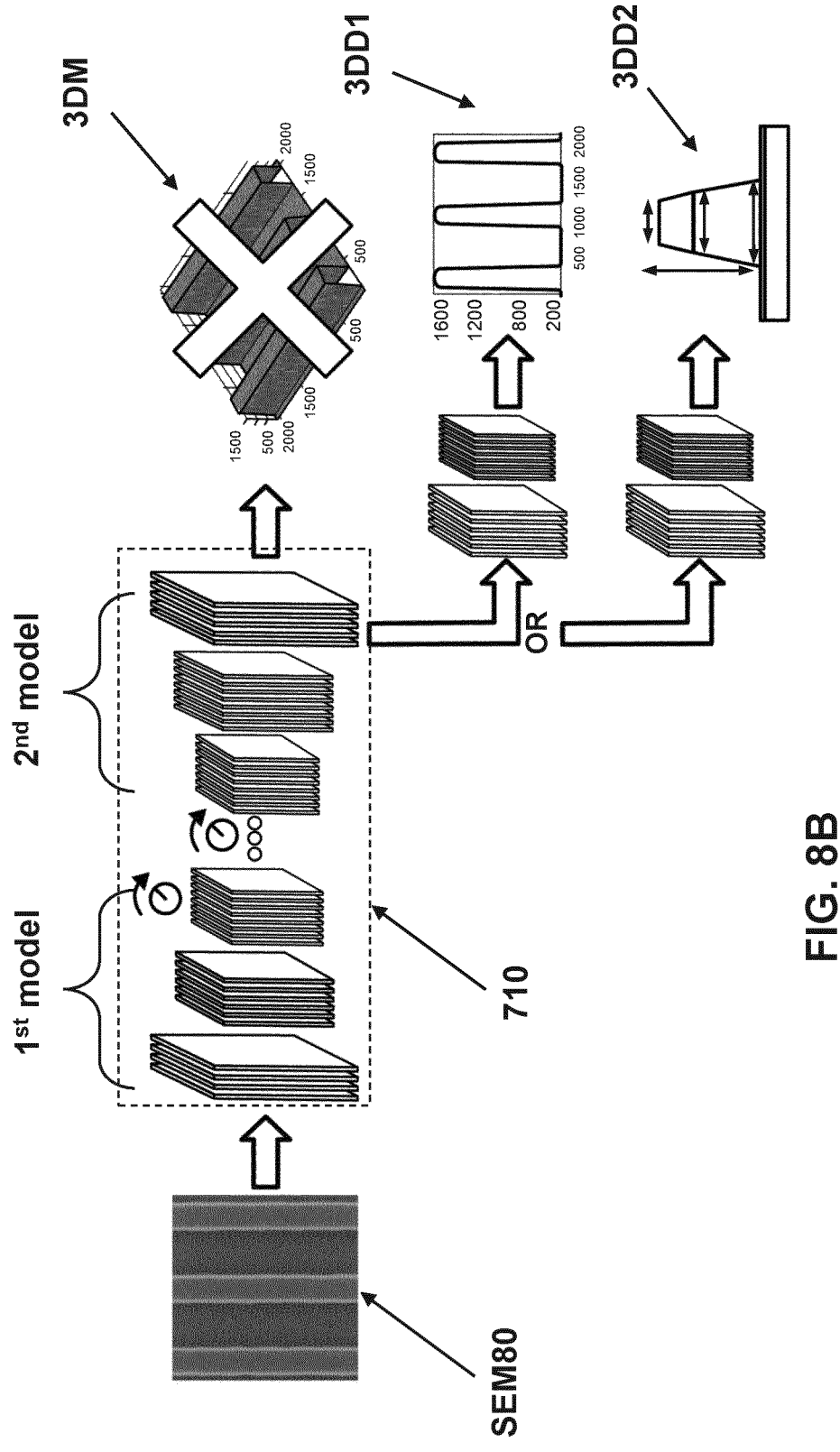
FIG. 8B illustrates exemplary fine-tuning of the model (of FIG. 8A) using metrology data, according to an embodiment.

FIG. 8A illustrates an example of generating an initial model M70 using simulated metrology image and simulated depth data (e.g., generated via a Monte-Carlo SEM simulator). In FIG. 8A, a convolutional neural network M70 (e.g., with a encoder-decoder, U-net, or Res-net architecture) is trained based on a sufficiently large dataset generated from a Monte-Carlo SEM model. The advantage of using simulated data at this step is it provides full control over the amount and diversity (e.g. SEM settings, feature geometries and feature materials) of training examples.

As an example, a synthetic or simulated SEM image SSEM1 generated by the SEM model and corresponding simulator data SDEP can be used to train the initial CNN M70. In an embodiment, the CNN M70 predicts depth data, which is compared with the simulated data SDEP. Based on the comparison, one or more weights and biases of one or more layers of the CNN are adjusted so that the predicted data matches the simulated data SDEP. In an embodiment, a difference between the predicted depth data and depth data extracted from the simulated data SDEP may be computed. During the training of the CNN M70, in each iteration, the weights and biases are modified so that the difference between predicted and simulated data is reduced. In an embodiment, the training processes terminates when the difference cannot be reduced further in subsequent iterations. At the end of the training the model M70 is sufficiently trained to predict depth data from an input SEM image. However, as mentioned earlier, the predicted data by the CNN M70 may not accurately correspond to observed data.

Figure 8C:
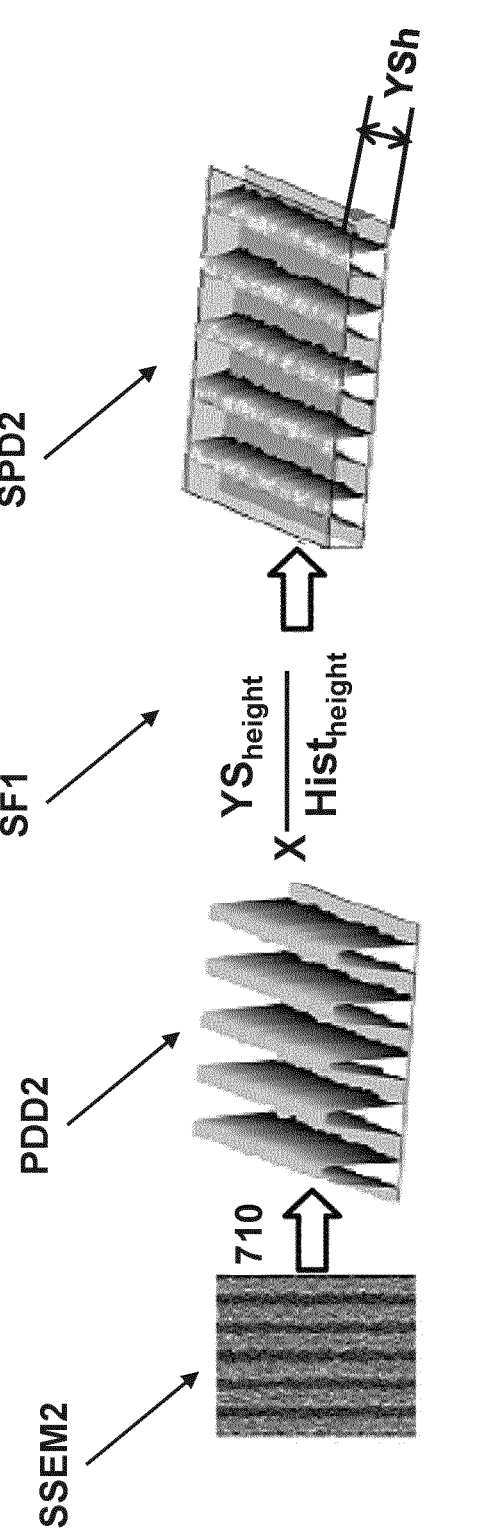
FIG. 8C illustrates exemplary scaling of the estimated depth data generated by the model of FIG. 8A based on observed metrology data, the scaled estimated data can be further used in fine-tuning the model, according to an embodiment.

As such, the CNN M70 is further fine-tuned as discussed with respect to FIGS. 8B and 8C.

FIG. 8B illustrate example of observed depth data obtained from different metrology tools (e.g., AFM, SEM, or Yieldstar) that can be used to fine-tune the model CNN M70. In the present example, a subset of paired experimental SEM images SEM80 and metrology depth data 3DD1 or 3DD2 (e.g., from metrology tool Yieldstar or AFM) is generated. The experimental SEM images SEM80 as input to the CNN M70 to provide qualitatively reasonable depth data 3DM such as height maps. However, in an embodiment, predicted height maps 3DM may not match the observed height maps 3DD1 or 3DD2. For example, the height map 3DD1 is a 1D height map across a cut line of an AFM data, and height map 3DD2 is a 2D height map obtained from optical scatterometry tool (e.g., Yieldstar). To correct for this, the predicted height maps may be scaled to the observed height data 3DD1 or 3DD2. The scaled predicted height maps serve as new ground truth for the subsequent training procedure.

In an embodiment, the CNN M70 may be layers that may for instance include convolutions with kernels that model the finiteness of an AFM tool tip. In an embodiment, additional layers corresponding to a metrology tool may be augmented in the CNN M70. Thus, during fine-tuning model parameters associated with such particular layers augmented in the CNN M70 may be adjusted. In an embodiment, the experimental dataset will typically be limited by the limitation of the metrology tool (e.g., AFM or YS), as such only a subset of the degrees of freedom (e.g., layers) of the CNN M70 is optimized while the rest of the layers are kept unchanged. In one embodiment, a correction bias in a latent space variable may be employed in training CNN M70. For example, the latent space variable z may be computed as follows:

$$z'=z+\Delta z,$$

In the above equation, $\Delta z$ is a vector of the same dimension as z. $\Delta z$ (or the norm thereof) can be used as a measure for the difference between the synthetically trained model (e.g., CNN M70) and the calibrated model (e.g., 710). Ideally, this distance will be relatively small. In another embodiment, the weights and biases of last encoder layer are used as degrees of freedom.

FIG. 8C illustrate an example adjustment of the predicted depth data based on the observed data from an optical metrology tool (e.g., Yieldstar) configured to measure a patterned substrate. In the present example, an experimental SEM image SSEM2 is input to the CNN M70 to generate a qualitatively reasonable height map PDD2, but an average height does not match the observed height YSh provided by an optical tool (e.g., Yieldstar). To correct for this, the predicted height map PDD2 may be scaled using a scaling factor SF1 to the height observed YSh. For example, the scaling factor may be computed as a ratio of an average height of the height observed YSh and an average height of the structure computed from the predicted height map PDD2. Multiplying the predicted height map PDD2 with the scaling factor SF1 generates a scaled predicted height map SPD2, which is used as new ground truth for the subsequent training procedure to generate a fully trained CNN 710 (e.g., in FIG. 8B).

In an embodiment, a get/set experiment results show that predicted depth data using the calibrated model 710 closely follow programmed depth data used in an experiment. For example, the depth of individual contacts holes predicted by the model 710 (get depth) closely follows the depth programmed in the geometry (set depth) that was used to generate the simulated SEM image. Similarly, extracted side-wall angle of edges from simulated data closely follow the simulated SEM image. In an embodiment, brightness and contrast settings in simulated images may be varied during the training process of the model 710, so that predictions from the deep-learning network are independent of brightness and contrast settings.

The calibrated model 710 is capable of handling various physical effects caused during SEM image capture or during a patterning process. For example, the model 710 is capable of making good predictions even in a presence of a charging effect in a SEM image, as illustrated in FIGS. 9A-9C.

Figure 9A:
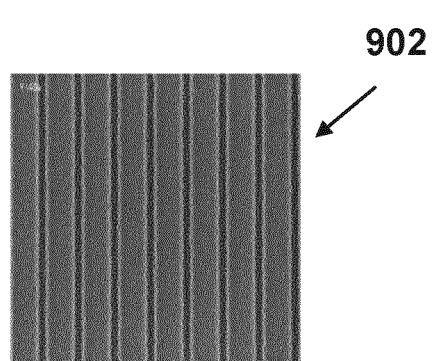
FIGS. 9A, 9B, and 9C illustrate SEM image with charging effect, predicted depth data with charging effect, and predicted depth data without charging effect, respectively, according to an embodiment.
Figure 9B:
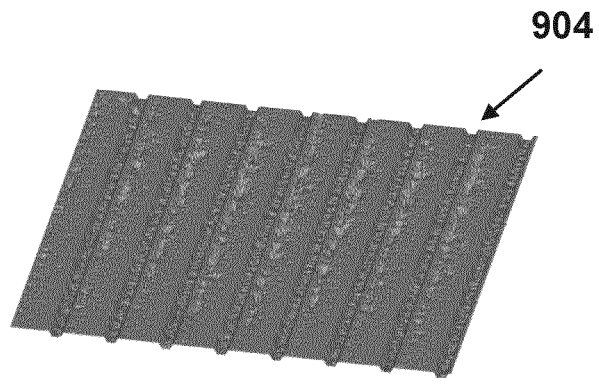
Figure 9C:
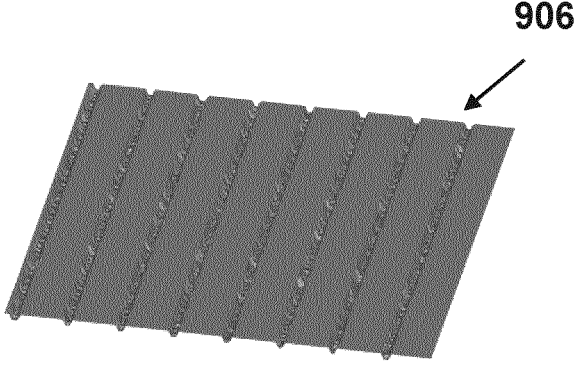

FIG. 9A is an exemplary SEM image 902 including charging artifacts. For example, in the SEM image 902 of line-space features, SEM charging artifacts are seen just right of trenches where the SEM signal is reduced compared to at the edge of the trench. When such SEM image 902 having charging effect is inputted to the initial model M70 (e.g., in FIG. 7), the predicted height maps are affected by this reduction in SEM intensity, as shown (see right of the trenches) in the predicted height map 904 in FIG. 9B. To correct for this, a fine-tuning or further calibration step was employed in the training process of the model M70, as discussed earlier. In such calibration step, the predicted data is adjusted to assume the lines for the new training set to have a flat surface. When such adjusted predicted data is used to generate calibrated model 710 (e.g., in FIG. 7), the predicted height maps (by the model 701) do not suffer from charging anymore, but do have a flat surface on top of the lines, as shown the predicted height map 906 in FIG. 9C. This example serves as a proof-of-principle that, in an embodiment, a deep-learning network (e.g., CNN) is taught to recognize artifacts not present in the simulated dataset, and perform a non-linear correction based on the observed data.

Figure 10A:
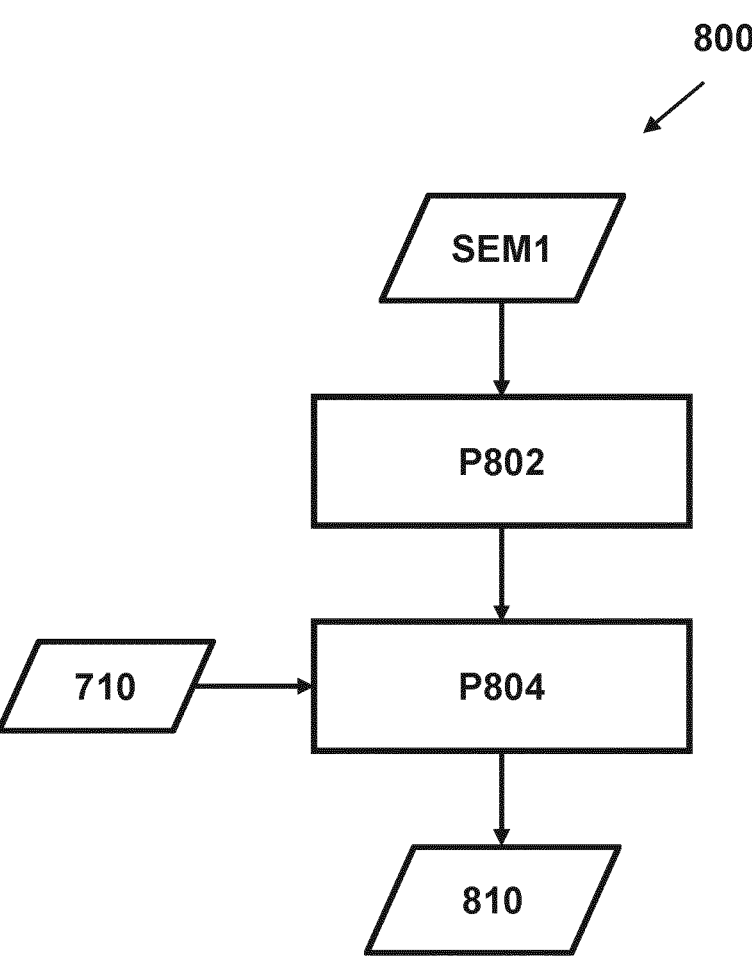
FIG. 10A is a flow chart of a method for estimating depth data by using a trained model (of FIG. 7) using a single SEM image as input, according to an embodiment.

FIG. 10A is a flow chart of a method for estimating depth data by using the trained model 710 (of FIG. 7) using a single SEM image as input. The method 800 includes processes P802, and P804. In an embodiment, the process P802 includes receiving a SEM image SEM1 of a structure patterned on a substrate. In an embodiment, process P804 includes predicting, via a the CNN (e.g., the model 710) using the SEM image as input, depth data 810 associated with the SEM image. As discussed earlier, the CNN (e.g., the model 710) may be trained to predict depth data for inputted SEM images based on plurality of simulated SEM images that are labeled with simulated depth data; and further calibrated using scaled predicted depth data, where the scaled predicted data correspond to observed depth data, as determined using a SEM tool, of captured SEM images of the structures patterned on the substrate.

For example, training of the CNN 710 includes receiving, via a SEM tool, a captured SEM image and observed depth data associated with the captured SEM image of the structure patterned on the substrate; inputting the captured SEM image to the model to predict depth data; adjusting the predicted depth data by comparing the predicted depth data and the observed depth data; and tuning, based on the adjusted predicted depth data, the model to cause the predicted depth data to be within a specified matching threshold of the observed depth data.

In an embodiment, the estimated depth data comprises physical characteristics of the structure of the patterned substrate. For example, the physical characteristics comprising a shape (e.g., resist profile), a size, a side wall angle (e.g., an angle of the resist profile), or relative positioning of polygon shapes with respect to each other at one or more depth of features of the structure.

Figure 10B:
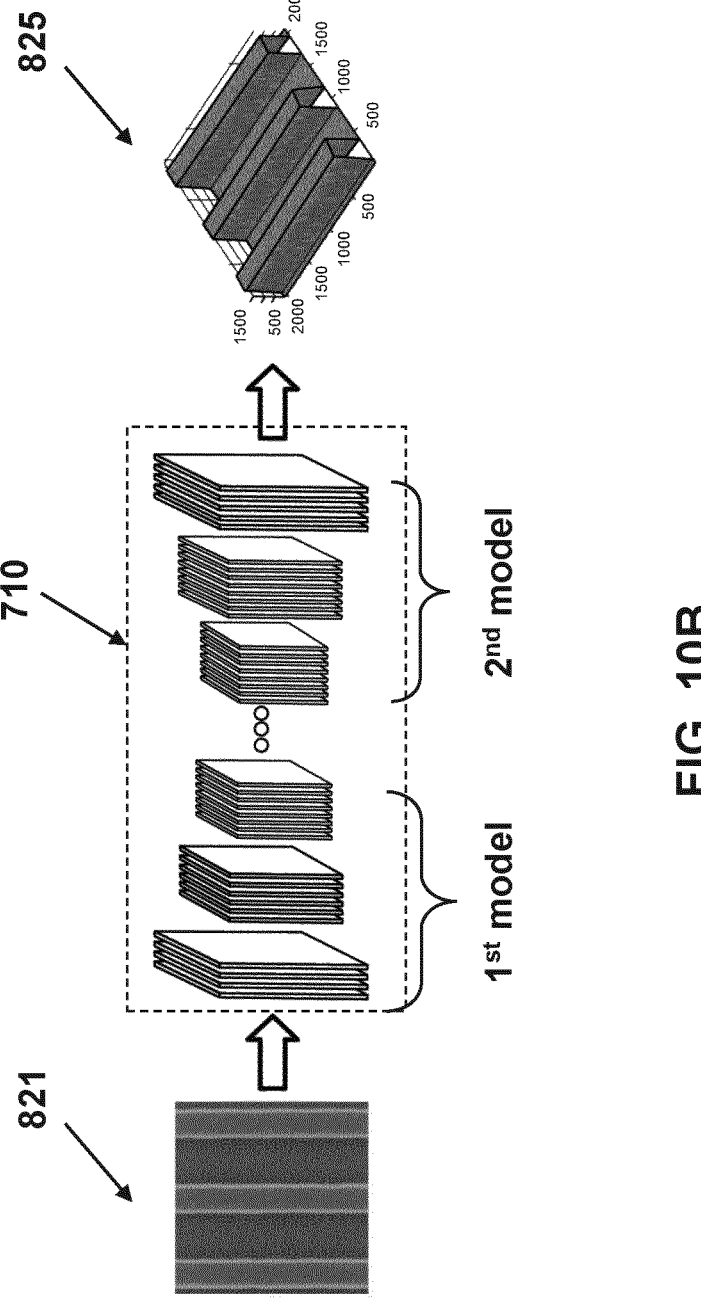
FIG. 10B illustrates exemplary depth data estimated using the trained model, according to an embodiment.

FIG. 10B illustrates example of using the trained model 710 to predict depth data 825 (e.g., a height map) using a SEM image 821 as input. As shown, the model 710 predicts 3D information from the 2D data in the SEM image.

In an embodiment, instead of using a SEM simulator to train a depth estimation model with paired data, a calibrated deterministic or stochastic process model (e.g., resist model) may be employed to generate training data. In case an accuracy of the process model may be insufficient, the process models may be fine-tuned with a limited set of experimental depth data (e.g. from AFM or Yieldstar). In an embodiment, depending on the type of the process model (deterministic or stochastic), two separate methods are described herein.

In an embodiment, using a resist model instead of a SEM model for generating training data (e.g., depth maps and corresponding SEM images) has several advantages. For example, the SEM images corresponding to simulated resist profiles are experimental images, while the SEM images generated by the SEM model are synthetic. A process model (e.g., a resist model) can be well calibrated to wafer data, either by including or not a SEM simulator.

Figure 11:
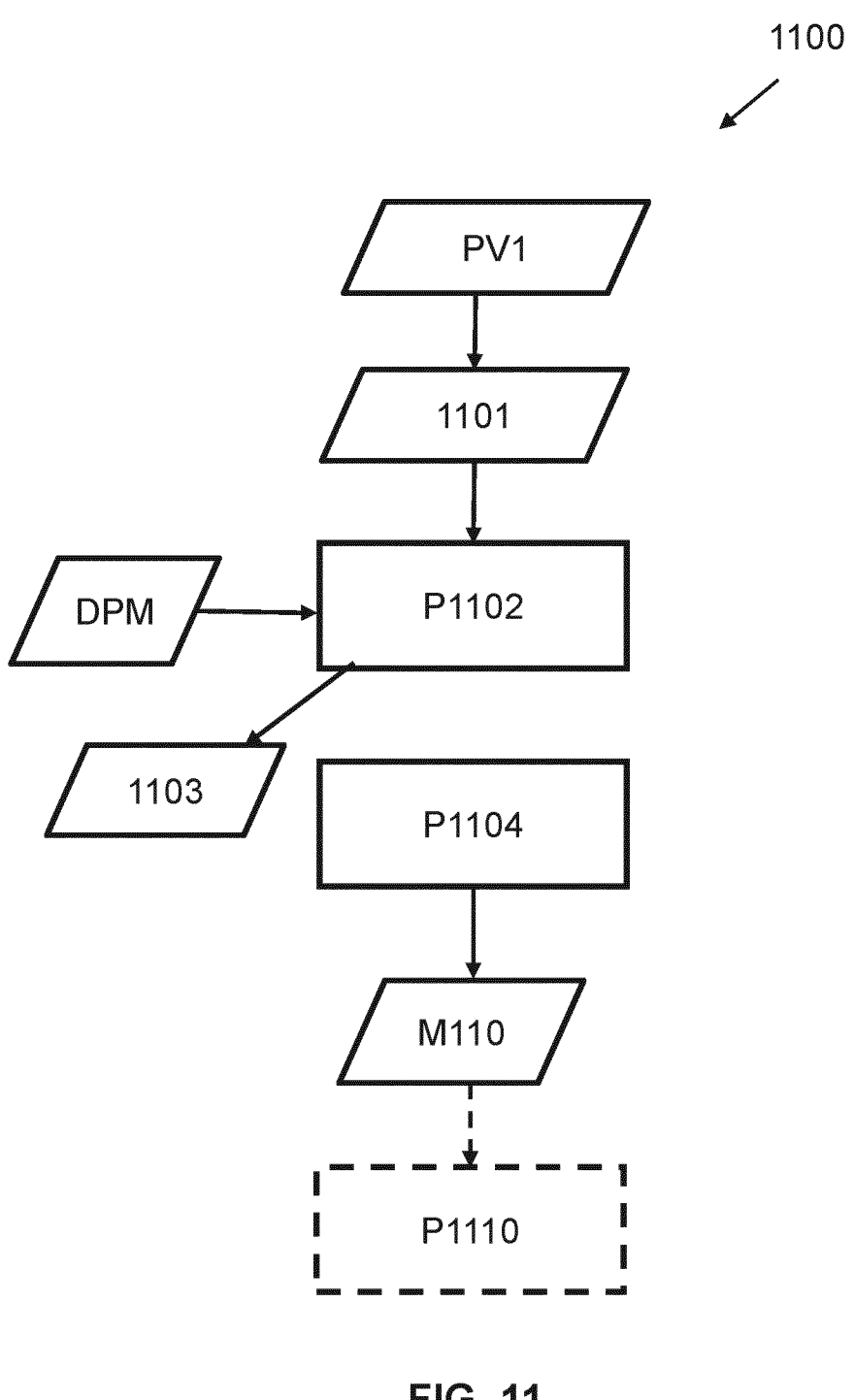
FIG. 11 is a flow chart of another method for training a model for estimating depth information of a structure of a patterned substrate, according to an embodiment.

FIG. 11 is a flow chart of a method 1100 for generating a model configured to estimate depth data of a structure of a patterned substrate. For example, depth data of structures including one or more features such as lines, bars, contact holes, other features or a combination of features. In an embodiment, the model is trained using training data generated as a pair of SEM images and corresponding simulated 3D profiles that may be formed on a substrate. The simulated profiles may be generated via a calibrated process model (e.g., a calibrated resist model). In an embodiment, the calibration is performed to meet a critical dimension criteria associated with the structures. In an embodiment, the process model calibration may involve comparing height of 3D simulated geometry to height extracted from atomic force microscopy (AFM) data or optical metrology data. In an embodiment, the model is a CNN trained using a generative adversarial network (GAN), encoder-decoder network, or other machine learning related training methods. For example, the model includes a first model (e.g., a generator model or encoder model) and a second model (e.g., discriminator model or decoder model) that are trained together. In an embodiment, both the first model and the second model may be CNN models. An example implementation of the method 1100 includes process P1102 for obtaining training data and process P1104 for generating the model based on the training data. The processes P1102 and P1104 are discussed in detail below.

Process P1102 includes obtaining (i) a plurality of SEM images 1101 of structures associated with programmed variations PV1 in a mask pattern and (ii) simulated profiles 1103 of the structures based on the programmed variations PV1, each SEM image of the plurality of SEM images 1101 being paired with a simulated profile corresponding to a programmed variation in the mask pattern.

In an embodiment, the programmed variations PV1 includes variations in one or more of: assist feature variations associated with the mask pattern, main feature variations associated with the mask pattern, or resist coated thickness variations. In an embodiment, the assist feature variations includes modifying a size of an assist feature of the mask pattern, a distance of the assist feature to a main feature of the mask pattern, or both. In an example, a first programmed variation may be change in size of the assist feature, and a mask including the first programmed variation may be manufactured. Employing the mask having the first programmed variation, a substrate may be patterned (e.g., via a lithographic apparatus). Further, a SEM image of the patterned substrate may be captured via a SEM tool. As such, the captured SEM image includes features related to the first programmed variation in the mask. In another example, a second programmed variation in the mask pattern may be modification of a shape of a main feature of the mask pattern. A substrate may be patterned using a mask having the second programmed variation, and another SEM image of the patterned substrate may be captured so that the SEM image includes variations related to the second programmed variation. Such SEM images corresponding to the first, second, third, etc. programmed variations PV1 may be obtained and included in the training data.

In an embodiment, the training data may further include the simulated profiles 1103 of the structures. In an embodiment, the simulated profiles 1103 may be 3D profiles (e.g., resist profiles) that may be formed on the substrate. Such 3D profiles may be generated by a process model (e.g., resist model). In an embodiment, the simulated profiles 1103 are generated by a calibrated deterministic process model DPM associated with a patterning process using the programmed variations PV1 in the mask pattern. For example, the first programmed variation (e.g., change in assist feature size), the second programmed variation (e.g., change in shape of the main feature), or other programmed variation may be inputted to the calibrated process model resulting in the simulated profiles 1103. Each of these simulated profiles 1103 is a 3D profile may include variations in 3D profile caused by a corresponding programmed variation in the mask pattern. As such, the SEM images 1101 and the simulated profiles 1103 may be paired according to the programmed variations PV1.

In an embodiment, the calibrated deterministic process model DPM is a process model calibrated using inspection data of patterned substrate (also referred as wafer data) such that the simulated process model generates simulated 3D profiles of the structures that is within a desired range of measured critical dimensions (CD) of structures of the patterned substrate. In an embodiment, the deterministic process model DPM may not be calibrated to meet local CD uniformity, line edge roughness (LER), line width roughness (LWR) related to line space features, contact edge roughness related to contact hole features, or stochastic variations associated with the structure. In other words, the calibrated deterministic process model DPM may simulate profiles of the structure that meet CD requirements. In another embodiment, a process model may be calibrated to meet the LCDU, LER, LWR, or other stochastic variations associated with physical characteristics of the structure.

Process P1104 includes generating, based on the plurality of SEM images 1101 paired with the corresponding simulated profiles 1103, a model M110 to estimate depth data of a structure such that the estimated depth data is within acceptable threshold of depth data associated with the simulated profiles 1103. For example, the model M110 may be trained such that the estimated height map is more than 90% similar to the height map extracted from the simulated profiles 1103.

In an embodiment, the generated depth data may include height data of the structure, shape parameters of the structure, voxel map of overhanging features, or other depth characteristic of the structure. In an embodiment, the shape parameters comprises one or more of a top CD measured at a top of the structure, a bottom CD measured at a bottom of the structure, or a side wall angle of the structure.

In an embodiment, generating of the model M110 may be based on a generative adversarial network architecture, encoder-decoder network, Res-net, or other machine learning architectures. For example, conditional GANs learn a mapping from observed image x (e.g., SEM images 1101) and random noise vector z, to output y (e.g., simulated profiles 1103), which is represented as G:{x, z}→y. In an embodiment, the generator G is trained to produce outputs that cannot be distinguished from reference images (e.g., "real" images) by an adversarial trained discriminator D, which is trained to perform as well as possible at classifying the generated images as "fakes". For example, in GAN training, G tries to minimize an objective against an adversarial D that tries to maximize it. The generator may be an encoder-decoder, or U-net.

In an embodiment, generating of the model M110 includes: training a first model (e.g., CNN1) in conjunction with a second model (e.g., CNN2) such that the first model generates depth data using a SEM image of the plurality of image as input, and the second model to classify the generated depth data as a first category (e.g., real) or a second category (e.g., fake) based on the paired simulated profile. In an embodiment, the first model and the second model are convolutional neural network (CNN), or deep CNN. After the training process, the first model (e.g., CNN1) may be employed as the model M110 to generate depth data for any inputted SEM image.

In an embodiment, generating of the model M110 includes inputting a SEM image of the plurality of SEM images 1101 to the first model; estimating, by executing the first model, the depth data for inputted SEM images; classifying, via a second model using the simulated profiles 1103 as reference, the estimated depth data as a first category (e.g., real) indicative that the estimated depth data correspond to the reference or a second category (e.g., fake) indicative that the estimated depth data does not correspond to the reference; and updating model parameters of both the first model and the second model to cause the first model to estimate depth data such that the second model classifies the estimated depth as the first category. In an embodiment, the model parameters are weights and biases of one or more layers of the CNN or DCNN.

Figure 12:
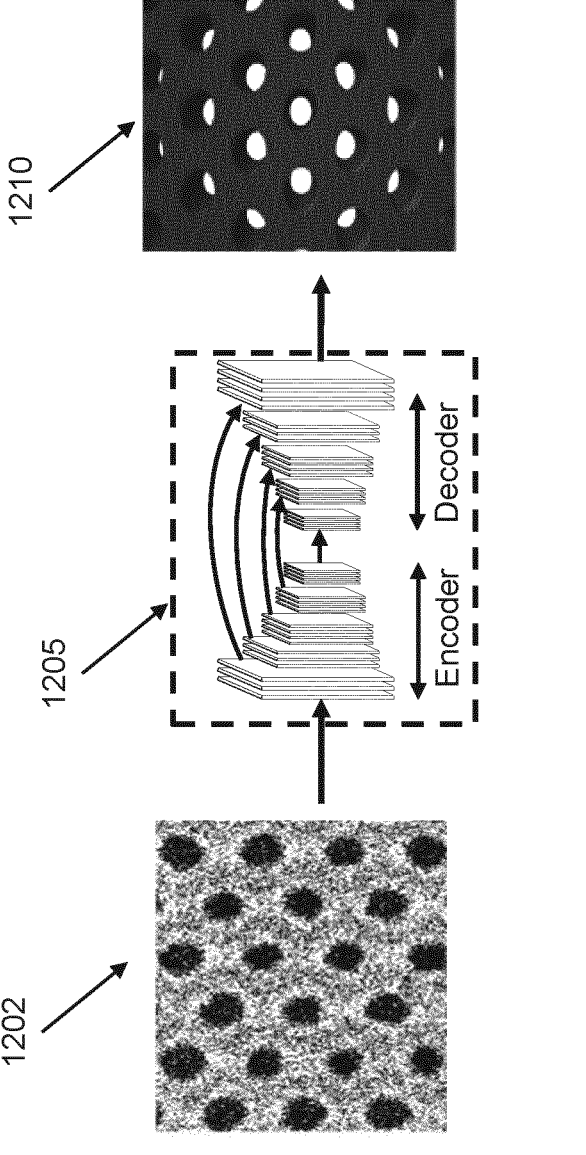
FIG. 12 illustrates exemplary training of a CNN based on method of FIG. 11, where training data generated by a deterministic process simulator is used, according to an embodiment.

FIG. 12 illustrates an exemplary training of a model 1205 using an encoder decoder architecture and training data including paired SEM image I202 and simulated profile data 1210. The simulated profile 1210 here is only an example and may not correspond to exactly the same mask pattern as the SEM image neither the simulated profile 1210 is calibrated. In an embodiment, the model 1205 may be trained using GAN architecture. In an embodiment, the simulated profile data 1210 represents an averaged 3D resist profile 1210 that describes a mean 3D behavior of inspected features of a patterned structure (e.g., the features may be an array of contact holes). In the present case, the deterministic resist model (an example of the calibrated deterministic process model DPM) may be employed for generating simulated 3D resist profiles 1210 of a structure.

To introduce local profile variations for training the model 1205, programmed variations in a mask pattern (e.g., sub-resolution assist features (SRAF) variations) within a field of view may be performed to cause variations in the feature profiles (e.g., contact hole profiles) on the substrate. In an embodiment, the programmed variations refer to physical changes made to the mask pattern. Such physical changes to the mask pattern may cause changes the 3D profile patterned on a physical substrate. Thus, for each programmed variation, a corresponding 3D profile may be obtained. In an embodiment, the programmed variations and data generated therefrom is employed as training data for training models discussed herein. In an embodiment, the programmed variations include changes in a size, a distance-to-main-pattern of the SRAF, or both that would affect CD and 3D profile. Based on such programmed variations, patterned substrates may be produced and SEM images of the patterned substrate captured. In an embodiment, the programmed variations in the mask pattern are used for generating training data, and are different from variations in the mask pattern (e.g., OPC related) performed to improve a lithographic process.

In an embodiment, the programmed variations in the mask pattern may be used in a simulation process of a lithographic process configured to generate simulated 3D profiles 1210. For example, mask pattern data (e.g., in GDS format) can be changed according to the programmed variations and the corresponding mask data (e.g., modified GDS) can be employed in the simulation using the deterministic model DPM to generate simulated 3D profile. For example, the programmed variations such as changes in size, shape, distance-to-main-pattern of the SRAF etc. that are implemented on the physical mask, discussed above, can be used in the simulator to generate corresponding simulated 3D profile. As such, a correspondence between observed data and simulated data may be established based on the programmed variations. In an example, a convolutional neural network (CNN) may be trained for directly mapping the SEM data 1202 to the simulated 3D resist profiles 1210. It can be understood that ADI images are for illustration purposes only.

Referring back to FIG. 11, in an embodiment, the method 1100 may further include a process P1110 for applying the trained model 1110. For example, applying of the model 1110 includes receiving, via a SEM tool, a SEM image of a structure patterned on a substrate; and determining, via the model using the received SEM image as input, depth data associated with the SEM image.

In an embodiment, based on the depth data, physical characteristics of the structure of the patterned substrate may be determined. The physical characteristics may include a shape, a size, or relative positioning of polygon shapes with respect to each other at one or more depth of features of the structure. In an embodiment, the physical characteristics may be compared with desired physical characteristics to determine any defect in the structure. The defect may be indicative of the structure not satisfying a design specification (e.g., CD within desired CD limit). Based on the defect, one or more parameter (e.g., dose, focus, resist characteristics, etc.) of a patterning process may be adjusted to eliminate the defect in a subsequent process of the patterning process.

Figure 13:
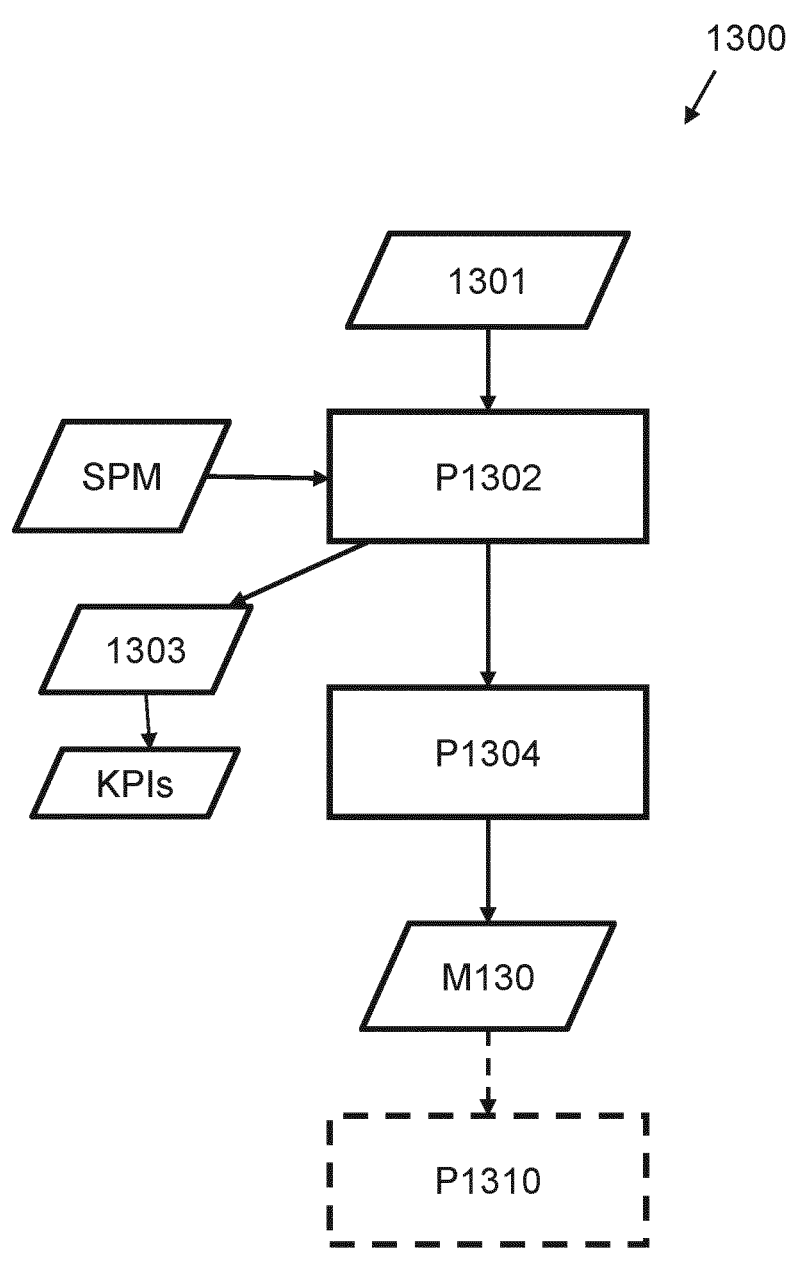
FIG. 13 is a flow chart of yet another method for training a model for estimating depth information of a structure of a patterned substrate, according to an embodiment.

FIG. 13 is a flow chart of a method 1300 for generating a model M130 configured to estimate depth data of a structure of a patterned substrate. In an embodiment, the model is trained using training data including a plurality of SEM images and a plurality of simulated profiles that are unpaired. For example, a particular SEM image is not paired with a particular simulated profile. In an embodiment, each SEM image of the plurality of SEM images may correspond to one or more simulated profiles. In the present method, the simulated profiles being generated via a calibrated process model (e.g., a calibrated stochastic model) that is configured to account for stochastic variations in physical characteristics associated with a structure. In an embodiment, the method 1300 may include process P1302 for obtaining training data and P1304 for generating the model for estimating depth data. These processes P1302 and P1304 are further discussed in detail below.

Process P1302 includes obtaining (i) a plurality of SEM images 1301 of structures, (ii) simulated profiles 1303 of the structures, and (iii) key performance indicators (KPIs) associated with the simulated profiles 1303. In an embodiment, the plurality of SEM images may be obtained from an image capture tool such as SEM tool configured to capture an image of structures on a patterned substrate. The SEM images may be 2D images such as a top-view SEM image. In an embodiment, the simulated profiles 1303 of the structures may be 3D profiles of the structures that are generated via a calibrated process model SPM associated with a patterning process. In an embodiment, the plurality of SEM images 1301 and the simulated profiles 1303 are unpaired.

In an embodiment, the calibrated process model SPM is a process model calibrated to generate 3D profiles of structures such that the 3D structures satisfy on or more KPIs extracted from the 3D structures. In an embodiment, the KPIs may include, but not limited to, critical dimension (CD) of a structure, local CD uniformity (LCDU) associated with the structure, line edge roughness (LER) associated with the structure, defect rates associated with the structure, line width roughness (LWR) related to line space patterns, contact edge roughness related to contact holes, stochastic edge placement error (SEPE) associated with the structures, other stochastic variations associated with geometry of the structure, or a combination thereof. In an embodiment, the calibration may be based on comparison between inspected wafer data and model generated data.

Process P1304 includes generating, based on (i) the plurality of SEM images 1301, (ii) the simulated profiles 1303, and (iii) the KPIs, a model M130 to estimate depth data of a structure such that KPIs associated with the estimated depth data is within acceptable threshold of the KPIs associated with the simulated profiles 1303. In an embodiment, the estimated depth data includes at least one of: height data of the structure, shape parameters of the structure, or voxel map related to overhanging structures. In an embodiment, the shape parameters comprises one or more of a top CD measured at a top of the structure, a bottom CD measured at a bottom of the structure, or a side wall angle of the structure.

In an embodiment, generating the model M130 may be based on generative adversarial network, encoder-decoder network, or other machine learning related networks. For example, generating of the model M130 includes training a first model (e.g., G1 in FIG. 14) and a second model (e.g., DS in FIG. 14). In an embodiment, for example, referring to a GAN architecture, the first model may be a generator model, and the second model may be a discriminator model. The training of the first model is performed in conjunction with the second model such that the first model generates depth data using a SEM image of the plurality of SEM image as input. The second model classifies the generated depth data into a first category (e.g., real) or a second category (e.g., fake) using the simulated profiles 1303 and the simulated KPIs associated with the simulated profiles 1303 reference data.

In an embodiment, the generating of the model is an iterative process. Each iteration includes inputting a SEM image of the plurality of SEM images 1301 to the first model; estimating, using the first model, the depth data for inputted SEM image; extracting KPI from the estimated depth data; classifying, via the second model using (i) the extracted KPI and (ii) the plurality of simulated profiles

1303 and simulated KPI of the plurality of simulated profiles 1303 as reference, the estimated depth data into the first category or the second category. In an embodiment, the first category—indicates that the estimated depth data correspond to the reference and the second category indicates that the estimated depth data do-not correspond to the reference. Further, model parameters of both the first model and the second model may be updated to cause the first model to estimate depth data such that the second model classifies the estimated depth as the first category (e.g., real).

Figure 14:
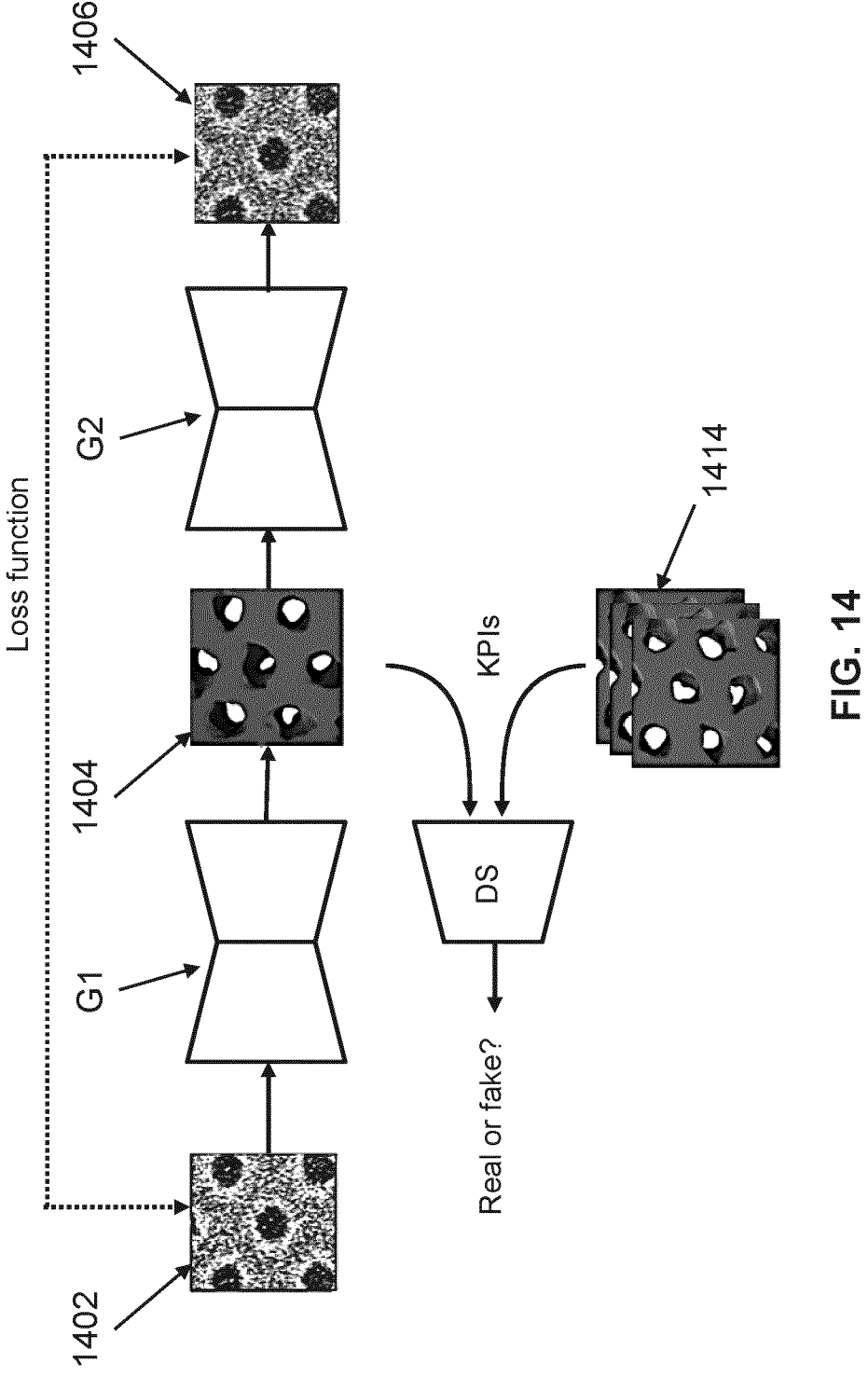
FIG. 14 illustrates exemplary training of a CNN based on method of FIG. 13, where training data generated by a deterministic process simulator is used, according to an embodiment.

In an embodiment, for example, using a cycle-GAN training, the first model (e.g., G1 of FIG. 14) may be further trained in conjunction with third model (e.g., another generator model G2 of FIG. 14). The third model may be configured to generate a SEM image from the estimated depth data. In other words, the first model and the third model are cycle-consistent. For example, the first model and the third model are trained so that the input of the first model closely matches the output of the third model using a loss function (e.g., a difference between images 1402 and 1406 in FIG. 14).

The training of the first model and the third model may be an iterative process. Each iteration includes inputting a SEM image of the plurality of SEM images 1301 to the first model; estimating, using the first model, the depth data for inputted SEM image; generating, via the third model using the estimated depth data as input, a predicted SEM image; and updating model parameters of both the first model and the third model to cause a difference between the inputted SEM image and the predicted SEM image to be within a specified difference threshold. In an embodiment, the first model, the second model, and the third model are convolutional neural network (CNN), or deep CNN. In an embodiment, the model parameters are weights and biases of one or more layers of the CNN or DCNN.

FIG. 14 illustrates an exemplary determination of a model for estimating depth data, according to the method 1300. In FIG. 14, a model G1 may be trained according to method 1300 to generate the model M130. In this embodiment, a stochastic process model (e.g., the stochastic resist model SPM) may be employed that eliminates the need for specific targeted profile variations (e.g., programmed variations). According to an example, one-to-one correlation is not possible between the CHs generated by a stochastic resist model and the CHs formed the wafer. In an embodiment, to circumvent this problem, cycle-consistent generative adversarial networks (cycle-GANs) may be adopted for learning the unpaired image to image translation between SEM image 1402, to simulated depth data 1414 to predicted SEM image 1406 by minimizing a loss function. In an embodiment, the 3D profiles showed are just examples and may not correspond to actual calibrated profiles against the showed SEM images For example, the loss function may be a difference between the SEM image 1402 and the predicted SEM image 1406. An example of cycle-GAN is discussed in reference "J. Zhu, T. Park, P. Isola and A. A. Efros, Unpaired Image-to-Image Translation Using Cycle-Consistent Adversarial Networks, 2017 IEEE International Conference on Computer Vision (ICCV), Venice, 2017, pp. 2242-2251." which is incorporated herein in its entirety by reference.

Referring to FIG. 14, metrology data or inspection data (e.g., SEM 1402) for CH arrays may be obtained from a metrology tool (e.g., SEM) by capturing an image or inspecting a patterned substrate. In an embodiment, multiple CH arrays are obtained from ADI for multiple cases, e.g., using a focus exposure matrix (FEM).

In an embodiment, a physical depth stochastic resist model (not illustrated) may be calibrated such that the stochastic model predicts well the CD distributions, LCDU, LER, LWR, defect rates, or other stochastic variations for the same conditions, as well a contrast curve for the same conditions during flat exposure. The stochastic model may be used to generate simulated profiles that have multiple examples of CD and resist height variations (e.g., due to the semi-open CHs), similar to the inspection data of the patterned substrate.

Further, a network (e.g., GAN) is trained using a dataset of unpaired depth resist profiles 1414 and SEM images 1402. For example, the GAN network includes a first model G1, a second model DS, and a third model G2. In an embodiment, the GAN network is trained to learn an effective way to transform SEM images 1402 to realistic depth resist profiles 1404 and then back to realistic SEM images 1406. For example, predictions from SEM image 1402 to depth resist profile 1404 by using the trained model G1.

In the present training example, the SEM image 1402 captured by a SEM tool may be input to a first model G1 (e.g., a generator of GAN) to generate depth data 1404. The depth data 1404 may be represented as a 3D profile of structures that may be formed on the substrate. For example, the depth data 1404 may be resist profile formed on a resist layer of a substrate. In an embodiment, KPIs (e.g., CD, LCDU, LER, LWR) may be extracted from the depth data 1404. In an embodiment, the depth data 1404 and the KPIs may be input to a second model DS (e.g., a discriminator of a GAN). In an embodiment, reference profiles 1414 may be generated using the stochastic process model, and reference KPIs may be extracted from the reference profiles 1414.

The depth data 1404 and the related KPIs is input to the second model DS, which is configured to classify the depth data 1404 into a first category (e.g., real) or a second category (e.g., fake) based on the reference KPIs and reference simulated profiles 1414. In an embodiment, the first category is indicative that the depth data 1404 is realistic or similar to the reference profiles 1414, while the second category is indicative that the depth data 1404 is not realistic or not similar to the reference profiles 1414.

In an embodiment, the first model G1 and the second model DS are trained to improve each other. As such, the first model G1 progressively generates depth data that is so realistic that the second model DS classifies the model generated depth data as belonging to the first category (e.g., real).

Alternatively or additionally, the first model G1 and the second model DS is further trained in cooperation of a third model G2 that generates a predicted SEM image 1406 using the depth data 1404 as input. During the training, model parameters of the first model G1 and the third model G2 are adjusted to reduce or minimize a difference between the predicted SEM image 1406 and the real SEM image 1402. Thus, the third model G2 may generate realistic SEM images 1406 for any depth data. In an embodiment, the model parameters of the second model DS may also be adjusted, since modifying G1 causes changes in G1 predictions, which in turn may affect classification by the second model DS. In other words, the three model when trained together may generate realistic depth data that is further verified by generating the predicted SEM image that is also realistic (similar to real SEM). As such, no pairing between training data may be needed, according to an embodiment.

Referring back to FIG. 13, in an embodiment, the method 1300 may further include a process P1310 for applying the trained model 1310. For example, applying the model include receiving, via a SEM tool, a SEM image of a structure patterned on a substrate; and determining, via the model using the received SEM image as input, depth data associated with the SEM image. In an embodiment, based on the depth data, physical characteristics of the structure of the patterned substrate may be determined. The physical characteristics comprising a shape, a size, or relative positioning of polygon shapes with respect to each other at one or more depth of features of the structure.

In an embodiment, comparing the physical characteristics with desired ranges, a defect in the structure may be detected. In an embodiment, KPIs associated with the physical characteristics may be compared with the desired KPI ranges to determine a defect. As such, the defect may be indicative of the structure not satisfying a design specification or performance specification. In an embodiment, based on the defect, a parameter of one or more patterning process may be adjusted to eliminate the defect in a subsequent process of the patterning process.

Figure 15:
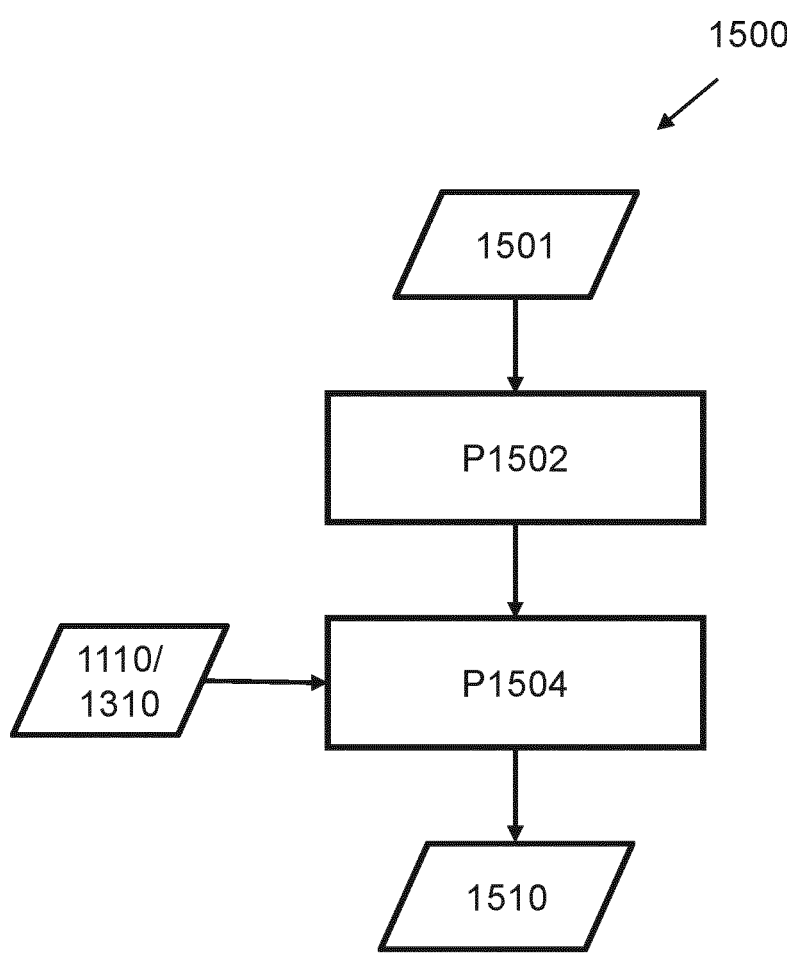
FIG. 15 is a flow chart of a method for estimating depth data by using a trained model (of FIG. 11 or 13) and using a single SEM image as input, according to an embodiment.

FIG. 15 is a flowchart of a method 1500 applying the model 1110 or the model 1310 trained according to the method 1100 or 1300 discussed herein. In an example, the method 1500 for estimating depth data for structures formed on substrates uses a convolutional neural network ("CNN") configured to estimate depth data based on a scanning electron microscope ("SEM") image of the structures, according to an embodiment. For example, the CNN may be trained according to 1100 or 1300. An example implementation of the method 1500 may include processes P1502, and P1504, further discussed below.

Process P1502 includes receiving a SEM image 1501 of a structure on a patterned substrate. For example, a normal SEM image may be captured by a SEM tool by projecting an e-beam perpendicular to the substrate. Alternatively, an optical image of the substrate may be captured via an optical tool and received in the process P1502.

Process P1504 includes estimating, via the CNN using the SEM image 1501 as input, depth data 1510 associated the structure of the patterned substrate. In an embodiment, the CNN may be trained using training data comprising a plurality of SEM images of structures and a plurality of simulated profiles of the structures. In an embodiment, the simulated profiles may be generated by a process model associated with a patterning process.

In some embodiments, the CNN may be a combination of a generator model (e.g., a first model or CNN1) and a discriminator model (e.g., a second model or CNN2) that are trained together (e.g., as discussed with respect to FIG. 11). For example, the training of the CNN is an iterative process, each iteration includes obtaining the plurality of SEM images and the plurality of simulated profiles, each SEM image paired with a simulated profile; inputting a SEM image of the plurality of SEM images to the generator model; estimating, using the generator model, the depth data for inputted SEM images; classifying, via a discriminator model using a simulated profile paired with the inputted SEM image as reference, the estimated depth data as a first category indicative that the estimated depth data correspond to the reference or a second category indicative that the estimated depth data does not correspond to the reference; and updating model parameters of both the generator model and the discriminator model to cause the generator model to estimate depth data such that the discriminator model classifies the estimated depth as first category.

In some embodiments, the CNN may be a combination of a generator model (e.g., a first model or CNN1) and a discriminator model (e.g., a second model or CNN2) that are trained together (e.g., as discussed with respect to FIG. 13). For example, the training of the CNN is an iterative process; each iteration includes inputting a SEM image of the plurality of SEM images to the generator model; estimating, using the generator model, the depth data for inputted SEM images; extracting, based on intensity values associated with the structure in the estimated depth data, key performance indicator (KPI) associated with the structure; classifying, via the discriminator model using (i) the extracted KPI and (ii) the plurality of simulated profiles and simulated KPI of the plurality of simulated profiles as reference, the estimated depth data as first category indicative that the estimated depth data correspond to the reference or a second category indicative that the estimated depth data does not correspond to the reference; and updating model parameters of both the generator model and the discriminator model to cause the generator model to estimate depth data such that the discriminator model classifies the estimated depth as the first category.

In an embodiment, the CNN may be further trained in conjunction with a second generator model (e.g., CNN3), the second generator model being configured to generate a SEM image from the estimated depth data. The training further including inputting a SEM image of the plurality of SEM images to the CNN; estimating, using the CNN, the depth data for inputted SEM images; generating, via the second generator model using the estimated depth data as input, a predicted SEM image; and updating model parameters of both the CNN and the second generator model to cause a difference between the inputted SEM image and the predicted SEM image to be within a specified difference threshold.

In an embodiment, the process model is a calibrated deterministic process model DPM that is calibrated such that critical dimension (CD) of simulated profiles of the structure is within a CD threshold of observed data associated with the patterned substrate, but not necessarily meet stochastic variation specifications associated with the observed data. In an embodiment, the process model is a calibrated stochastic process model that is calibrated such that key performance indicator (KPI) extracted from the model generated depth data is within a specified threshold of observed KPI extracted from inspection data associated with the patterned substrate. In an embodiment, the inspection data is obtained from a plurality of features of the patterned substrate, the plurality of features formed using a range of dose and focus conditions. In an embodiment, the KPI includes one or more of: CD of the structure, local CD uniformity (LCDU) associated with the structure, line edge roughness (LER) associated with the structure, defect rates associated with the structure, other KPIs indicative of performance of the patterning process.

As discussed earlier, the depth information can be further used to determine a defectiveness of structure by comparing CDs of the features at different depths and determining whether the CDs satisfy design specification. In an embodiment, the depth information may be used to determine one or more parameters of a patterning process such as resist process, etching process, or other patterning related process so that the 3D structure of the feature is within desired design specification.

In an embodiment, a base model (e.g., an untrained model) and the trained model may be a machine learning model comprises weights and biases as model parameters. During the training process, the weights and biases of the base model are continuously adjusted based on the training data. At the end of the training, the base model is referred as the trained model. In an embodiment, the trained model is convolutional neural network (e.g., CNN), a deep convolutional network (DCNN). The model parameters comprises weights and biases of one or more layers of the deep convolutional network.

Without limiting the scope of the present disclosure, applications of example supervised machine learning algorithms are described below.

Supervised learning is the machine learning task of inferring a function from labeled training data. The training data includes a set of training examples. In supervised learning, each example is a pair having an input object (typically a vector) and a desired output value (also called the supervisory signal). A supervised learning algorithm analyzes the training data and produces an inferred function, which can be used for mapping new examples. An optimal scenario will allow the algorithm to correctly determine the class labels for unseen instances. This requires the learning algorithm to generalize from the training data to unseen situations in a "reasonable" way.

Given a set of N training examples of the form $\{(x_1,y_1), (x_2,y_2), \ldots, (x_N,y_N)\}$ such that $x_i$ is the feature vector of the i-th example and $y_i$ is its label (i.e., class), a learning algorithm seeks a function $g:X{\rightarrow}Y$, where X is the input space and Y is the output space. A feature vector is an n-dimensional vector of numerical features that represent some object. Many algorithms in machine learning require a numerical representation of objects, since such representations facilitate processing and statistical analysis. When representing images, the feature values might correspond to the pixels of an image, when representing texts perhaps term occurrence frequencies. The vector space associated with these vectors is often called the feature space. The function g is an element of some space of possible functions G, usually called the hypothesis space. It is sometimes convenient to represent g using a scoring function $f:X{\times}Y{\rightarrow} \mathbb{R}$ such that g is defined as returning the y value that gives the highest score:

$$g(x) = \operatorname*{argmax}_{y} f(x, y).$$

Let F denote the space of scoring functions.

Although G and F can be any space of functions, many learning algorithms are probabilistic models where g takes the form of a conditional probability model $g(x)=P(y|x)$, or f takes the form of a joint probability model $f(x,y)=P(x,y)$. For example, naive Bayes and linear discriminant analysis are joint probability models, whereas logistic regression is a conditional probability model.

There are two basic approaches to choosing f or g: empirical risk minimization and structural risk minimization. Empirical risk minimization seeks the function that best fits the training data. Structural risk minimization includes a penalty function that controls the bias/variance tradeoff.

In both cases, it is assumed that the training set has a sample of independent and identically distributed pairs $(x_i,y_i)$. In order to measure how well a function fits the training data, a loss function $L:Y{\times}Y{\rightarrow} \mathbb{R}^{\geq 0}$ is defined. For training example $(x_i,y_i)$, the loss of predicting the value $\hat{y}$ is $L(y_i,\hat{y})$.

The risk R(g) of function g is defined as the expected loss of g. This can be estimated from the training data as $$R_{emp}(g) = \frac{1}{N} \sum_i L(y_i, g(x_i)).$$

Exemplary models of supervised learning include decision trees, ensembles (bagging, boosting, random forest), k-NN, linear regression, naive Bayes, neural networks, logistic regression, perceptron, support vector machine (SVM), relevance vector machine (RVM), and deep learning.

SVM is an example of supervised learning model, which analyzes data and recognizes patterns and can be used for classification and regression analysis. Given a set of training examples, each marked as belonging to one of two categories, a SVM training algorithm builds a model that assigns new examples into one category or the other, making it a non-probabilistic binary linear classifier. A SVM model is a representation of the examples as points in space, mapped so that the examples of the separate categories are divided by a clear gap that is as wide as possible. New examples are then mapped into that same space and predicted to belong to a category based on which side of the gap they fall on.

In addition to performing linear classification, SVMs can efficiently perform a non-linear classification using what is called the kernel methods, implicitly mapping their inputs into high-dimensional feature spaces.

Kernel methods involve a user-specified kernel, i.e., a similarity function over pairs of data points in raw representation. Kernel methods owe their name to the use of kernel functions, which enable them to operate in a high-dimensional, implicit feature space without ever computing the coordinates of the data in that space, but rather by simply computing the inner products between the images of all pairs of data in the feature space. This operation is often computationally cheaper than the explicit computation of the coordinates. This approach is called the "kernel trick."

The effectiveness of SVM depends on the selection of kernel, the kernel's parameters, and soft margin parameter C. A common choice is a Gaussian kernel, which has a single parameter $\gamma$. The best combination of C and $\gamma$ is often selected by a grid search (also known as "parameter sweep") with exponentially growing sequences of C and $\gamma$, for example, $C \in \{2^{-5}, 2^{-4}, \ldots, 2^{15}, 2^{16}\}$; $\gamma \in \{2^{-15}, 2^{-14}, \ldots, 2^4, 2^5\}$.

A grid search is an exhaustive searching through a manually specified subset of the hyperparameter space of a learning algorithm. A grid search algorithm is guided by some performance metric, typically measured by cross-validation on the training set or evaluation on a held-out validation set.

Each combination of parameter choices may be checked using cross validation, and the parameters with best cross-validation accuracy are picked.

Cross-validation, sometimes called rotation estimation, is a model validation technique for assessing how the results of a statistical analysis will generalize to an independent data set. It is mainly used in settings where the goal is prediction, and one wants to estimate how accurately a predictive model will perform in practice. In a prediction problem, a model is usually given a dataset of known data on which training is run (training dataset), and a dataset of unknown data (or first seen data) against which the model is tested (testing dataset). The goal of cross validation is to define a dataset to "test" the model in the training phase (i.e., the validation dataset), in order to limit problems like overfitting, give an insight on how the model will generalize to an independent data set (i.e., an unknown dataset, for instance from a real problem), etc. One round of cross-validation involves partitioning a sample of data into complementary subsets, performing the analysis on one subset (called the training set), and validating the analysis on the other subset (called the validation set or testing set). To reduce variability, multiple rounds of cross-validation are performed using different partitions, and the validation results are averaged over the rounds.

The final model, which can be used for testing and for classifying new data, is then trained on the entire training set using the selected parameters.

Another example of supervised learning is regression. Regression infers the relationships between a dependent variable and one or more independent variables, from a set of values of the dependent variables and corresponding values of the independent variables. Regression may estimate the conditional expectation of the dependent variable given the independent variables. The inferred relationships may be called the regression function. The inferred relationships may be probabilistic.

In an embodiment, there is provided a system that can use the model to generate 3D data (e.g., depth data) after the system captures images of a patterned substrate. In an embodiment, the system can be, for example, a SEM tool of FIG. 16 or an inspection tool of FIG. 17 that are configured to include the model DBM discussed herein. For example, the metrology tool includes an e-beam generator to capture an image of a patterned substrate; and one or more processors including a trained model described herein. The one or more processors are configured to execute the trained model using the captured image to generate depth data. As mentioned earlier, the model may be a convolutional neural network.

In an embodiment, the model generated 3D data (e.g., depth data) can be used to improve patterning process. For example, the depth data can be used in simulation of the patterning process, for example, to predict contours, CDs, edge placement (e.g., edge placement error), etc. in the resist and/or etched image. The objective of the simulation is to accurately predict, for example, edge placement, and/or aerial image intensity slope, and/or CD, etc. of the printed pattern. These values can be compared against an intended design to, e.g., correct the patterning process, identify where a defect is predicted to occur, etc. The intended design is generally defined as a pre-OPC design layout which can be provided in a standardized digital file format such as GDSII or OASIS or other file format.

Figure 16:
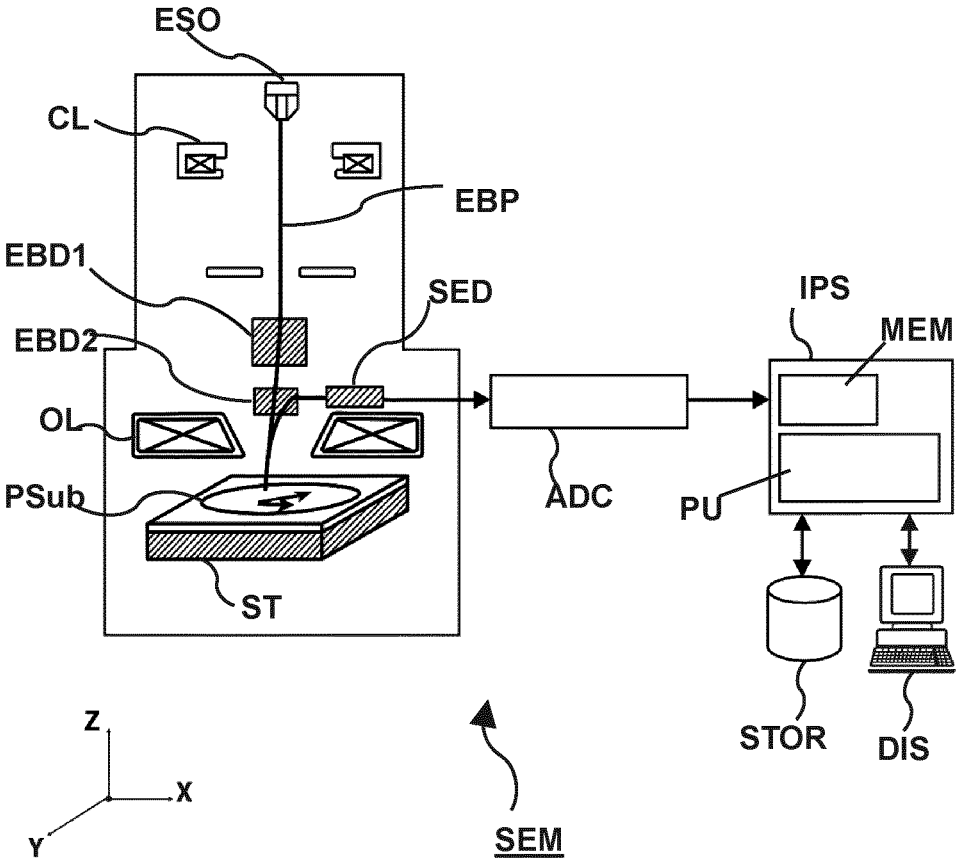
FIG. 16 schematically depicts an embodiment of a scanning electron microscope (SEM), according to an embodiment.

In some embodiments, the inspection apparatus or the metrology apparatus may be a scanning electron microscope (SEM) that yields an image of a structure (e.g., some or all the structure of a device) exposed or transferred on the substrate. FIG. 16 depicts an embodiment of a SEM tool. A primary electron beam EBP emitted from an electron source ESO is converged by condenser lens CL and then passes through a beam deflector EBD1, an E×B deflector EBD2, and an objective lens OL to irradiate a substrate PSub on a substrate table ST at a focus.

When the substrate PSub is irradiated with electron beam EBP, secondary electrons are generated from the substrate PSub. The secondary electrons are deflected by the E×B deflector EBD2 and detected by a secondary electron detector SED. A two-dimensional electron beam image can be obtained by detecting the electrons generated from the sample in synchronization with, e.g., two dimensional scanning of the electron beam by beam deflector EBD1 or with repetitive scanning of electron beam EBP by beam deflector EBD1 in an X or Y direction, together with continuous movement of the substrate PSub by the substrate table ST in the other of the X or Y direction.

A signal detected by secondary electron detector SED is converted to a digital signal by an analog/digital (A/D) converter ADC, and the digital signal is sent to an image processing system IPU. In an embodiment, the image processing system IPU may have memory MEM to store all or part of digital images for processing by a processing unit PU. The processing unit PU (e.g., specially designed hardware or a combination of hardware and software) is configured to convert or process the digital images into datasets representative of the digital images. Further, image processing system IPU may have a storage medium STOR configured to store the digital images and corresponding datasets in a reference database. A display device DIS may be connected with the image processing system IPU, so that an operator can conduct necessary operation of the equipment with the help of a graphical user interface.

As noted above, SEM images may be processed to extract contours that describe the edges of objects, representing device structures, in the image. These contours are then quantified via metrics, such as CD. Thus, typically, the images of device structures are compared and quantified via simplistic metrics, such as an edge-to-edge distance (CD) or simple pixel differences between images. Typical contour models that detect the edges of the objects in an image in order to measure CD use image gradients. Indeed, those models rely on strong image gradients. But, in practice, the image typically is noisy and has discontinuous boundaries. Techniques, such as smoothing, adaptive thresholding, edge-detection, erosion, and dilation, may be used to process the results of the image gradient contour models to address noisy and discontinuous images, but will ultimately result in a low-resolution quantification of a high-resolution image. Thus, in most instances, mathematical manipulation of images of device structures to reduce noise and automate edge detection results in loss of resolution of the image, thereby resulting in loss of information. Consequently, the result is a low-resolution quantification that amounts to a simplistic representation of a complicated, high-resolution structure.

So, it is desirable to have a mathematical representation of the structures (e.g., circuit features, alignment mark or metrology target portions (e.g., grating features), etc.) produced or expected to be produced using a patterning process, whether, e.g., the structures are in a latent resist image, in a developed resist image or transferred to a layer on the substrate, e.g., by etching, that can preserve the resolution and yet describe the general shape of the structures. In the context of lithography or other pattering processes, the structure may be a device or a portion thereof that is being manufactured and the images may be SEM images of the structure. In some instances, the structure may be a feature of semiconductor device, e.g., integrated circuit. In this case, the structure may be referred as a pattern or a desired pattern that comprises a plurality of feature of the semiconductor device. In some instances, the structure may be an alignment mark, or a portion thereof (e.g., a grating of the alignment mark), that is used in an alignment measurement process to determine alignment of an object (e.g., a substrate) with another object (e.g., a patterning device) or a metrology target, or a portion thereof (e.g., a grating of the metrology target), that is used to measure a parameter (e.g., overlay, focus, dose, etc.) of the patterning process. In an embodiment, the metrology target is a diffractive grating used to measure, e.g., overlay.

Figure 17:
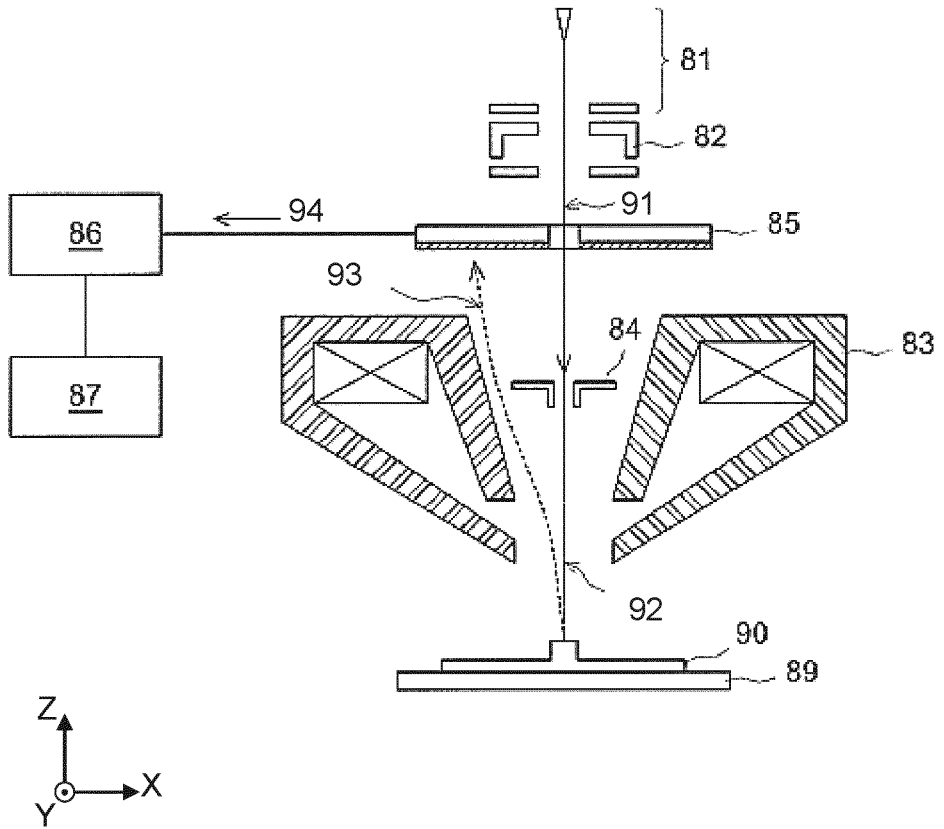
FIG. 17 schematically depicts an embodiment of an electron beam inspection apparatus, according to an embodiment.

FIG. 17 schematically illustrates a further embodiment of an inspection apparatus. The system is used to inspect a sample 90 (such as a substrate) on a sample stage 88 and comprises a charged particle beam generator 81, a condenser lens module 82, a probe forming objective lens module 83, a charged particle beam deflection module 84, a secondary charged particle detector module 85, and an image forming module 86.

The charged particle beam generator 81 generates a primary charged particle beam 91. The condenser lens module 82 condenses the generated primary charged particle beam 91. The probe forming objective lens module 83 focuses the condensed primary charged particle beam into a charged particle beam probe 92. The charged particle beam deflection module 84 scans the formed charged particle beam probe 92 across the surface of an area of interest on the sample 90 secured on the sample stage 88. In an embodiment, the charged particle beam generator 81, the condenser lens module 82 and the probe forming objective lens module 83, or their equivalent designs, alternatives or any combination thereof, together form a charged particle beam probe generator which generates the scanning charged particle beam probe 92.

The secondary charged particle detector module 85 detects secondary charged particles 93 emitted from the sample surface (maybe also along with other reflected or scattered charged particles from the sample surface) upon being bombarded by the charged particle beam probe 92 to generate a secondary charged particle detection signal 94. The image forming module 86 (e.g., a computing device) is coupled with the secondary charged particle detector module 85 to receive the secondary charged particle detection signal 94 from the secondary charged particle detector module 85 and accordingly forming at least one scanned image. In an embodiment, the secondary charged particle detector module 85 and image forming module 86, or their equivalent designs, alternatives or any combination thereof, together form an image forming apparatus which forms a scanned image from detected secondary charged particles emitted from sample 90 being bombarded by the charged particle beam probe 92.

In an embodiment, a monitoring module 87 is coupled to the image forming module 86 of the image forming apparatus to monitor, control, etc. the patterning process and/or derive a parameter for patterning process design, control, monitoring, etc. using the scanned image of the sample 90 received from image forming module 86. So, in an embodiment, the monitoring module 87 is configured or programmed to cause execution of a method described herein. In an embodiment, the monitoring module 87 comprises a computing device. In an embodiment, the monitoring module 87 comprises a computer program to provide functionality herein and encoded on a computer readable medium forming, or disposed within, the monitoring module 87.

In an embodiment, like the electron beam inspection tool of FIG. 16 that uses a probe to inspect a substrate, the electron current in the system of FIG. 17 is significantly larger compared to, e.g., a CD SEM such as depicted in FIG. 16, such that the probe spot is large enough so that the inspection speed can be fast. However, the resolution may not be as high as compared to a CD SEM because of the large probe spot. In an embodiment, the above discussed inspection apparatus may be single beam or a multi-beam apparatus without limiting the scope of the present disclosure.

The SEM images, from, e.g., the system of FIG. 16 and/or FIG. 17, may be processed to extract contours that describe the edges of objects, representing device structures, in the image. These contours are then typically quantified via metrics, such as CD, at user-defined cut-lines. Thus, typically, the images of device structures are compared and quantified via metrics, such as an edge-to-edge distance (CD) measured on extracted contours or simple pixel differences between images.

In an embodiment, the one or more processes of the methods can be implemented as instructions (e.g., program code) in a processor of a computer system (e.g., process 104 of computer system 100). In an embodiment, the procedures may be distributed across a plurality of processors (e.g., parallel computation) to improve computing efficiency. In an embodiment, the computer program product comprising a non-transitory computer readable medium has instructions recorded thereon, the instructions when executed by a computer hardware system implementing the method described herein.

As discussed herein, there are provided different approaches (e.g., methods 500, 700, 1100, and 1300) for training models configured to generate depth information from a single SEM image of a patterned substrate. As such, using the models described herein, depth information can be estimated using only one measurement thereby saving metrology time. The depth information can be further employed to configure a lithographic process such that yield is improved or defects minimized.

According to present disclosure, the combination and sub-combinations of disclosed elements constitute separate embodiments. For example, a first combination includes determining a model configured to estimate depth data using a single image (e.g., SEM image, AFM data, optical images, etc.). The sub-combination may include determining a depth data using the trained model. In another combination, the depth data can be employed in an inspection process, determining OPC, or SMO based on model-generated variance data. In another example, the combination includes determining, based on inspection data based on the depth data, process adjustments to a lithography process, resist process, or etch process to improve the yield of the patterning process.

Figure 18:
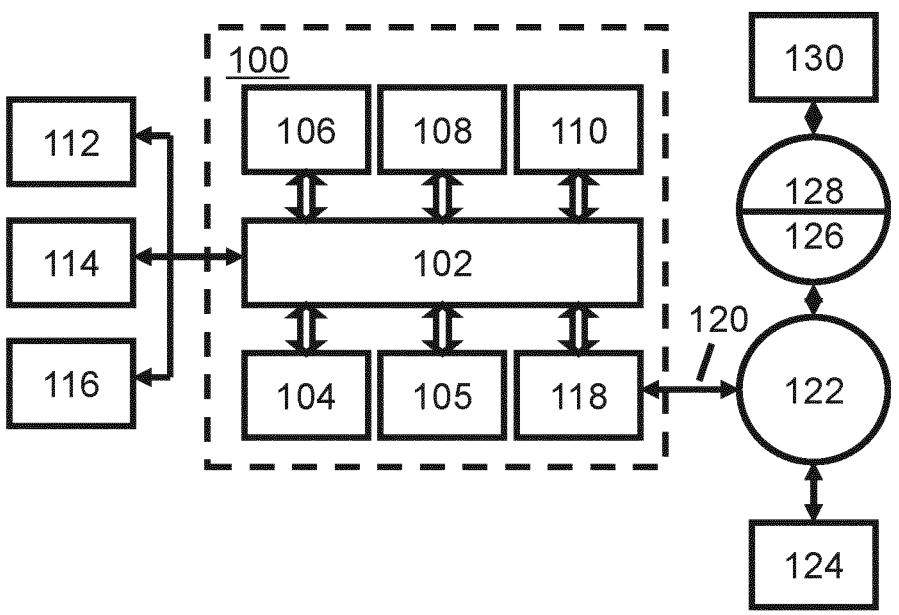
FIG. 18 is a block diagram of an example computer system, according to an embodiment.

FIG. 18 is a block diagram that illustrates a computer system 100 which can assist in implementing the methods, flows or the apparatus disclosed herein. Computer system 100 includes a bus 102 or other communication mechanism for communicating information, and a processor 104 (or multiple processors 104 and 105) coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT) or flat panel or touch panel display for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane. A touch panel (screen) display may also be used as an input device.

According to one embodiment, portions of one or more methods described herein may be performed by computer system 100 in response to processor 104 executing one or more sequences of one or more instructions contained in main memory 106. Such instructions may be read into main memory 106 from another computer-readable medium, such as storage device 110. Execution of the sequences of instructions contained in main memory 106 causes processor 104 to perform the process steps described herein. One or more processors in a multi-processing arrangement may also be employed to execute the sequences of instructions contained in main memory 106. In an alternative embodiment, hardwired circuitry may be used in place of or in combination with software instructions. Thus, the description herein is not limited to any specific combination of hardware circuitry and software.

The term "computer-readable medium" as used herein refers to any medium that participates in providing instructions to processor 104 for execution. Such a medium may take many forms, including but not limited to, non-volatile media, volatile media, and transmission media. Non-volatile media include, for example, optical or magnetic disks, such as storage device 110. Volatile media include dynamic memory, such as main memory 106. Transmission media include coaxial cables, copper wire and fiber optics, including the wires that comprise bus 102. Transmission media can also take the form of acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 104 for execution. For example, the instructions may initially be borne on a magnetic disk of a remote computer. The remote computer can load the instructions into its dynamic memory and send the instructions over a telephone line using a modem. A modem local to computer system 100 can receive the data on the telephone line and use an infrared transmitter to convert the data to an infrared signal. An infrared detector coupled to bus 102 can receive the data carried in the infrared signal and place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 may also include a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the worldwide packet data communication network, now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120, and communication interface 118. In the Internet example, a server 130 might transmit a requested code for an application program through Internet 128, ISP 126, local network 122 and communication interface 118. One such downloaded application may provide all or part of a method described herein, for example. The received code may be executed by processor 104 as it is received, and/or stored in storage device 110, or other non-volatile storage for later execution. In this manner, computer system 100 may obtain application code in the form of a carrier wave.

Figure 19:
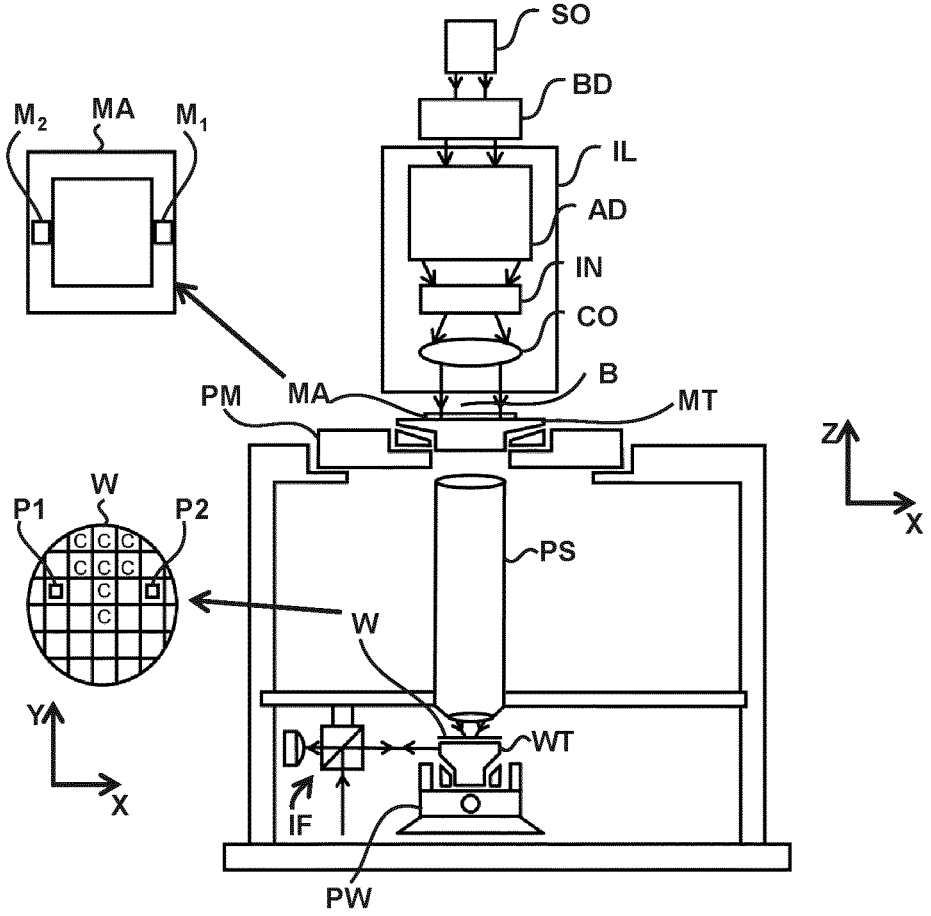
FIG. 19 is a schematic diagram of a lithographic projection apparatus, according to an embodiment.

FIG. 19 schematically depicts an exemplary lithographic projection apparatus in conjunction with the techniques described herein can be utilized. The apparatus comprises:

an illumination system IL, to condition a beam B of radiation. In this particular case, the illumination system also comprises a radiation source SO;

a first object table (e.g., patterning device table) MT provided with a patterning device holder to hold a patterning device MA (e.g., a reticle), and connected to a first positioner to accurately position the patterning device with respect to item PS;

a second object table (substrate table) WT provided with a substrate holder to hold a substrate W (e.g., a resist-coated silicon wafer), and connected to a second positioner to accurately position the substrate with respect to item PS;

a projection system ("lens") PS (e.g., a refractive, catoptric or catadioptric optical system) to image an irradiated portion of the patterning device MA onto a target portion C (e.g., comprising one or more dies) of the substrate W.

As depicted herein, the apparatus is of a transmissive type (i.e., has a transmissive patterning device). However, in general, it may also be of a reflective type, for example (with a reflective patterning device). The apparatus may employ a different kind of patterning device to classic mask; examples include a programmable mirror array or LCD matrix.

The source SO (e.g., a mercury lamp or excimer laser, LPP (laser produced plasma) EUV source) produces a beam of radiation. This beam is fed into an illumination system (illuminator) IL, either directly or after having traversed conditioning means, such as a beam expander Ex, for example. The illuminator IL may comprise adjusting means AD for setting the outer and/or inner radial extent (commonly referred to as o-outer and o-inner, respectively) of the intensity distribution in the beam. In addition, it will generally comprise various other components, such as an integrator IN and a condenser CO. In this way, the beam B impinging on the patterning device MA has a desired uniformity and intensity distribution in its cross-section.

It should be noted with regard to FIG. 19 that the source SO may be within the housing of the lithographic projection apparatus (as is often the case when the source SO is a mercury lamp, for example), but that it may also be remote from the lithographic projection apparatus, the radiation beam that it produces being led into the apparatus (e.g., with the aid of suitable directing mirrors); this latter scenario is often the case when the source SO is an excimer laser (e.g., based on KrF, ArF or $F_2$ lasing).

The beam PB subsequently intercepts the patterning device MA, which is held on a patterning device table MT. Having traversed the patterning device MA, the beam B passes through the lens PL, which focuses the beam B onto a target portion C of the substrate W. With the aid of the second positioning means (and interferometric measuring means IF), the substrate table WT can be moved accurately, e.g. so as to position different target portions C in the path of the beam PB. Similarly, the first positioning means can be used to accurately position the patterning device MA with respect to the path of the beam B, e.g., after mechanical retrieval of the patterning device MA from a patterning device library, or during a scan. In general, movement of the object tables MT, WT will be realized with the aid of a long-stroke module (coarse positioning) and a short-stroke module (fine positioning), which are not explicitly depicted in FIG. 19. However, in the case of a stepper (as opposed to a step-and-scan tool) the patterning device table MT may just be connected to a short stroke actuator, or may be fixed.

The depicted tool can be used in two different modes:

In step mode, the patterning device table MT is kept essentially stationary, and an entire patterning device image is projected in one go (i.e., a single "flash") onto a target portion C. The substrate table WT is then shifted in the x and/or y directions so that a different target portion C can be irradiated by the beam PB;

In scan mode, essentially the same scenario applies, except that a given target portion C is not exposed in a single "flash". Instead, the patterning device table MT is movable in a given direction (the so-called "scan direction", e.g., the y direction) with a speed v, so that the projection beam B is caused to scan over a patterning device image; concurrently, the substrate table WT is simultaneously moved in the same or opposite direction at a speed $V=Mv$, in which M is the magnification of the lens PL (typically, $M=\frac{1}{4}$ or $\frac{1}{5}$). In this manner, a relatively large target portion C can be exposed, without having to compromise on resolution.

Figure 20:
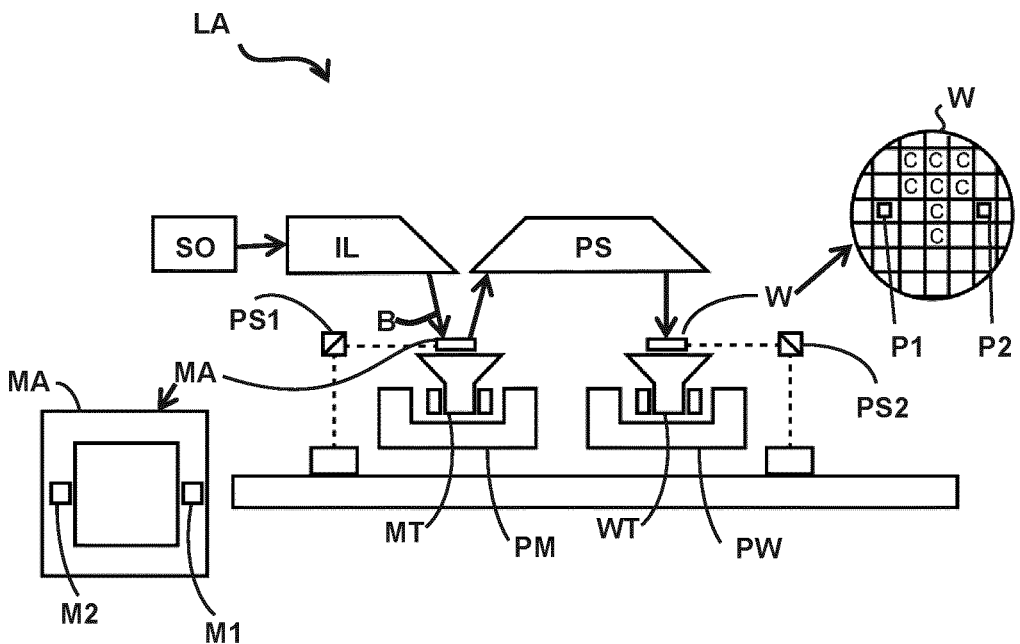
FIG. 20 is a schematic diagram of another lithographic projection apparatus, according to an embodiment.

FIG. 20 schematically depicts another exemplary lithographic projection apparatus LA in conjunction with the techniques described herein can be utilized.

The lithographic projection apparatus LA comprises:

a source collector module SO an illumination system (illuminator) IL configured to condition a radiation beam B (e.g. EUV radiation).

a support structure (e.g. a patterning device table) MT constructed to support a patterning device (e.g. a mask or a reticle) MA and connected to a first positioner PM configured to accurately position the patterning device;

a substrate table (e.g. a wafer table) WT constructed to hold a substrate (e.g. a resist coated wafer) W and connected to a second positioner PW configured to accurately position the substrate; and a projection system (e.g. a reflective projection system) PS configured to project a pattern imparted to the radiation beam B by patterning device MA onto a target portion C (e.g. comprising one or more dies) of the substrate W.

As here depicted, the apparatus LA is of a reflective type (e.g. employing a reflective patterning device). It is to be noted that because most materials are absorptive within the EUV wavelength range, the patterning device may have multilayer reflectors comprising, for example, a multi-stack of Molybdenum and Silicon. In one example, the multi-stack reflector has a 40 layer pairs of Molybdenum and Silicon where the thickness of each layer is a quarter wavelength. Even smaller wavelengths may be produced with X-ray lithography. Since most material is absorptive at EUV and x-ray wavelengths, a thin piece of patterned absorbing material on the patterning device topography (e.g., a TaN absorber on top of the multi-layer reflector) defines where features would print (positive resist) or not print (negative resist).

Referring to FIG. 20, the illuminator IL receives an extreme ultra violet radiation beam from the source collector module SO. Methods to produce EUV radiation include, but are not necessarily limited to, converting a material into a plasma state that has at least one element, e.g., xenon, lithium or tin, with one or more emission lines in the EUV range. In one such method, often termed laser produced plasma ("LPP") the plasma can be produced by irradiating a fuel, such as a droplet, stream or cluster of material having the line-emitting element, with a laser beam. The source collector module SO may be part of an EUV radiation system including a laser, not shown in FIG. 20, for providing the laser beam exciting the fuel. The resulting plasma emits output radiation, e.g., EUV radiation, which is collected using a radiation collector, disposed in the source collector module. The laser and the source collector module may be separate entities, for example when a CO2 laser is used to provide the laser beam for fuel excitation.

In such cases, the laser is not considered to form part of the lithographic apparatus and the radiation beam is passed from the laser to the source collector module with the aid of a beam delivery system comprising, for example, suitable directing mirrors and/or a beam expander. In other cases the source may be an integral part of the source collector module, for example when the source is a discharge produced plasma EUV generator, often termed as a DPP source.

The illuminator IL may comprise an adjuster for adjusting the angular intensity distribution of the radiation beam. Generally, at least the outer and/or inner radial extent (commonly referred to as σ-outer and σ-inner, respectively) of the intensity distribution in a pupil plane of the illuminator can be adjusted. In addition, the illuminator IL may comprise various other components, such as facetted field and pupil mirror devices. The illuminator may be used to condition the radiation beam, to have a desired uniformity and intensity distribution in its cross section.

The radiation beam B is incident on the patterning device (e.g., mask) MA, which is held on the support structure (e.g., patterning device table) MT, and is patterned by the patterning device. After being reflected from the patterning device (e.g. mask) MA, the radiation beam B passes through the projection system PS, which focuses the beam onto a target portion C of the substrate W. With the aid of the second positioner PW and position sensor PS2 (e.g. an interferometric device, linear encoder or capacitive sensor), the substrate table WT can be moved accurately, e.g. so as to position different target portions C in the path of the radiation beam B. Similarly, the first positioner PM and another position sensor PS1 can be used to accurately position the patterning device (e.g. mask) MA with respect to the path of the radiation beam B. Patterning device (e.g. mask) MA and substrate W may be aligned using patterning device alignment marks M1, M2 and substrate alignment marks P1, P2.

The depicted apparatus LA could be used in at least one of the following modes:

1. In step mode, the support structure (e.g. patterning device table) MT and the substrate table WT are kept essentially stationary, while an entire pattern imparted to the radiation beam is projected onto a target portion C at one time (i.e. a single static exposure). The substrate table WT is then shifted in the X and/or Y direction so that a different target portion C can be exposed.

2. In scan mode, the support structure (e.g. patterning device table) MT and the substrate table WT are scanned synchronously while a pattern imparted to the radiation beam is projected onto a target portion C (i.e. a single dynamic exposure). The velocity and direction of the substrate table WT relative to the support structure (e.g. patterning device table) MT may be determined by the (de-) magnification and image reversal characteristics of the projection system PS.

3. In another mode, the support structure (e.g. patterning device table) MT is kept essentially stationary holding a programmable patterning device, and the substrate table WT is moved or scanned while a pattern imparted to the radiation beam is projected onto a target portion C. In this mode, generally a pulsed radiation source is employed and the programmable patterning device is updated as required after each movement of the substrate table WT or in between successive radiation pulses during a scan. This mode of operation can be readily applied to maskless lithography that utilizes programmable patterning device, such as a programmable mirror array of a type as referred to above.

Figure 21:
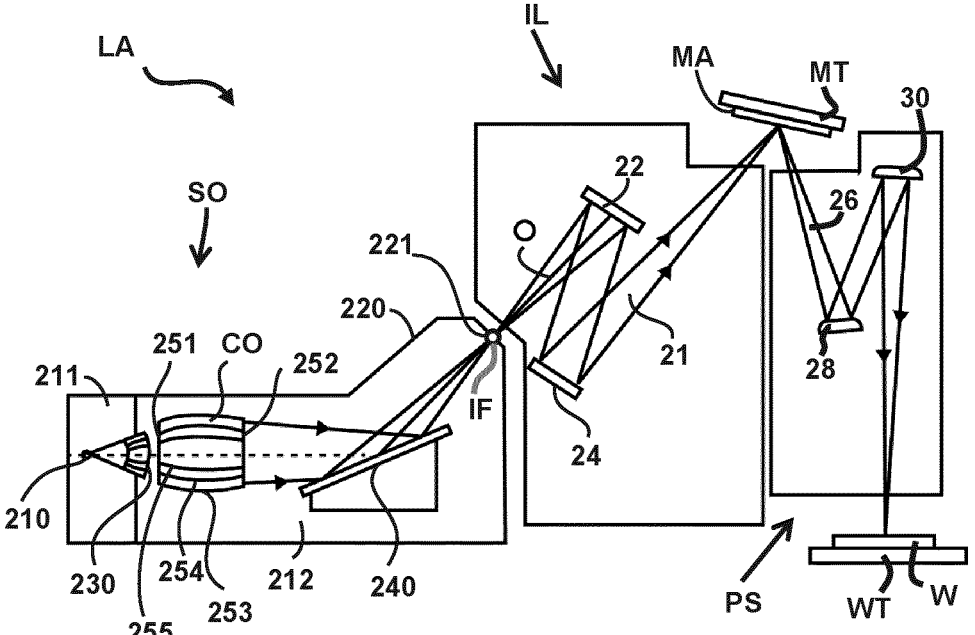
FIG. 21 is a more detailed view of the apparatus in FIG. 19, according to an embodiment.

FIG. 21 shows the apparatus LA in more detail, including the source collector module SO, the illumination system IL, and the projection system PS. The source collector module SO is constructed and arranged such that a vacuum environment can be maintained in an enclosing structure 220 of the source collector module SO. An EUV radiation emitting plasma 210 may be formed by a discharge produced plasma source. EUV radiation may be produced by a gas or vapor, for example Xe gas, Li vapor or Sn vapor in which the very hot plasma 210 is created to emit radiation in the EUV range of the electromagnetic spectrum. The very hot plasma 210 is created by, for example, an electrical discharge causing at least partially ionized plasma. Partial pressures of, for example, 10 Pa of Xe, Li, Sn vapor or any other suitable gas or vapor may be required for efficient generation of the radiation. In an embodiment, a plasma of excited tin (Sn) is provided to produce EUV radiation.

The radiation emitted by the hot plasma 210 is passed from a source chamber 211 into a collector chamber 212 via an optional gas barrier or contaminant trap 230 (in some cases also referred to as contaminant barrier or foil trap) which is positioned in or behind an opening in source chamber 211. The contaminant trap 230 may include a channel structure. Contamination trap 230 may also include a gas barrier or a combination of a gas barrier and a channel structure. The contaminant trap or contaminant barrier 230 further indicated herein at least includes a channel structure, as known in the art.

The collector chamber 211 may include a radiation collector CO which may be a so-called grazing incidence collector. Radiation collector CO has an upstream radiation collector side 251 and a downstream radiation collector side 252. Radiation that traverses collector CO can be reflected off a grating spectral filter 240 to be focused in a virtual source point IF along the optical axis indicated by the dot-dashed line 'O'. The virtual source point IF is commonly referred to as the intermediate focus, and the source collector module is arranged such that the intermediate focus IF is located at or near an opening 221 in the enclosing structure 220. The virtual source point IF is an image of the radiation emitting plasma 210.

Subsequently the radiation traverses the illumination system IL, which may include a facetted field mirror device 22 and a facetted pupil mirror device 24 arranged to provide a desired angular distribution of the radiation beam 21, at the patterning device MA, as well as a desired uniformity of radiation intensity at the patterning device MA. Upon reflection of the beam of radiation 21 at the patterning device MA, held by the support structure MT, a patterned beam 26 is formed and the patterned beam 26 is imaged by the projection system PS via reflective elements 28, 30 onto a substrate W held by the substrate table WT.

More elements than shown may generally be present in illumination optics unit IL and projection system PS. The grating spectral filter 240 may optionally be present, depending upon the type of lithographic apparatus. Further, there may be more mirrors present than those shown in the figures, for example there may be 1-6 additional reflective elements present in the projection system PS than shown in FIG. 21.

Collector optic CO, as illustrated in FIG. 21, is depicted as a nested collector with grazing incidence reflectors 253, 254 and 255, just as an example of a collector (or collector mirror). The grazing incidence reflectors 253, 254 and 255 are disposed axially symmetric around the optical axis O and a collector optic CO of this type may be used in combination with a discharge produced plasma source, often called a DPP source.

Figure 22:
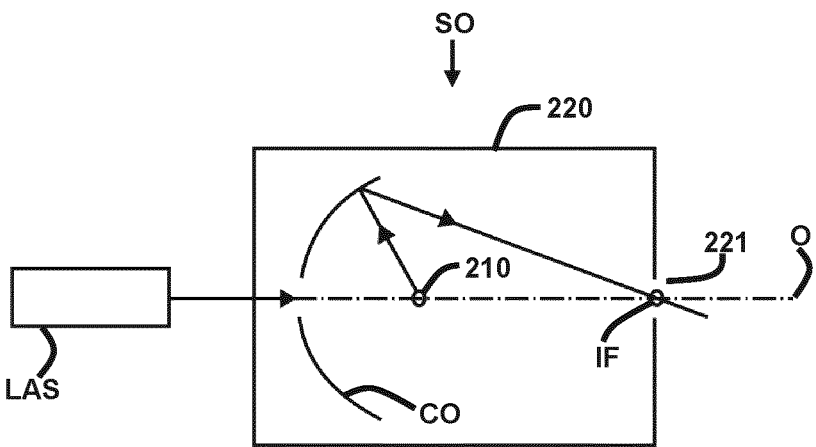
FIG. 22 is a more detailed view of the source collector module SO of the apparatus of FIG. 20 and FIG. 21, according to an embodiment.

Alternatively, the source collector module SO may be part of an LPP radiation system as shown in FIG. 22. A laser LA is arranged to deposit laser energy into a fuel, such as xenon (Xe), tin (Sn) or lithium (Li), creating the highly ionized plasma 210 with electron temperatures of several 10's of eV. The energetic radiation generated during de-excitation and recombination of these ions is emitted from the plasma, collected by a near normal incidence collector optic CO and focused onto the opening 221 in the enclosing structure 220.

The embodiments may further be described using the following clauses:

1. A non-transitory computer-readable medium for determining depth information of a structure formed on a substrate based on a single scanning electron microscope ("SEM") image of the structure, the depth information being determined using a convolutional neural network (CNN) trained to mimic a parallax effect present in pairs of stereo SEM images, the medium comprising instructions stored therein that, when executed by one or more processors, cause operations comprising:

receiving, via a SEM tool, a single SEM image of a structure patterned on a substrate;

inputting the SEM image to the CNN to predict disparity data associated with the SEM image, the CNN being trained by:

obtaining, via the SEM tool, a stereo pair of SEM images of a patterned substrate, the stereo pair including a first SEM image obtained at a first e-beam tilt setting of the SEM tool, and a second SEM image obtained at a second e-beam tilt setting of the SEM tool;

generating, using the CNN, disparity data between the first SEM image and the second SEM image;

combining the disparity data with the second SEM image to generate a reconstructed image of the first SEM image; and comparing the reconstructed image and the first SEM image; and generating, based on the predicted disparity data, depth information associated with the structure patterned on the substrate.

2. A non-transitory computer-readable medium for determining a model configured to generate data for estimating depth information of a structure of a patterned substrate comprising instructions stored therein that, when executed by one or more processors, cause operations comprising:

obtaining a pair of images of a structure of a patterned substrate, the pair of images including a first image captured at a first angle with respect to the patterned substrate, and a second image captured at a second angle different from the first angle;

generating, via a model using the first image as input, disparity data between the first image and the second image, the disparity data being indicative of depth information associated with the first image;

combining the disparity data with the second image to generate a reconstructed image corresponding to the first image; and adjusting, based on a performance function, one or more parameters of the model causing the performance function to be within a specified performance threshold, the performance function being a function of the disparity data, the reconstructed image, and the first image, the model being configured to generate data convertible to depth information of a structure of a patterned substrate.

3. The medium of clause 2, wherein the disparity data comprises difference in coordinates of similar features within the first image and the second image.

4. The medium of clause 3, wherein the reconstructed image is generated by:

performing a composition operation between the disparity data and the second image to generate the reconstructed image.

5. The medium of any of clauses 2-4, wherein the performance function further comprises a loss function computed based on disparity characteristics associated with a pair of stereo images of prior one or more patterned substrates, and the disparity data predicted by the model.

6. The medium of clause 5, wherein the disparity characteristics based on the prior patterned substrates comprises disparity expressed as a piecewise smooth function, wherein a derivative of the disparity is piecewise continuous.

7. The medium of clause 5, wherein the disparity characteristics based on the prior patterned substrates comprises disparity expressed as piecewise constant.

8. The medium of clause 5, wherein the disparity characteristics based on the prior patterned substrates comprises disparity expressed as a function having a jump at edges of a structure within an image, the edges being detected based on a gradient of an intensity profile within the image.

9. The medium of any of preceding clauses, wherein adjusting the one or more parameters of the model is an iterative process, each iteration comprising:

determining the performance function based on the disparity data, and the reconstructed image;

determining whether the performance function is within the specified performance threshold; and in response to the performance function not being within the specified difference threshold, adjusting the one or more parameters of the model to cause the performance function to be within the specified performance threshold, the adjusting being based on a gradient of the performance function with respect to the one or more parameters.

10. The medium of any of preceding clauses, wherein the first image is a normal image associated with an e-beam directed perpendicular to the patterned substrate, and the second image is associated with an e-beam directed at an angle more 90° or less than 90° with respect to the patterned substrate.

11. The medium of clause 2, wherein obtaining the pair of images comprises obtaining a plurality of pairs of SEM images of a patterned substrate, each pair including a first SEM image associated with a first e-beam tilt setting of a metrology tool, and a second SEM image associated with a second e-beam tilt setting of the metrology tool.

12. The medium of clause 2, wherein determining the model comprises:

obtaining a plurality of images of the structure, each image obtained at different angles.

13. The medium of clause 12, wherein the performance function further comprises another loss function computed as a sum of similarity between an image of the plurality of images and a corresponding reconstructed image.

14. The medium of any of preceding clauses, wherein the operations further comprise:

obtaining, via the metrology tool, a single SEM image of a patterned substrate at the first e-beam tilt setting of the metrology tool.

15. The medium of clause 14, wherein the single SEM image is a normal image obtained by directing an e-beam approximately perpendicular to the patterned substrate.

16. The medium of clause 14, wherein the operations further comprise:

executing the model using the single SEM image as input to generate disparity data associated with the single SEM image; and applying a conversion function to the disparity data to generate depth information of the structure in the SEM image.

17. The medium of clause 16, wherein the operations further comprise:

determining, based on the depth information, physical characteristics of the structure of the patterned substrate, the physical characteristics comprising a shape, a size, or relative positioning of polygon shapes with respect to each other at one or more depth of features of the structure.

18. A non-transitory computer-readable medium for determining depth information from an image of a patterned substrate, the medium comprising instructions stored therein that, when executed by one or more processors, cause operations comprising:

receiving, via a system, an image of a structure on a patterned substrate; and executing a model using the image to determine depth information of the structure on the patterned substrate, the model being trained to estimate depth information from only a single image of a structure and being stored on the medium.

19. The medium of clause 18, wherein the operations further comprise:

determining, based on the depth information, physical characteristics of the structure of the patterned substrate, the physical characteristics comprising a shape, a size, or relative positioning of polygon shapes with respect to each other at one or more depth of features of the structure.

20. The medium of clause 19, wherein the operations further comprise:

determining, based on the physical characteristics, a defect in the structure, the defect indicative of the structure not satisfying a design specification; and adjusting, based on the defect, a parameter of one or more patterning process to eliminate the defect in a subsequent process of the patterning process.

21. The medium of clause 19, wherein the image is a normal SEM image, or an optical image, and wherein the system is any of a computer system, a SEM tool, or an atomic force microscope.

22. The medium of any of preceding clauses, further comprising operations for determining the model, the operations comprising:

obtaining a pair of images of a structure of a patterned substrate, the pair of images including a first image captured at a first angle with respect to the patterned substrate, and a second image captured at a second angle different from the first angle;

generating, via a model using the first image as input, disparity data between the first image and the second image, the disparity data being indicative of depth information associated with the first image;

combining the disparity data with the second image to generate a reconstructed image corresponding to the first image; and adjusting, based on a performance function one or more parameters of the model causing the performance function to be within a specified performance threshold, the performance function being a function of the disparity data, the reconstructed image, and the first image, the model being configured to generate data convertible to depth information of a structure of a patterned substrate.

23. The medium of clause 22, wherein the disparity data comprises difference in coordinates of similar features within the first image and the second image.

24. The medium of clause 23, wherein the reconstructed image is generated by:

performing a composition operation between the disparity data and the second image to generate the reconstructed image.

25. The medium of any of clauses 22-24, wherein the performance function further comprises a loss function computed based on disparity characteristics associated with a pair of stereo images of prior one or more patterned substrates, and the disparity data predicted by the model.

26. The medium of clause 25, wherein the disparity characteristics based on the prior patterned substrates comprises disparity expressed as a piecewise smooth function, wherein a derivative of the disparity is piecewise continuous.

27. The medium of clause 25, wherein the disparity characteristics based on the prior patterned substrates comprises disparity expressed as piecewise constant.

28. The medium of clause 25, wherein the disparity characteristics based on the prior patterned substrates comprises disparity expressed as a function having a jump at edges of a structure within an image, the edges being detected based on a gradient of an intensity profile within the image.

29. The medium of any of preceding clauses, wherein adjusting the one or more parameters of the model is an iterative process, each iteration comprising:

determining the performance function based on the disparity data, and the reconstructed image;

determining whether the performance function is within the specified performance threshold; and in response to the performance function not being within the specified difference threshold, adjusting the one or more parameters of the model to cause the performance function to be within the specified performance threshold, the adjusting being based on a gradient of the performance function with respect to the one or more parameters.

30. The medium of any of preceding clauses, wherein the first image is a normal image associated with an e-beam directed perpendicular to the patterned substrate, and the second image is associated with an e-beam directed at an angle more 90° or less than 90° with respect to the patterned substrate.

31. A method for determining a model configured to generate data for estimating depth information of a structure of a patterned substrate, the method comprising:

obtaining a pair of images of a structure of a patterned substrate, the pair of images including a first image captured at a first angle with respect to the patterned substrate, and a second image captured at a second angle different from the first angle;

generating, via a model using the first image as input, disparity data between the first image and the second image, the disparity data being indicative of depth information associated with the first image;

combining the disparity data with the second image to generate a reconstructed image corresponding to the first image; and adjusting, based on a performance function, one or more parameters of the model causing the performance function to be within a specified performance threshold, the performance function being a function of the disparity data, the reconstructed image, and the first image, the model being configured to generate data convertible to depth information of a structure of a patterned substrate.

32. The method of clause 31, wherein the disparity data comprises difference in coordinates of similar features within the first image and the second image.

33. The method of clause 32, wherein the reconstructed image is generated by:

performing a composition operation between the disparity data and the second image to generate the reconstructed image.

34. The method of any of preceding clauses, wherein the performance function further comprises a loss function computed based on disparity characteristics associated with a pair of stereo images of prior one or more patterned substrate, and the disparity data predicted by the model.

35. The method of clause 34, wherein the disparity characteristics comprises at least one of:

disparity being a piecewise smooth function, wherein a derivative of the disparity is piecewise continuous;

disparity being piecewise constant; and disparity being a function having a jump at edges of a structure within an image, the edges being detected based on a gradient of an intensity profile within the image.

36. The method of any of clauses 31-35, wherein adjusting the one or more parameters of the model is an iterative process, each iteration comprising:

determining the performance function based on the disparity data, and the reconstructed image;

determining whether the performance function is within the specified performance threshold; and in response to the performance function not being within the specified difference threshold, adjusting the one or more parameters of the model to cause the performance function to be within the specified performance threshold, the adjusting being based on a gradient of the performance function with respect to the one or more parameters.

37. The method of any of clauses 31-36, wherein the first image is a normal image associated with an e-beam directed perpendicular to the patterned substrate, and the second image is associated with an e-beam directed at an angle more 90° or less than 90° with respect to the patterned substrate.

38. The method of clause 31, wherein obtaining the pair of images comprises:

obtaining, via a metrology tool, a plurality of pairs of SEM images of a patterned substrate, each pair including a first SEM image associated with a first e-beam tilt setting of the metrology tool, and a second SEM image associated with a second e-beam tilt setting of the metrology tool.

39. The method of clause 31, wherein the first SEM image is captured by a first SEM tool and the second SEM image is captured by a second SEM tool.

40. The method of clause 38, wherein the operations further comprise:

obtaining, via the metrology tool, a single SEM image of a patterned substrate at the first e-beam tilt setting of the metrology tool.

41. The method of clause 38, wherein the single SEM image is a normal image obtained by directing an e-beam approximately perpendicular to the patterned substrate.

42. The method of clause 38, wherein the operations further comprise:

executing the model using the single SEM image as input to generate disparity data associated with the SEM image; and applying a conversion function to the disparity data to generate depth information of the structure in the SEM image.

43. The method of clause 42, wherein the operations further comprise:

determining, based on the depth information, physical characteristics of the structure of the patterned substrate, the physical characteristics comprising a shape, a size, or relative positioning of polygon shapes with respect to each other at one or more depth of features of the structure.

44. A method for determining depth information from a SEM image, the method comprising:

receiving, via a system, a normal SEM image of a structure on a patterned substrate, the normal SEM image being associated with an e-beam directed perpendicular to a pattered substrate; and executing a model using the normal SEM image to determine depth information of the structure on the patterned substrate, the model being trained to estimate depth information from only a single SEM image.

45. The method of clause 44, wherein the operations further comprise:

determining, based on the depth information, physical characteristics of the structure of the patterned substrate, the physical characteristics comprising a shape, a size, or relative positioning of polygon shapes with respect to each other at one or more depth of features of the structure.

46. The method of clause 45, wherein the operations further comprise:

determining, based on the physical characteristics, a defect in the structure, the defect indicative of the structure not satisfying a design specification; and adjusting, based on the defect, a parameter of one or more patterning process to eliminate the defect in a subsequent process of the patterning process.

47. A non-transitory computer-readable medium for semi-supervised training of a depth estimation model for determining depth data of structures formed on substrates from a single scanning electron microscope ("SEM") image of the structures, the medium comprising instructions stored therein that, when executed by one or more processors, cause operations comprising:

receiving a single SEM image of a structure patterned on a substrate; and predicting, via a convolutional neural network ("CNN") using the SEM image as input, depth data associated with the SEM image, wherein the CNN is:

trained to predict depth data for inputted SEM images based on plurality of simulated SEM images that are labeled with simulated depth data; and calibrated to adjust predicted depth data to correspond to observed depth data, as determined based on data from a metrology tool, of SEM images of the structures patterned on the substrate.

48. The medium of clause 47, wherein the calibrating of the CNN comprises:

receiving, a SEM image and observed depth data associated with the SEM image of the structure patterned on the substrate;

inputting the SEM image to the model to predict depth data;

adjusting the predicted depth data by comparing the predicted depth data and the observed depth data; and tuning, based on the adjusted predicted depth data, the model to cause the predicted depth data to be within a specified matching threshold of the observed depth data.

49. A non-transitory computer-readable medium for generating a model configured to estimate depth data of a structure of a patterned substrate comprising instructions stored therein that, when executed by one or more processors, cause operations comprising:

obtaining, via a simulator, a plurality of simulated metrology images of a structure, each of the plurality of simulated metrology images associated with depth data used by the simulator;

generating, based on the plurality of simulated metrology images and the corresponding simulated depth data, a model configured to predict depth data from an inputted image;

obtaining an image and observed depth data of the structure patterned on a substrate; and calibrating, based on the image and the observed depth data, the model to cause the predicted depth data to be within a specified matching threshold of the observed depth data.

50. The medium of clause 49, wherein the image is obtained via an image capturing tool, and the observed depth data is obtained from a metrology tool configured to provide depth information of the structure on the patterned substrate.

51. The medium of clause 50, wherein the image capture tool is a SEM tool and the images are SEM images.

52. The medium of clause 50, wherein the observed depth data is obtained from the metrology tool, the metrology tool being one or more of: an optical metrology tool configured to measure structure of the patterned substrate and extract depth information based on diffraction-based measurements of the patterned substrate, a SEM tool, or an atomic force microscope (AFM).

53. The medium of any of clauses 49-52, wherein the simulator is a Monte-Carlo simulator configured to generate the simulated metrology images of the structure by varying depth related parameters defined in the Monte-Carlo simulator.

54. The medium of any of clauses 49-53, wherein generating the model is an iterative process, each iteration comprising:

inputting the plurality of simulated metrology images to the model to predict depth data associated with each of the plurality of simulated metrology images;

comparing the predicted depth data with the simulator depth data; and adjusting model parameters of the model so that the predicted depth data is within a specified matching threshold of the simulator depth data.

55. The medium of any of clauses 49-54, wherein calibrating the model is an iterative process, each iteration comprising:

inputting the image to the model to predict depth data;

adjusting the predicted depth data by comparing the predicted depth data and the observed depth data; and adjusting, based the adjusted predicted depth data, model parameters of the model to cause the model to generate depth data that is within a matching threshold of observed depth data.

56. The medium of clause 55, wherein the adjusting the predicted depth data comprises:

extracting, from the predicted depth data, one dimensional height profile of the structure along a given direction;

comparing the predicted height profile with one dimensional height profile of the observed depth data of the structure along the given direction; and modifying the predicted height profile to match the height profile of the observed depth data of the structure.

57. The medium of clause 55, wherein the adjusting the predicted depth data comprises:

extracting predicted shape parameters of the structure from the predicted depth data, and real shape parameters from the observed depth data;

comparing the predicted shape parameters with the real shape parameters of the structure; and modifying the predicted shape parameters to match the real shape parameters.

58. The medium of clause 55, wherein the adjusting the predicted depth data comprises:

deriving a predicted average height of the structure from the predicted depth data of the structure, and a real average height of the structure from the observed depth data;

scaling the predicted average height to match the real average height.

59. The medium of any of clauses 49-58, wherein the depth data comprises at least one of:

one-dimensional height data of the structure traced from the image or a simulated image of the structure on the patterned substrate;

two-dimensional height data of the structure traced from the image or the simulated image of the structure on the patterned substrate; or shape parameters obtained from the metrology tool used to measure structure of the patterned substrate.

60. The medium of any of clauses 49-59, wherein the one-dimensional height data comprises height of the structure along a cut line of the image.

61. The medium of any of clauses 49-60, wherein the two-dimensional height data comprises the height of the structure along a first direction and a second direction on the image.

62. The medium of any of clauses 49-61, wherein the shape parameters comprises one or more of a top CD measured at a top of the structure, a bottom CD measured at a bottom of the structure, or a side wall angle of the structure.

63. The medium of clause 62, wherein the depth data comprises physical characteristics of the structure of the patterned substrate, the physical characteristics comprising a shape, a size, a side wall angle, or relative positioning of polygon shapes with respect to each other at one or more depth of features of the structure.

64. A non-transitory computer-readable medium for determining depth data of a structure formed on a substrate, the medium comprising instructions stored therein that, when executed by one or more processors, cause operations comprising:

receiving, via an image capture tool, an image of a structure patterned on a substrate; and determining, via a model using the image as input, depth data associated with the image, wherein the model is trained based on simulated images and corresponding simulated depth data to predict depth data, and calibrated using image data and observed depth data, the calibrating comprising scaling the predicted depth data to correspond to the observed depth data.

65. The medium of clause 64, wherein the operations further comprise:

determining, based on the depth information, physical characteristics of the structure of the patterned substrate, the physical characteristics comprising a shape, a size, or relative positioning of polygon shapes with respect to each other at one or more depth of features of the structure.

66. The medium of clause 64, wherein the operations further comprise:

determining, based on the physical characteristics, a defect in the structure, the defect indicative of the structure not satisfying a design specification; and adjusting, based on the defect, a parameter of one or more patterning process to eliminate the defect in a subsequent process of the patterning process.

67. The medium of clause 64, wherein the image capture tool is a SEM tool and the image are SEM image.

68. A method for generating a model configured to estimate depth data of a structure of a patterned substrate, the method comprising:

obtaining, via a simulator, a plurality of simulated metrology images of a structure, each of the plurality of simulated metrology images associated with depth data used by the simulator;

generating, based on the plurality of simulated metrology images and the corresponding simulated depth data, a model configured to predict depth data from an inputted image;

obtaining an image and observed depth data of the structure patterned on a substrate; and calibrating, based on the image and the observed depth data, the model to cause the predicted depth data to be within a specified matching threshold of the observed depth data.

69. The method of clause 67, wherein the image is obtained via an image capturing tool, and the observed depth data is obtained from a metrology tool configured to provide depth information of the structure on the patterned substrate.

70. The method of clause 68, wherein the image capture tool is a SEM tool and the images are SEM images.

71. The method of clause 68, wherein the observed depth data is obtained from the metrology tool, the metrology tool being one or more of: an optical metrology tool configured to measure structure of the patterned substrate and extract depth information based on diffraction-based measurements of the patterned substrate, a SEM tool or an atomic force microscope (AFM).

72. The method of any of clauses 68-71, wherein the simulator is a Monte-Carlo simulator configured to generate the simulated metrology images of the structure by varying depth related parameters defined in the Monte-Carlo simulator.

73. The method of any of clauses 68-72, wherein generating the model is an iterative process, each iteration comprising:

inputting the plurality of simulated metrology images to the model to predict depth data associated with each of the plurality of simulated metrology images;

comparing the predicted depth data with the simulator depth data; and adjusting model parameters of the model so that the predicted depth data is within a specified matching threshold of the simulator depth data.

74. The method of any of clauses 68-73, wherein calibrating the model is an iterative process, each iteration comprising:

inputting the image to the model to predict depth data;

adjusting the predicted depth data by comparing the predicted depth data and the observed depth data; and adjusting, based the adjusted predicted depth data, model parameters of the model to cause the model to generate depth data that is within a matching threshold of observed depth data.

75. The method of clause 74, wherein the adjusting the predicted depth data comprises:

extracting, from the predicted depth data, one dimensional height profile of the structure along a given direction;

comparing the predicted height profile with one dimensional height profile of the observed depth data of the structure along the given direction; and modifying the predicted height profile to match the height profile of the observed depth data of the structure.

76. The method of clause 74, wherein the adjusting the predicted depth data comprises:

extracting predicted shape parameters of the structure from the predicted depth data, and real shape parameters from the observed depth data;

comparing the predicted shape parameters with the real shape parameters of the structure; and modifying the predicted shape parameters to match the real shape parameters.

77. The method of clause 74, wherein the adjusting the predicted depth data comprises:

deriving a predicted average height of the structure from the predicted depth data of the structure, and a real average height of the structure from the observed depth data; and scaling the predicted average height to match the real average height.

78. The method of any of clauses 68-77, wherein the depth data comprises at least one of:

one-dimensional height data of the structure traced from the image or a simulated image of the structure on the patterned substrate;

two-dimensional height data of the structure traced from the image or the simulated image of the structure on the patterned substrate; or shape parameters obtained from the metrology tool used to measure structure of the patterned substrate.

79. The method of any of clauses 68-78, wherein the one-dimensional height data comprises height of the structure along a cut line of the image.

80. The method of any of clauses 68-79, wherein the two-dimensional height data comprises the height of the structure along a first direction and a second direction on the image.

81. The method of any of clauses 68-80, wherein the shape parameters comprises one or more of a top CD measured at a top of the structure, a bottom CD measured at a bottom of the structure, or a side wall angle of the structure.

82. The method of clause 81, wherein the depth data comprises physical characteristics of the structure of the patterned substrate, the physical characteristics comprising a shape, a size, a side wall angle, or relative positioning of polygon shapes with respect to each other at one or more depth of features of the structure.

83. A non-transitory computer-readable medium for estimating depth data for structures formed on substrates using a convolutional neural network ("CNN") configured to estimate depth data based on a scanning electron microscope ("SEM") image of the structures, the medium comprising instructions stored therein that, when executed by one or more processors, cause operations comprising:

receiving a single SEM image of a structure on a patterned substrate; and estimating, via the CNN using the SEM image as input, depth data associated the structure of the patterned substrate, wherein the CNN is trained using training data comprising a plurality of SEM images of structures and a plurality of simulated profiles of the structures, the simulated profiles being generated by a process model associated with a patterning process.

84. The medium of clause 83, wherein the CNN is a combination of a generator model and a discriminator model that are trained together, the training being an iterative process, each iteration comprising:

obtaining the plurality of SEM images and the plurality of simulated profiles, each SEM image paired with a simulated profile;

inputting a SEM image of the plurality of SEM images to the generator model;

estimating, using the generator model, the depth data for inputted SEM images;

classifying, via a discriminator model using a simulated profile paired with the inputted SEM image as reference, the estimated depth data as a first category indicative that the estimated depth data correspond to the reference or a second category indicative that the estimated depth data does not correspond to the reference; and updating model parameters of both the generator model and the discriminator model to cause the generator model to estimate depth data such that the discriminator model classifies the estimated depth as first category.

85. The medium of clause 83, wherein the CNN is a combination of a generator model and a discriminator model that are trained together, the training being an iterative process, each iteration comprising:

inputting a SEM image of the plurality of SEM images to the generator model;

estimating, using the generator model, the depth data for inputted SEM images;

extracting, based on intensity values associated with the structure in the estimated depth data, a key performance indicator (KPI) associated with the structure;

classifying, via the discriminator model using (i) the extracted KPI and (ii) the plurality of simulated profiles and simulated KPI of the plurality of simulated profiles as reference, the estimated depth data as first category indicative that the estimated depth data correspond to the reference or a second category indicative that the estimated depth data does not correspond to the reference; and updating model parameters of both the generator model and the discriminator model to cause the generator model to estimate depth data such that the discriminator model classifies the estimated depth as the first category.

86. The medium of clause 85, wherein the CNN is further trained in conjunction with a second generator model, the second generator model being configured to generate a SEM image from the estimated depth data, the training being an iterative process, each iteration comprising:

inputting a SEM image of the plurality of SEM images to the CNN;

estimating, using the CNN, the depth data for inputted SEM images;

generating, via the second generator model using the estimated depth data as input, a predicted SEM image; and updating model parameters of both the CNN and the SEM generator model to cause a difference between the inputted SEM image and the predicted SEM image to be within a specified difference threshold.

87. The medium of clause 83, wherein the process model is a calibrated deterministic process model that is calibrated such that critical dimension (CD) of simulated profiles of the structure is within a CD threshold of observed data associated with the patterned substrate, but not necessarily meet stochastic variation specifications associated with the observed data.

88. The medium of clause 83, wherein the process model is a calibrated stochastic process model that is calibrated such that key performance indicator (KPI) extracted from the model generated depth data is within a specified threshold of observed KPI extracted from inspection data associated with the patterned substrate.

89. The medium of clause 88, wherein the inspection data is obtained from a plurality of features of the patterned substrate, the plurality of features formed using a range of dose and focus conditions.

90. The medium of clause 88, wherein the KPI includes one or more of: CD of the structure, local CD uniformity (LCDU) associated with the structure, line edge roughness (LER) associated with the structure, line width roughness (LWR) related to line space patterns, contact edge roughness related to contact holes, stochastic edge placement error (SEPE), and defect rates associated with the structure.

91. A non-transitory computer-readable medium for generating a model configured to estimate depth data of a structure of a patterned substrate comprising instructions stored therein that, when executed by one or more processors, cause operations comprising:

obtaining (i) a plurality of SEM images of structures associated with programmed variations in a mask pattern and (ii) simulated profiles of the structures based on the programmed variations, each SEM image of the plurality of SEM images being paired with a simulated profile corresponding to a programmed variation in the mask pattern; and generating, based on the plurality of SEM images paired with the corresponding simulated profiles, a model to estimate depth data of a structure such that the estimated depth data is within acceptable threshold of depth data associated with the simulated profiles.

92. The medium of clause 91, wherein the programmed variations comprises variations in one or more of: assist feature variations associated with the mask pattern, main feature variations associated with the mask pattern, or resist coated thickness variations.

93. The medium of clause 92, wherein the assist feature variations comprises variation in a size of an assist feature of the mask pattern, a distance of the assist feature to a main feature of the mask pattern, or both.

94. The medium of clause 91, wherein the simulated profiles of the structures are generated by a calibrated deterministic process model associated with a patterning process using the programmed variations in the mask pattern.

95. The medium of clause 94, wherein the calibrated deterministic process model is a process model calibrated to satisfy critical dimension (CD) of a structure, but not local CD uniformity (LCDU) associated with the structure, line edge roughness (LER) associated with the structure, line width roughness (LWR) associated with the structure, or stochastic variations associated with the structure.

96. The medium of clause 91, wherein the generated depth data comprises at least one of: height data of the structure, shape parameters of the structure, or voxel map of overhanging structures.

97. The medium of clause 96, wherein the shape parameters comprises one or more of a top CD measured at a top of the structure, a bottom CD measured at a bottom of the structure, or a side wall angle of the structure.

98. The medium of clause 91, wherein the generating the model is based on a generative adversarial network, or an encoder-decoder network with a certain objective function.

99. The medium of clause 98, wherein generating of the model comprises: training a first model in conjunction with a second model such that the first model generates depth data using a SEM image of the plurality of image as input, and the second model to classify the generated depth data as a first category or a second category based on the paired simulated profile.

100. The medium of clause 99, wherein the generating of the model comprises:

inputting a SEM image of the plurality of SEM images;

estimating, using the first model, the depth data for inputted SEM images;

classifying, via a second model using the simulated profiles as reference, the estimated depth data as a first category indicative that the estimated depth data correspond to the reference or a second category indicative that the estimated depth data does not correspond to the reference; and updating model parameters of both the first model and the second model to cause the first model to estimate depth data such that the second model classifies the estimated depth as the first category.

101. The medium of clause 100, wherein the first model and the second model are convolutional neural network (CNN), or deep CNN.

102. The medium of clause 101, wherein the model parameters are weights and biases of one or more layers of the CNN or DCNN.

103. The medium of clause 91, wherein the operations further comprise:

receiving, via a SEM tool, a single SEM image of a structure patterned on a substrate;

determining, via the model using the received SEM image as input, depth data associated with the SEM image.

104. The medium of clause 103, wherein the operations further comprise:

determining, based on the depth data, physical characteristics of the structure of the patterned substrate, the physical characteristics comprising a shape, a size, or relative positioning of polygon shapes with respect to each other at one or more depth of features of the structure.

105. The medium of clause 104, wherein the operations further comprise:

determining, based on the physical characteristics, a defect in the structure, the defect indicative of the structure not satisfying a design specification; and adjusting, based on the defect, a parameter of one or more patterning process to eliminate the defect in a subsequent process of the patterning process.

106. A non-transitory computer-readable medium, for generating a model configured to estimate depth data of a structure of a patterned substrate, comprising instructions stored therein that, when executed by one or more processors, cause operations comprising:

obtaining (i) a plurality of SEM images of structures, (ii) simulated profiles of the structures, and (iii) key performance indicators (KPIs) associated with the simulated profiles; and generating, based on the plurality of SEM images, the simulated profiles, and the KPIs, a model to estimate depth data of a structure such that KPIs associated with the estimated depth data are within an acceptable threshold of the KPIs associated with the simulated profiles.

107. The medium of clause 106, wherein the simulated profiles of the structures are generated by a calibrated stochastic process model associated with a patterning process.

108. The medium of clause 107, wherein the calibrated stochastic process model is a process model calibrated to satisfy one or more KPI specifications, a KPI being one or more of: critical dimension (CD) of a structure, local CD uniformity (LCDU) associated with the structure, line edge roughness (LER) associated with the structure, defect rates associated with the structure, line width roughness (LWR) related to line space patterns, contact edge roughness related to contact holes, stochastic edge placement error (SEPE), or stochastic variations associated with geometry of the structure.

109. The medium of clause 108, wherein the generated depth data comprises at least one of: height data of the structure, shape parameters of the structure, or a voxel map related to overhanging structures.

110. The medium of clause 109, wherein the shape parameters comprises one or more of a top CD measured at a top of the structure, a bottom CD measured at a bottom of the structure, or a side wall angle of the structure.

111. The medium of clause 108, wherein generating of the model is based on a generative adversarial network, or an encoder-decoder network.

112. The medium of clause 111, wherein generating of the model comprises: training a first model in conjunction with a second model such that the first model generates depth data using a SEM image of the plurality of images as input, and using the second model to classify the generated depth data as a first category or a second category based on the KPIs associated with the simulated profiles and generated depth data.

113. The medium of clause 112, wherein the generating of the model is an iterative process, each iteration comprising:

inputting a SEM image of the plurality of SEM images to the first model;

estimating, using the first model, the depth data for inputted SEM images;

extracting KPI from the estimated depth data;

classifying, via the second model using (i) the extracted KPI and (ii) the plurality of simulated profiles and simulated KPI of the plurality of simulated profiles as reference, the estimated depth data as a first category indicative that the estimated depth data does not correspond to the reference or a second category indicative that the estimated depth data does not correspond to the reference; and updating model parameters of both the first model and the second model to cause the first to estimate depth data such that the second model classifies the estimated depth as the first category.

114. The medium of clause 113, wherein the first model is further trained in conjunction with generator third model, the third model being configured to generate a SEM image from the estimated depth data, the training being an iterative process, each iteration comprising:

inputting a SEM image of the plurality of SEM images to the first model;

estimating, using the first model, the depth data for inputted SEM images;

generating, via the third model using the estimated depth data as input, a predicted SEM image; and updating model parameters of both the first model and the third model to cause a difference between the inputted SEM image and the predicted SEM image to be within a specified difference threshold.

115. The medium of clause 114, wherein the first model, the second model, and the third model are convolutional neural network (CNN), or deep CNN.

116. The medium of clause 115, wherein the model parameters are weights and biases of one or more layers of the CNN or DCNN.

117. The medium of clause 108, wherein generating of the model is based on a generative adversarial network, or encoder-decoder network.

118. The medium of clause 106, wherein the operations further comprise:

receiving, via a SEM tool, a single SEM image of a structure patterned on a substrate;

determining, via the model using the received SEM image as input, depth data associated with the SEM image.

119. The medium of clause 118, wherein the operations further comprise:

determining, based on the depth data, physical characteristics of the structure of the patterned substrate, the physical characteristics comprising a shape, a size, or relative positioning of polygon shapes with respect to each other at one or more depth of features of the structure.

120. The medium of clause 119, wherein the operations further comprise:

determining, based on the physical characteristics, a defect in the structure, the defect indicative of the structure not satisfying a design specification; and adjusting, based on the defect, a parameter of one or more patterning process to eliminate the defect in a subsequent process of the patterning process.

121. A method for generating a model configured to estimate depth data of a structure of a patterned substrate, the method comprising:

obtaining (i) a plurality of SEM images of structures associated with programmed variations in a mask pattern and (ii) simulated profiles of the structures based on the programmed variations, each SEM image of the plurality of SEM images being paired with a simulated profile corresponding to a programmed variation in the mask pattern; and generating, based on the plurality of SEM images paired with the corresponding simulated profiles, a model to estimate depth data of a structure such that the estimated depth data is within acceptable threshold of depth data associated with the simulated profiles.

122. The method of clause 121, wherein the programmed variations comprises variations in one or more of: assist feature variations associated with the mask pattern, main feature variations associated with the mask pattern, or resist coated thickness variations.

123. The method of clause 122, wherein the assist feature variations comprises variation in a size of an assist feature of the mask pattern, a distance of the assist feature to a main feature of the mask pattern, or both.

124. The method of clause 121, wherein the simulated profiles of the structures are generated by a calibrated deterministic process model associated with a patterning process using the programmed variations in the mask pattern.

125. The method of clause 124, wherein the calibrated deterministic process model is a process model calibrated to satisfy critical dimension (CD) of a structure, but not local CD uniformity (LCDU) associated with the structure, line edge roughness (LER) associated with the structure, line width roughness (LWR) associated with the structure, or stochastic variations associated with the structure.

126. The method of clause 121, wherein the generated depth data comprises at least one of: height data of the structure, shape parameters of the structure, or voxel map of overhanging structures.

127. The method of clause 126, wherein the shape parameters comprises one or more of a top CD measured at a top of the structure, a bottom CD measured at a bottom of the structure, or a side wall angle of the structure.

128. The method of clause 121, wherein the generating the model is based on a generative adversarial network, or an encoder-decoder network with a certain objective function.

129. The method of clause 128, wherein generating of the model comprises: training a first model in conjunction with a second model such that the first model generates depth data using a SEM image of the plurality of images as input, and the second model classifies the generated depth data as a first category or a second category based on the paired simulated profile.

130. The method of clause 129, wherein the generating of the model comprises:

inputting a SEM image of the plurality of SEM images;

estimating, using the first model, the depth data for the inputted SEM images;

classifying, via a second model using the simulated profiles as reference, the estimated depth data as a first category indicative that the estimated depth data correspond to the reference or a second category indicative that the estimated depth data does not correspond to the reference; and updating model parameters of both the first model and the second model to cause the first model to estimate depth data such that the second model classifies the estimated depth as the first category.

131. The method of clause 130, wherein the first model and the second model are convolutional neural network (CNN), or deep CNN.

132. The method of clause 131, wherein the model parameters are weights and biases of one or more layers of the CNN or DCNN.

133. The method of clause 121, wherein the operations further comprise:

receiving, via a SEM tool, a single SEM image of a structure patterned on a substrate;

determining, via the model using the received SEM image as input, depth data associated with the SEM image.

134. The method of clause 133, wherein the operations further comprise:

determining, based on the depth data, physical characteristics of the structure of the patterned substrate, the physical characteristics comprising a shape, a size, or relative positioning of polygon shapes with respect to each other at one or more depth of features of the structure.

135. The method of clause 134, wherein the operations further comprise:

determining, based on the physical characteristics, a defect in the structure, the defect indicative of the structure not satisfying a design specification; and adjusting, based on the defect, a parameter of one or more patterning process to eliminate the defect in a subsequent process of the patterning process.

136. A method for generating a model configured to estimate depth data of a structure of a patterned substrate, the method comprising:

obtaining (i) a plurality of SEM images of structures, (ii) simulated profiles of the structures, and (iii) key performance indicators (KPIs) associated with the simulated profiles; and generating, based on the plurality of SEM images, the simulated profiles, and the KPIs, a model to estimate depth data of a structure such that KPIs associated with the estimated depth data is within acceptable threshold of the KPIs associated with the simulated profiles.

137. The method of clause 136, wherein the simulated profiles of the structures are generated by a calibrated stochastic process model associated with a patterning process.

138. The method of clause 137, wherein the calibrated stochastic process model is a process model calibrated to satisfy one or more of KPIs including: critical dimension (CD) of a structure, local CD uniformity (LCDU) associated with the structure, line edge roughness (LER) associated with the structure, defect rates associated with the structure, line width roughness (LWR) related to line space patterns, contact edge roughness related to contact holes, stochastic edge placement error (SEPE), or stochastic variations associated with geometry of the structure.

139. of The method clause 138, wherein the generated depth data comprises at least one of: height data of the structure, shape parameters of the structure, or voxel map related to overhanging structures.

140. The method of clause 139, wherein the shape parameters comprises one or more of a top CD measured at a top of the structure, a bottom CD measured at a bottom of the structure, or a side wall angle of the structure.

141. The method of clause 138, wherein generating of the model is based on a generative adversarial network, or encoder-decoder network.

142. The method of clause 141, wherein generating of the model comprises: training a first model in conjunction with a second model such that the first model generates depth data using a SEM image of the plurality of images as input, and using the second model to classify the generated depth data as a first category or a second category based on the KPIs associated with the simulated profiles and generated depth data.

143. The method of clause 142, wherein the generating of the model is an iterative process, each iteration comprising:

inputting a SEM image of the plurality of SEM images to the first model;

estimating, using the first model, the depth data for inputted SEM images;

extracting KPI from the estimated depth data;

classifying, via the second model using (i) the extracted KPI and (ii) the plurality of simulated profiles and simulated KPI of the plurality of simulated profiles as reference, the estimated depth data as a first category indicative that the estimated depth data does not correspond to the reference or a second category indicative that the estimated depth data does not correspond to the reference; and updating model parameters of both the first model and the second model to cause the first to estimate depth data such that the second model classifies the estimated depth as the first category.

144. The method of clause 143, wherein the first model is further trained in conjunction with generator third model, the third model being configured to generate a SEM image from the estimated depth data, the training being an iterative process, each iteration comprising:

inputting a SEM image of the plurality of SEM images to the first model;

estimating, using the first model, the depth data for inputted SEM images;

generating, via the third model using the estimated depth data as input, a predicted SEM image; and updating model parameters of both the first model and the third model to cause a difference between the inputted SEM image and the predicted SEM image to be within a specified difference threshold.

145. The method of clause 144, wherein the first model, the second model, and the third model are convolutional neural network (CNN), or deep CNN.

146. The method of clause 145, wherein the model parameters are weights and biases of one or more layers of the CNN or DCNN.

147. The method of clause 138, wherein generating of the model is based on a generative adversarial network, or encoder-decoder network.

148. The method of clause 136, wherein the operations further comprise:

receiving, via a SEM tool, a single SEM image of a structure patterned on a substrate;

determining, via the model using the received SEM image as input, depth data associated with the SEM image.

149. The method of clause 148, wherein the operations further comprise:

determining, based on the depth data, physical characteristics of the structure of the patterned substrate, the physical characteristics comprising a shape, a size, or relative positioning of polygon shapes with respect to each other at one or more depth of features of the structure.

150. The method of clause 149, wherein the operations further comprise:

determining, based on the physical characteristics, a defect in the structure, the defect indicative of the structure not satisfying a design specification; and adjusting, based on the defect, a parameter of one or more patterning process to eliminate the defect in a subsequent process of the patterning process.

151. A system for determining depth information from an image of a patterned substrate, the system comprising:

an electron beam optics configured to capture an image of a patterned substrate; and one or more processors configured to:

input the image of the patterned substrate to a trained model configured to generate depth related data from a single image; and extract depth information from the image by executing the trained model.

The concepts disclosed herein may simulate or mathematically model any generic imaging system for imaging sub wavelength features, and may be especially useful with emerging imaging technologies capable of producing increasingly shorter wavelengths. Emerging technologies already in use include EUV (extreme ultra violet), DUV lithography that is capable of producing a 193 nm wavelength with the use of an ArF laser, and even a 157 nm wavelength with the use of a Fluorine laser. Moreover, EUV lithography is capable of producing wavelengths within a range of 20-5 nm by using a synchrotron or by hitting a material (either solid or a plasma) with high energy electrons in order to produce photons within this range.

While the concepts disclosed herein may be used for imaging on a substrate such as a silicon wafer, it shall be understood that the disclosed concepts may be used with any type of lithographic imaging systems, e.g., those used for imaging on substrates other than silicon wafers.

As used herein, unless specifically stated otherwise, the term "or" encompasses all possible combinations, except where infeasible. For example, if it is stated that a database can include A or B, then, unless specifically stated otherwise or infeasible, the database can include A, or B, or A and B. As a second example, if it is stated that a database can include A, B, or C, then, unless specifically stated otherwise or infeasible, the database can include A, or B, or C, or A and B, or A and C, or B and C, or A and B and C.

The descriptions above are intended to be illustrative, not limiting. Thus, it will be apparent to one skilled in the art that modifications may be made as described without departing from the scope of the claims set out below.

The invention claimed is:

1. A non-transitory computer-readable medium comprising instructions therein that, when executed by one or more processors, cause the one or more processors to at least:

receive, via a scanning electron microscope (SEM) tool, a single SEM image of a structure patterned on a substrate;

input the SEM image to a convolutional neural network (CNN) to predict disparity data associated with the SEM image, the CNN trained by:

obtaining, via the SEM tool, of a stereo pair of SEM images of a patterned substrate, the stereo pair including a first SEM image obtained at a first e-beam tilt setting of the SEM tool, and a second SEM image obtained at a second e-beam tilt setting of the SEM tool;

generation, using the CNN, of disparity data between the first SEM image and the second SEM image;

combination of the disparity data with the second SEM image to generate a reconstructed image of the first SEM image; and comparison of the reconstructed image and the first SEM image; and generate, based on the predicted disparity data, depth information associated with the structure patterned on the substrate.

2. A non-transitory computer-readable medium comprising instructions stored therein that, when executed by one or more processors, are configured to cause the one or more processors to at least:

obtain a pair of images of a structure of a patterned substrate, the pair of images including a first image captured at a first angle with respect to the patterned substrate, and a second image captured at a second angle different from the first angle;

generate, via a model using the first image as input, disparity data between the first image and the second image, the disparity data being indicative of depth information associated with the first image;

combine the disparity data with the second image to generate a reconstructed image corresponding to the first image; and adjust, based on a performance function, one or more parameters of the model causing the performance function to be within a specified performance threshold, the performance function being a function of the disparity data, the reconstructed image, and the first image, the model configured to generate data convertible to depth information of a structure of a patterned substrate.

3. The medium of claim 2, wherein the disparity data comprises a difference in coordinates of similar features within the first image and the second image.

4. The medium of claim 2, wherein the reconstructed image is generated by performance of a composition operation between the disparity data and the second image to generate the reconstructed image.

5. The medium of claim 2, wherein the performance function further comprises a loss function computed based on disparity characteristics associated with a pair of stereo images of prior one or more patterned substrates, and the disparity data predicted by the model.

6. The medium of claim 5, wherein the disparity characteristics based on the prior one or more patterned substrates comprises disparity expressed as a piecewise smooth function, wherein a derivative of the disparity is piecewise continuous.

7. The medium of claim 5, wherein the disparity characteristics based on the prior one or more patterned substrates comprises disparity expressed as piecewise constant.

8. The medium of claim 5, wherein the disparity characteristics based on the prior one or more patterned substrates comprises disparity expressed as a function having a jump at edges of a structure within an image, the edges being detected based on a gradient of an intensity profile within the image.

9. The medium of claim 2, wherein the instructions configured to adjust the one or more parameters of the model are configured to cause the one or more processors to:

determine the performance function based on the disparity data, and the reconstructed image;

determine whether the performance function is within the specified performance threshold; and in response to the performance function not being within the specified performance threshold, adjust the one or more parameters of the model to cause the performance function to be within the specified performance threshold, the adjustment based on a gradient of the performance function with respect to the one or more parameters.

10. The medium of claim 1, wherein the first image is a normal image associated with an e-beam directed perpendicular to the patterned substrate, and the second image is associated with an e-beam directed at an angle more 90° or less than 90° with respect to the patterned substrate.

11. The medium of claim 2, wherein instructions configured to cause the one or more processors to obtain the pair of images are further configured to cause the one or more processors to obtain a plurality of pairs of SEM images of a patterned substrate, each pair including a first SEM image associated with a first e-beam tilt setting of a metrology tool, and a second SEM image associated with a second e-beam tilt setting of the metrology tool.

12. The medium of claim 2, wherein the performance function further comprises another loss function computed as a sum of similarity between an image of a plurality of images and a corresponding reconstructed image.

13. The medium of claim 1, wherein the instructions are further configured to cause the one or more processors to obtain, via the metrology tool, a single SEM image of a patterned substrate at the first e-beam tilt setting of the metrology tool.

14. The medium of claim 13, wherein the single SEM image is a normal image obtained by directing an e-beam approximately perpendicular to the patterned substrate.

15. A method comprising:

obtaining a pair of images of a structure of a patterned substrate, the pair of images including a first image captured at a first angle with respect to the patterned substrate, and a second image captured at a second angle different from the first angle;

generating, via a model using the first image as input, disparity data between the first image and the second image, the disparity data being indicative of depth information associated with the first image;

combining the disparity data with the second image to generate a reconstructed image corresponding to the first image; and adjusting, based on a performance function, one or more parameters of the model causing the performance function to be within a specified performance threshold, the performance function being a function of the disparity data, the reconstructed image, and the first image, the model configured to generate data convertible to depth information of a structure of a patterned substrate.

16. The method of claim 15, wherein the disparity data comprises difference in coordinates of similar features within the first image and the second image.

17. The method of claim 15, wherein the reconstructed image is generated by performing a composition operation between the disparity data and the second image to generate the reconstructed image.

18. The method of claim 15, wherein the performance function further comprises a loss function computed based on disparity characteristics associated with a pair of stereo images of prior one or more patterned substrates, and the disparity data predicted by the model.

19. The method of claim 18, wherein the disparity characteristics comprises at least one selected from:

disparity being a piecewise smooth function, wherein a derivative of the disparity is piecewise continuous;

disparity being piecewise constant; and/or disparity being a function having a jump at edges of a structure within an image, the edges being detected based on a gradient of an intensity profile within the image.

20. The method of claim 15, further comprising:

receiving, via a scanning electron microscope (SEM) tool, a single SEM image of a structure patterned on a substrate;

inputting the SEM image to the model to generate data convertible to depth information of a structure of a patterned substrate; and generating, based on the data convertible to depth information, depth information associated with the structure patterned on the substrate.

* * * * *